US009028714B2

(12) United States Patent
Xu et al.

(10) Patent No.: US 9,028,714 B2
(45) Date of Patent: May 12, 2015

(54) LIQUID CRYSTAL COMPOUND PREPARATION AND APPLICATION

(71) Applicant: Shijiazhuang Chengzhi Yonghua Display Materials Co., Ltd., Shijazhuang, Hebel Province (CN)

(72) Inventors: Kai Xu, Shijiazhuang (CN); Jing-yi Feng, Shijiazhuang (CN); Zi-qian Shi, Shijiazhuang (CN); Qing Cui, Shijiazhuang (CN); Xi-zhe Yan, Shijiazhuang (CN); Kui Wang, Shijiazhuang (CN); Jia-lin Chen, Shijiazhuang (CN)

(73) Assignee: Shijiazhuang Chengzhi Yonghua Display Materials Co., Ltd., Shijiazhuang (CN)

( * ) Notice: Subject to any disclaimer, the term of this patent is extended or adjusted under 35 U.S.C. 154(b) by 0 days.

(21) Appl. No.: 14/014,570

(22) Filed: Aug. 30, 2013

(65) Prior Publication Data

US 2015/0060730 A1 Mar. 5, 2015

(51) Int. Cl.
*C09K 19/34* (2006.01)
*C09K 19/06* (2006.01)
*C09K 19/30* (2006.01)

(52) U.S. Cl.
CPC .................................. *C09K 19/3402* (2013.01)

(58) Field of Classification Search
CPC .................................................. C09K 19/3402
USPC ........... 252/299.61, 299.63; 349/182; 428/1.1
See application file for complete search history.

(56) References Cited

U.S. PATENT DOCUMENTS 8,801,966 B2 * 8/2014 Chen et al. ............... 252/299.63

FOREIGN PATENT DOCUMENTS

CN 102924243 A * 2/2013 ................ 252/299.6

* cited by examiner

*Primary Examiner* — Geraldina Visconti
(74) *Attorney, Agent, or Firm* — Novak Druce Connolly Bove + Quigg LLP

(57) ABSTRACT

The invention relates to liquid-crystalline compounds of the formula (I) having a —$CF_2O$— bridge. The invention also relates to liquid-crystalline media prepared therewith and to liquid-crystal display devices (LC displays) containing these media. This kind of compounds has the excellent characteristics including a large dielectric anisotropy, fast response time and high clearing point, and good miscibility at low temperature in the same time which has important significance in new TFT LC mixture.

(I)

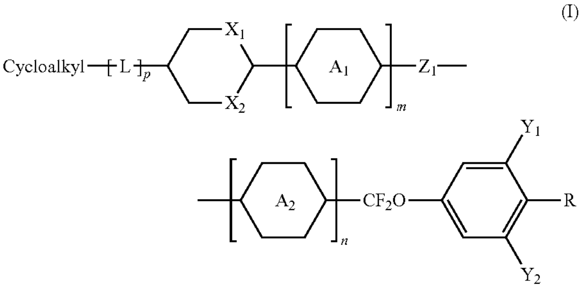

28 Claims, No Drawings

LIQUID CRYSTAL COMPOUND PREPARATION AND APPLICATION

The present invention relates to a kind of liquid-crystalline compounds that has Cycloalkyl terminal group and a —$CF_2O$— bridge. The preparation and application of these new compounds are also included. The invention also relates to liquid-crystal display devices (LC displays) containing these media.

Liquid crystals are used principally as dielectrics in display devices, since the optical properties of such substances can be modified by an applied voltage. Electro-optical devices based on liquid crystals are extremely well known to the person skilled in the art and be based on various effects. Examples of such devices are cells having dynamic scattering, DAP (deformation of aligned phase) cells, guest/host cells, TN cells having a twisted nematic structure, STN (supertwisted nematic) cells, SBE (super birefringence effect) cells and OMI (optical mode interference) cells.

Thin-film transistors (TFTs) matrix is principally applied to TN (twisted nematic) mode, IPS (In Plane Switching) mode/FFS (Fring Field Switching) mode, VA (Vertical Alignment) mode, and other display modes.

After decades of accumulation and development, TFT (thin-film transistor) technology is getting more mature, but the demand for display technology is constantly improving. In order to get the superior picture quality, liquid crystal monitors are required to achieve more rapid response, brighter colors and wider color gamut. The drive voltage should be lower to reduce power consumption. As one of the most important optoelectronic materials used in LCD, liquid crystal material plays an important role of improving the performance of the liquid crystal displays.

Fast response is required for the LCD, in order to avoid the image sticking or smearing when dynamic pictures are displaying. Thus a lower rotational viscosity of liquid crystal material is required. Furthermore, in order to reduce energy consumption of devices, the drive voltage should be lower. So improving the dielectric anisotropy of the liquid crystal makes great significance.

The liquid crystal material must have good chemical stability, thermal stability, good electric and electromagnetic radiation stability. Furthermore, the liquid crystal materials should have a low viscosity, short addressing times, low threshold voltage and high contrast ratio. LC is generally used as a mixture of several components, it is important that these components easily miscible with each other. Other properties, such as conductivity, dielectric anisotropy and optical anisotropy should also meet the applications requirements. For example, the liquid crystal used in twisted nematic structure should have a positive dielectric anisotropy and low electrical conductivity.

It is important to develop single liquid crystal materials of a superior performance, since the properties of the single liquid crystal directly determine the properties of liquid crystal mixture. The single having the chemical structure of Difluoromethoxy bridge not only has high dielectric anisotropy, but also has the superiority to low the rotational viscosity.

The present invention provides a medium, especially for MLC, IPS, TN or STN displays of this type, which preferably simultaneously have high specific resistance values and low threshold voltage. This object requires liquid-crystalline compounds which have a high clearing point and low rotational viscosity.

It has now been found that this object can be achieved if the liquid-crystalline compounds according to the invention are used.

The invention thus relates to liquid-crystalline compounds of the formula I (I)

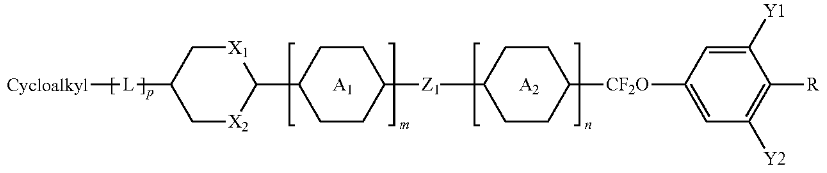

in which Cycloalkyl denotes cyclobutyl, cyclopentyl and cycloheptyl,

[L]p denotes $CH_2$ or 0, and [L]p contains one 0 at most, $X_1$ and $X_2$ each, independently of one another, denote H or 0 alternatively, and $X_1$ or $X_2$ denote 0 at the least, $A_1$ and $A_2$ each, denote 1,4-cyclohexylidene, 1,4-phenylene or fluoro-1,4-phenylene, $Z_1$ denotes —$CH_2$—, —$CH_2$—$CH_2$—, —$(CH_2)_3$—, —$(CH_2)_4$—, —CH═CH—, —C≡C—, —COO—, —OOC—, —$CF_2O$—, —$OCH_2$—, —$CH_2O$—, —$OCF_2$—, —$CF_2CH_2$—, —$CH_2CF_2$—, —$C_2F_4$—, —CF═CF— or a single bond, $Y_1$, $Y_2$ denote H or F alternatively, R denotes H, F, CL, $CF_3$, $CHF_2$, OCF or $OCHF_2$, p denotes 0-6, m denotes 0, 1, 2 or 3, n denotes 0 or 1.

The invention furthermore relates to the use of the compounds of the formula I in liquid-crystalline media.

The invention relates, in particular, to the compounds of the formula I in which Cycloalkyl denotes cyclobutyl or cyclopentyl, $X_1$ denotes 0 and $X_2$ denotes H, or $X_1$ and $X_2$ denotes 0 independently, R denotes F or $OCF_3$, m+n=1 or 2, when n=0, $Z_1$ independently denotes single bond, and $Y_1$, $Y_2$ each, independently of one another, denote H or F, p=0.

Particularly preferred compounds of the formula I are the compounds of the formula I A-1 to I D-43.

(IA -1)

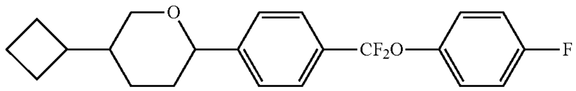

(IA -2)

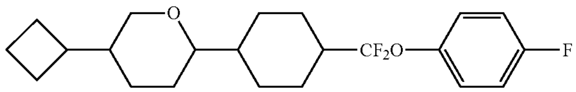

-continued
(IA -3)
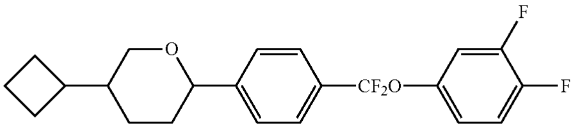
(IA -4)
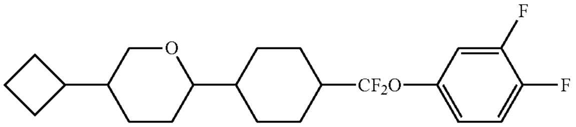
(IA -5)
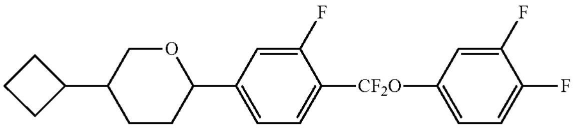
(IA -6)
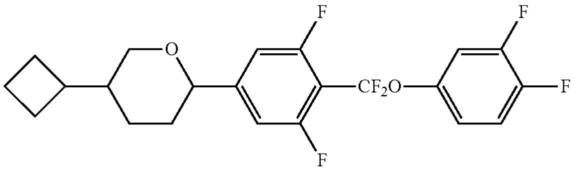
(IA -7)
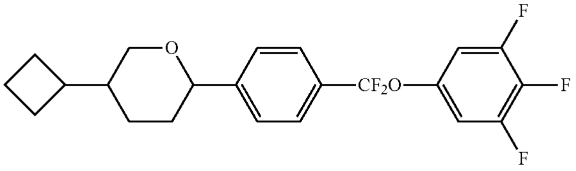
(IA -8)
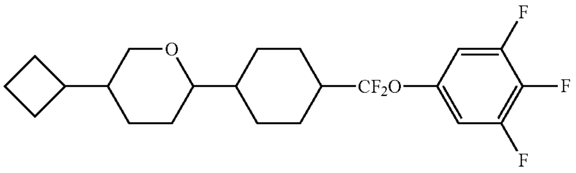
(IA -9)
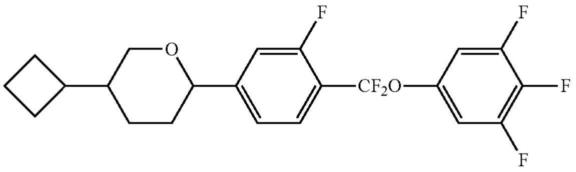
(IA -10)
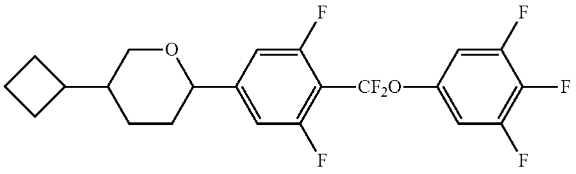
(IA -11)
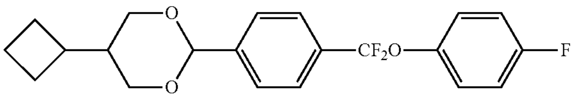
-continued
(IA -12)
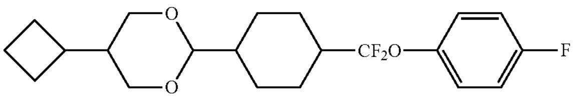
(IA -13)
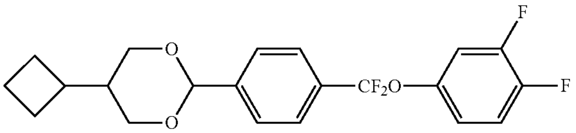
(IA -14)
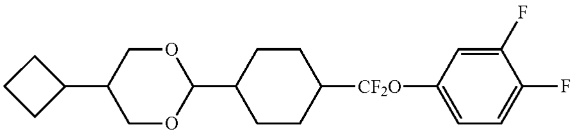
(IA -15)
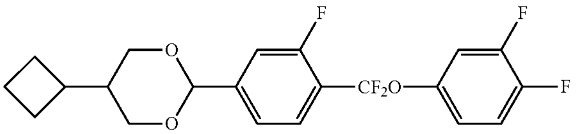
(IA -16)
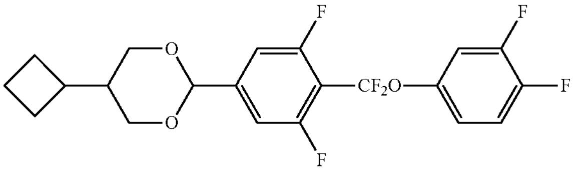
(IA -17)
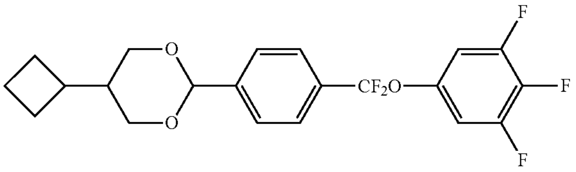
(IA -18)
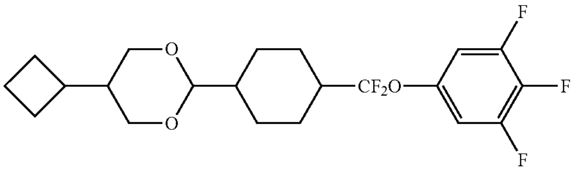
(IA -19)
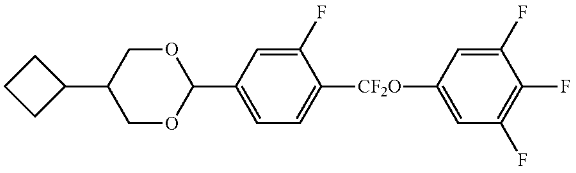
(IA -20)
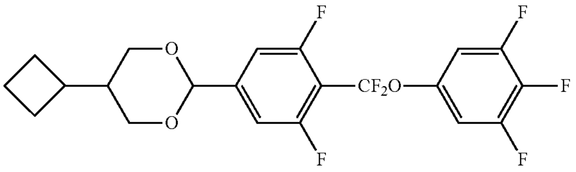

-continued
(IA -21)
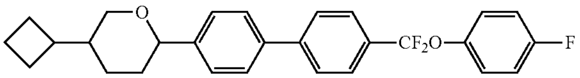
(IA -22)
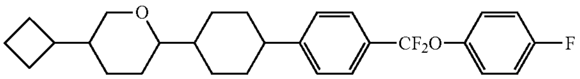
(IA -23)
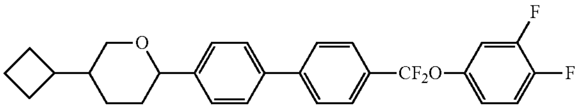
(IA -24)
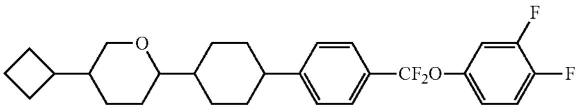
(IA -25)
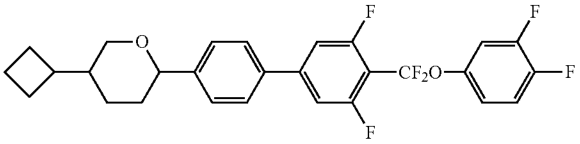
(IA -26)
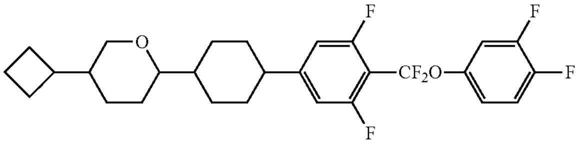
(IA -27)
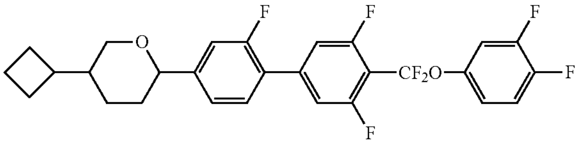
(IA -28)
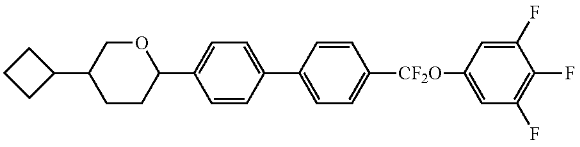
(IA -29)
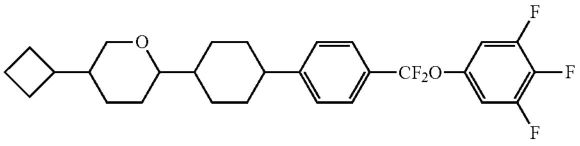
(IA -30)
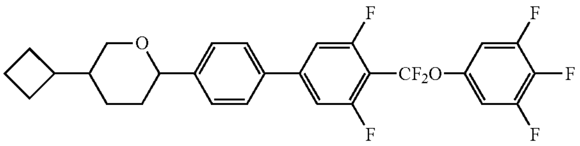
-continued
(IA -31)
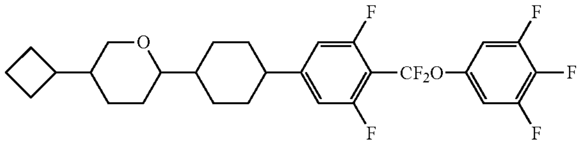
(IA -32)
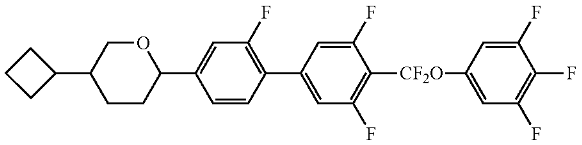
(IA -33)
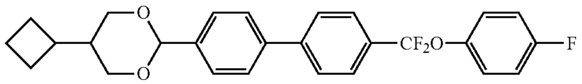
(IA -34)
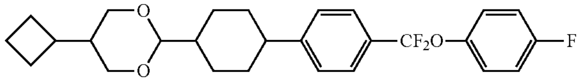
(IA -35)
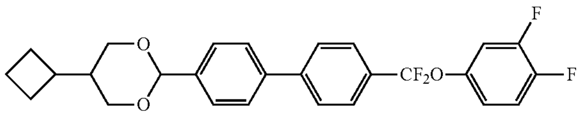
(IA -36)
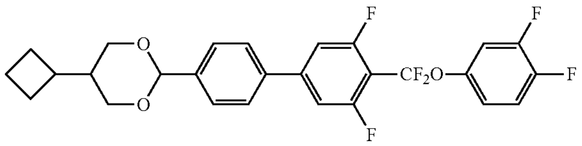
(IA -37)
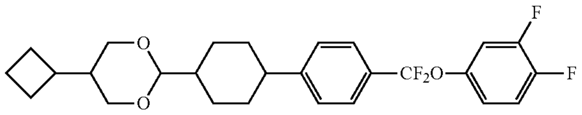
(IA -38)
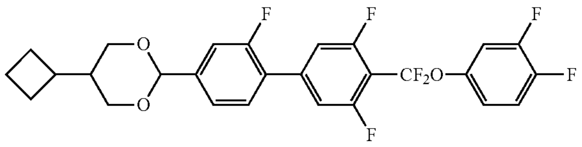
(IA -39)
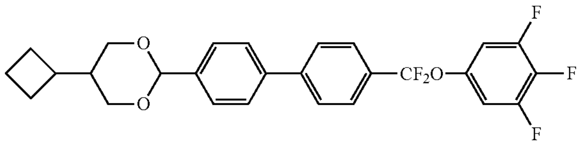
(IA -40)
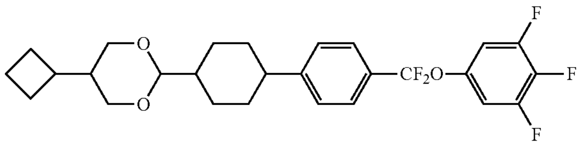

-continued
(IA -41)
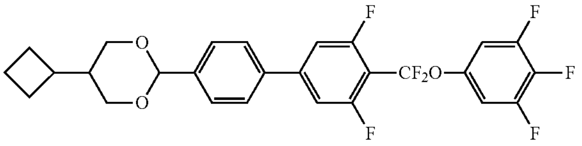
(IA -42)
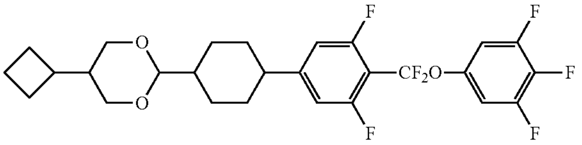
(IA -43)
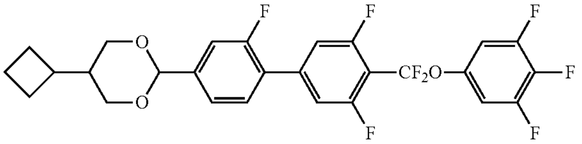
(IB -1)
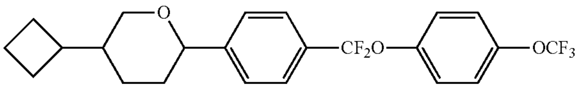
(IB -2)
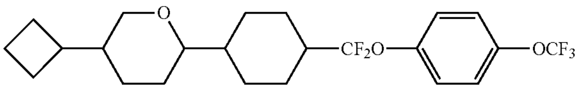
(IB -3)
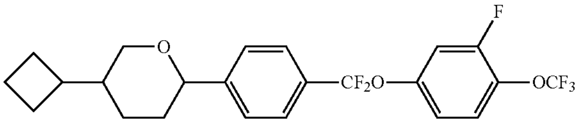
(IB -4)
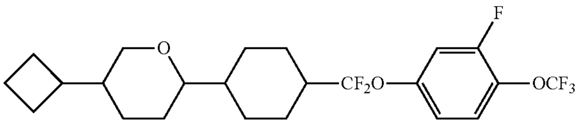
(IB -5)
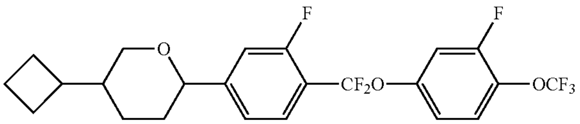
(IB -6)
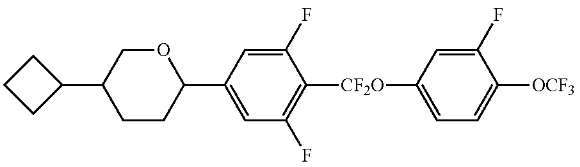
(IB -7)
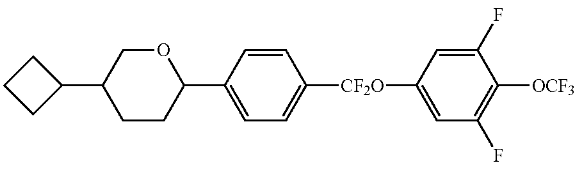
-continued
(IB -8)
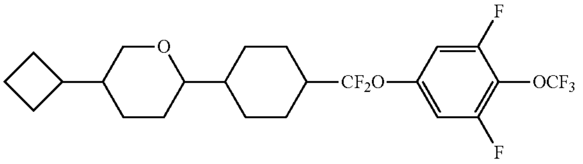
(IB -9)
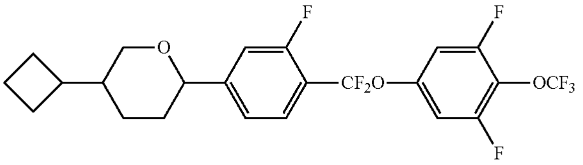
(IB -10)
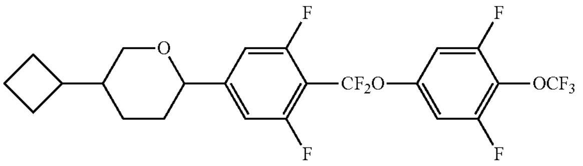
(IB -11)
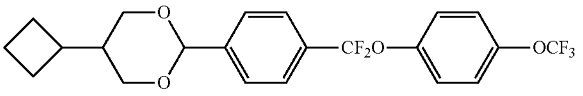
(IB -12)
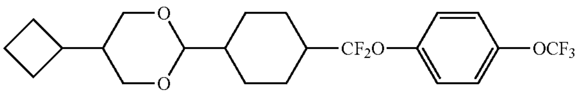
(IB -13)
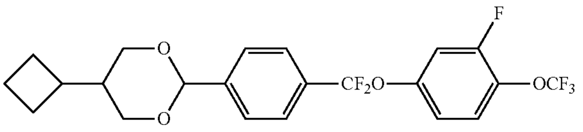
(IB -14)
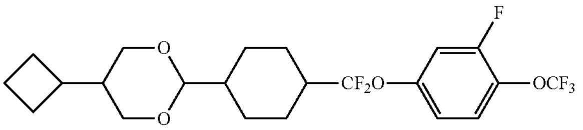
(IB -15)
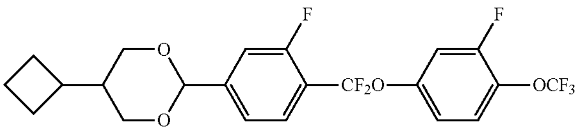
(IB -16)
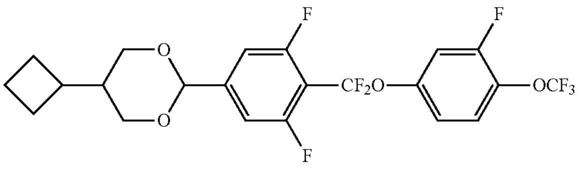

-continued
(IB -17)
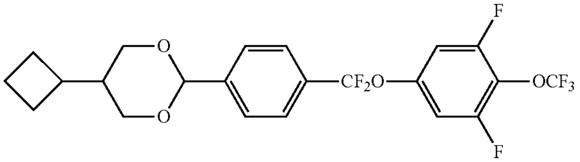
(IB -18)
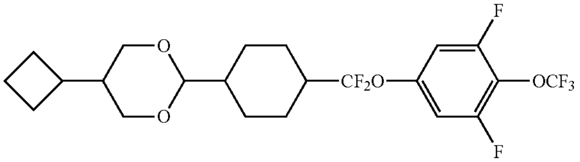
(IB -19)
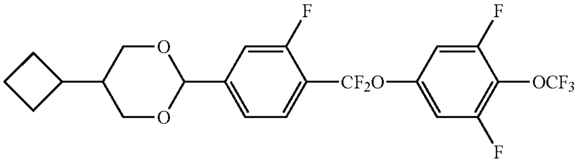
(IB -20)
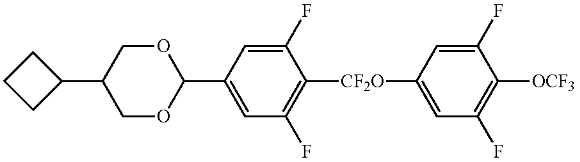
(IB -21)
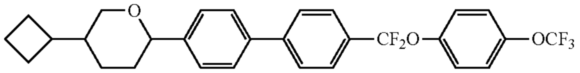
(IB -22)
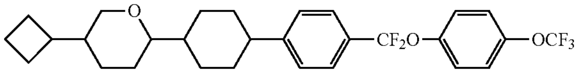
(IB -23)
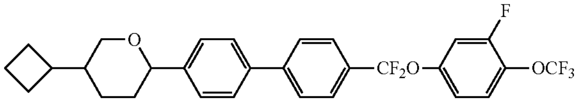
(IB -24)
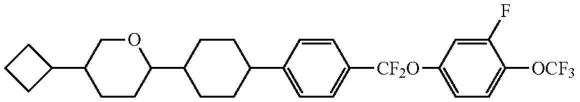
(IB -25)
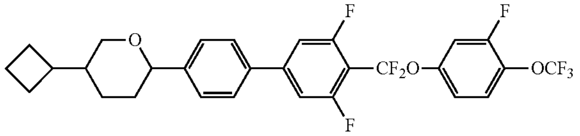
(IB -26)
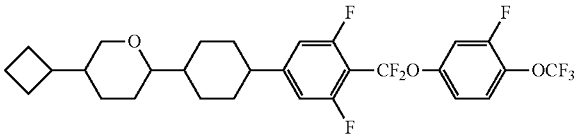
-continued
(IB -27)
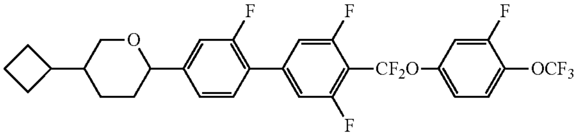
(IB -28)
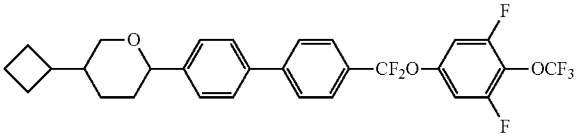
(IB -29)
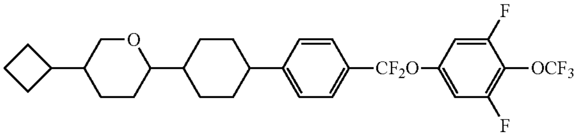
(IB -30)
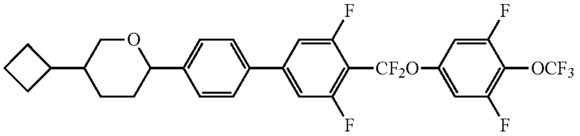
(IB -31)
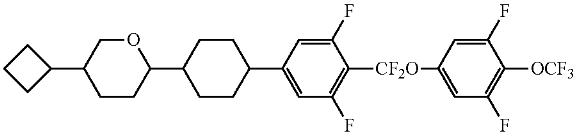
(IB -32)
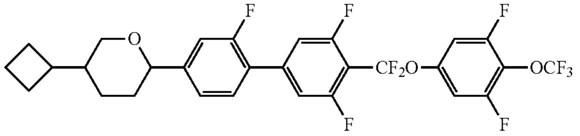
(IB -33)
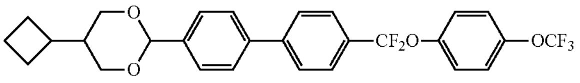
(IB -34)
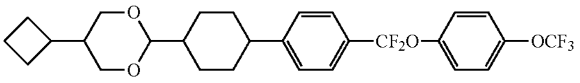
(IB -35)
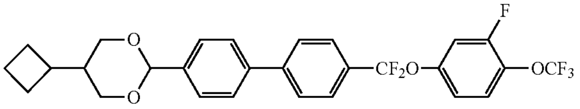
(IB -36)
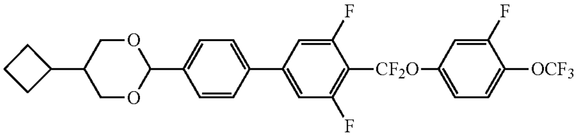

-continued
(IB-37)
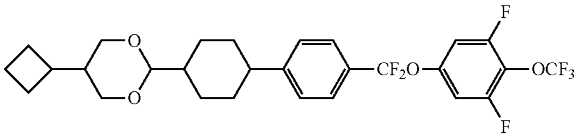
(IB-38)
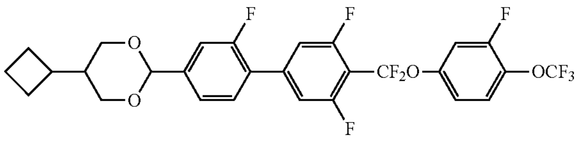
(IB-39)
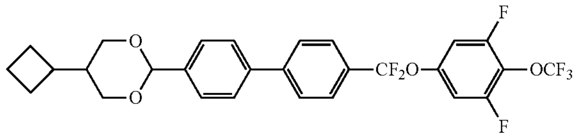
(IB-40)
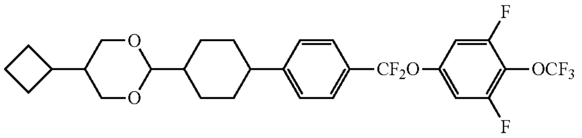
(IB-41)
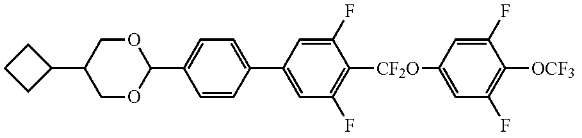
(IB-42)
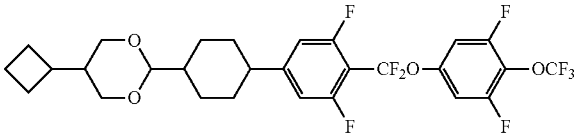
(IB-43)
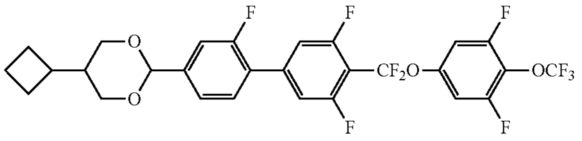
(IC-1)
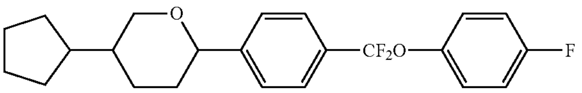
(IC-2)
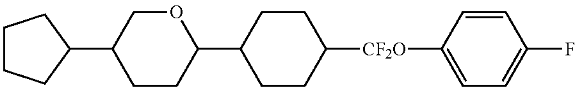
(IC-3)
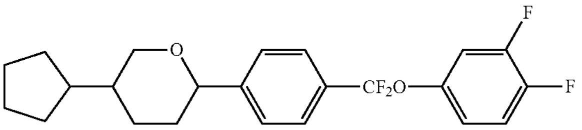
-continued
(IC-4)
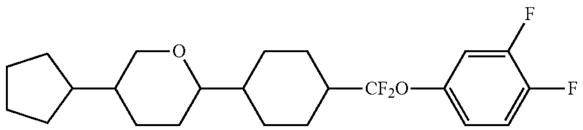
(IC-5)
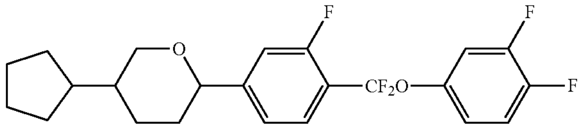
(IC-6)
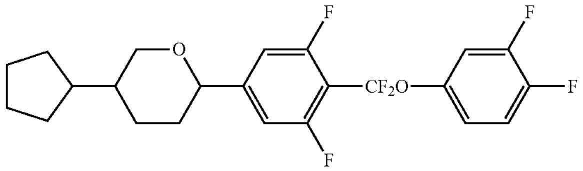
(IC-7)
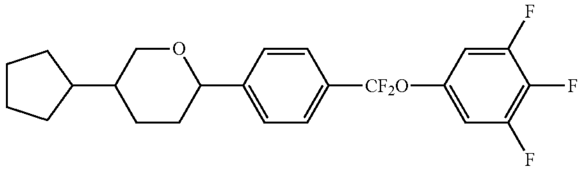
(IC-8)
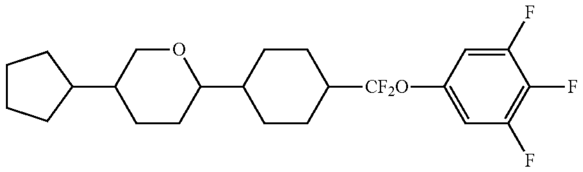
(IC-9)
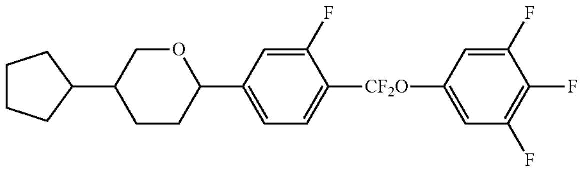
(IC-10)
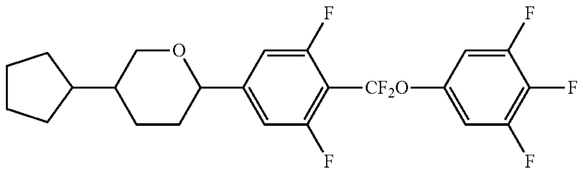
(IC-11)
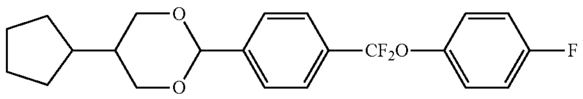
(IC-12)
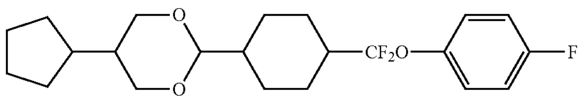

-continued
(IC -13)
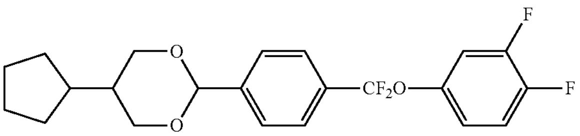
(IC -14)
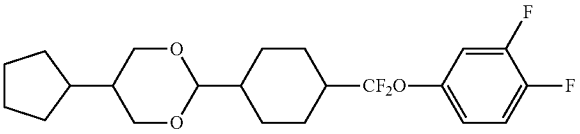
(IC -15)
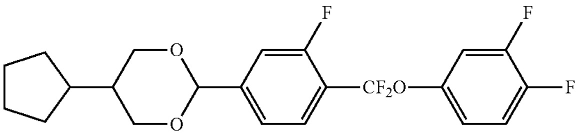
(IC -16)
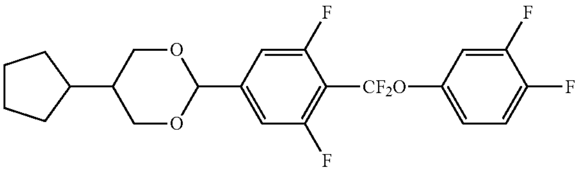
(IC -17)
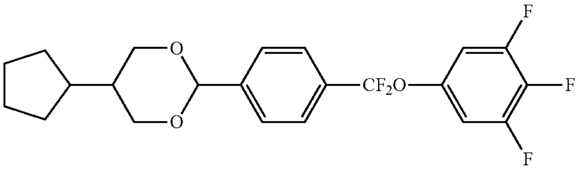
(IC -18)
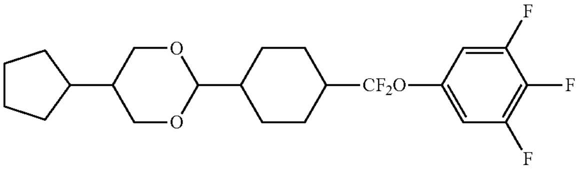
(IC -19)
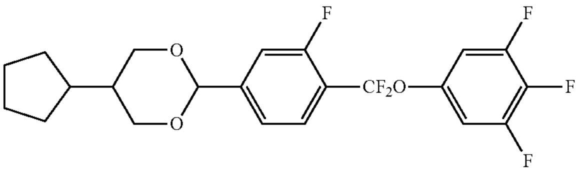
(IC -20)
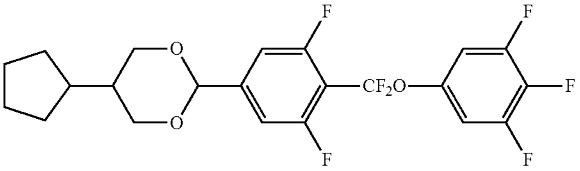
(IC -21)
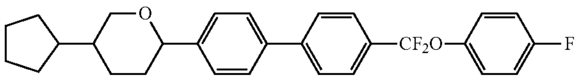
-continued
(IC -22)
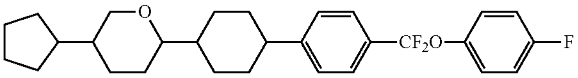
(IC -23)
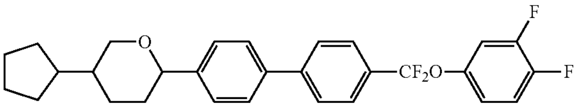
(IC -24)
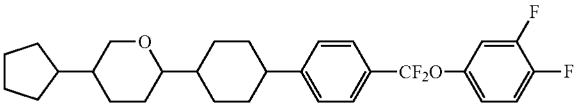
(IC -25)
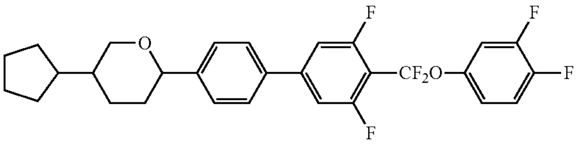
(IC -26)
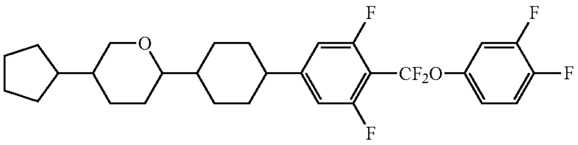
(IC -27)
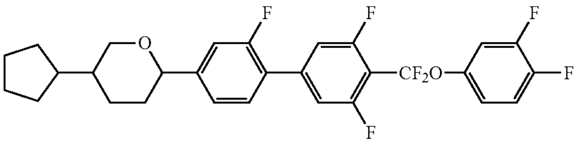
(IC -28)
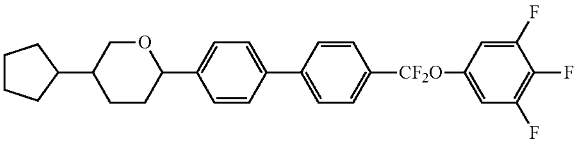
(IC -29)
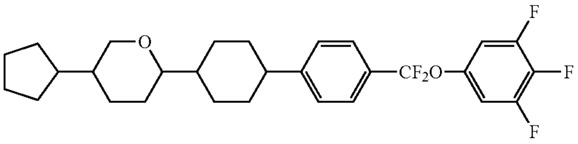
(IC -30)
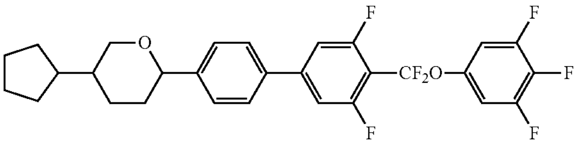
(IC -31)
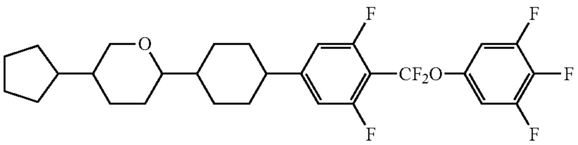

-continued
(IC -32)
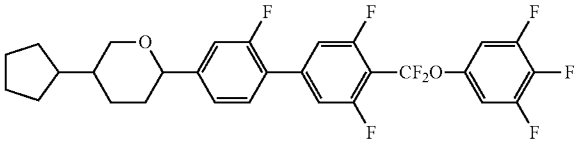
(IC -33)
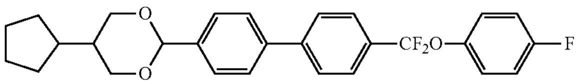
(IC -34)
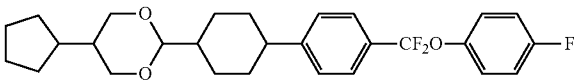
(IC -35)
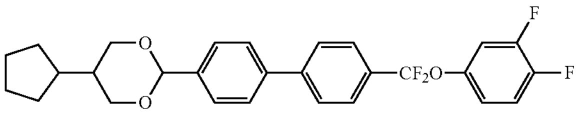
(IC -36)
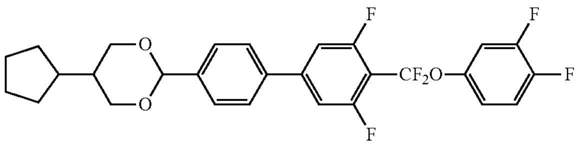
(IC -37)
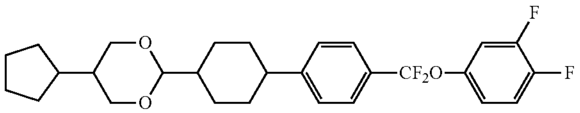
(IC -38)
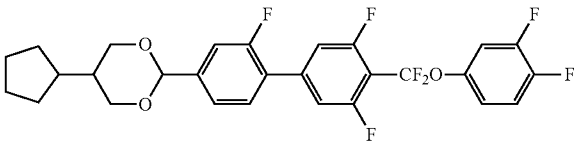
(IC -39)
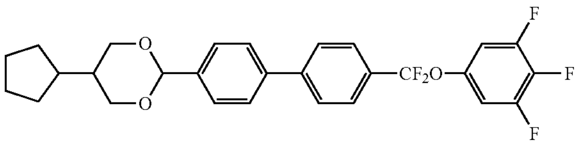
(IC -40)
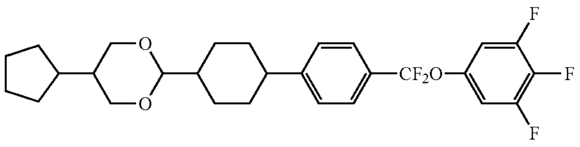
(IC -41)
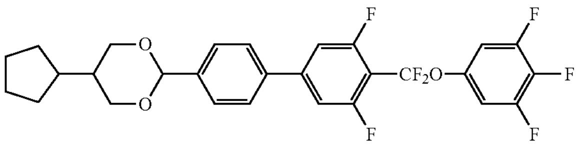
-continued
(IC -42)
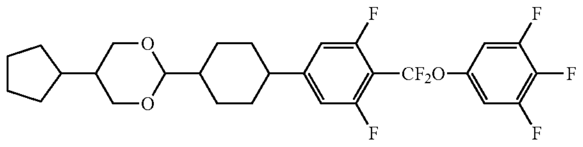
(IC -43)
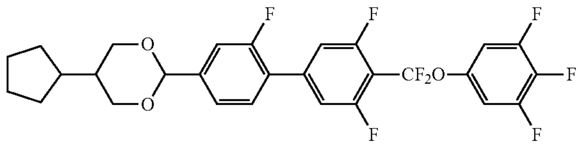
(ID -1)
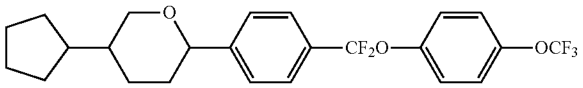
(ID -2)
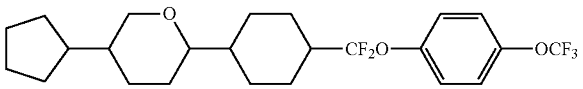
(ID -3)
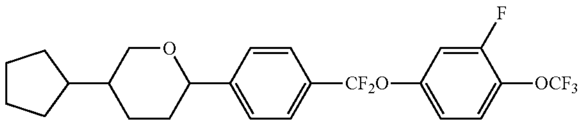
(ID -4)
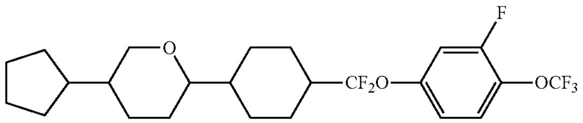
(ID -5)
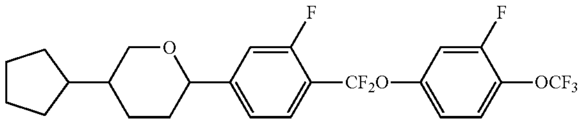
(ID -6)
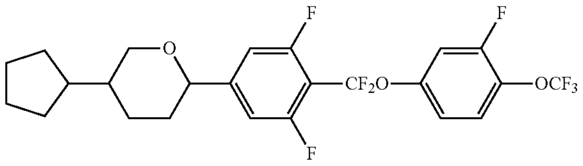
(ID -7)
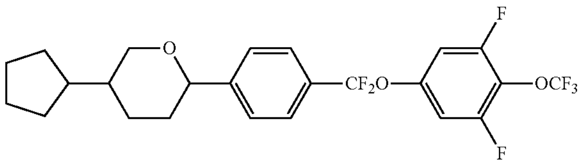
(ID -8)
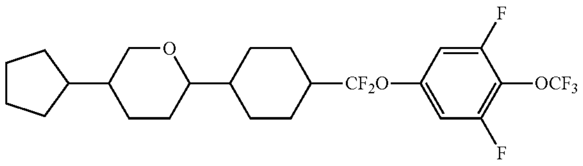

-continued
(ID -9)
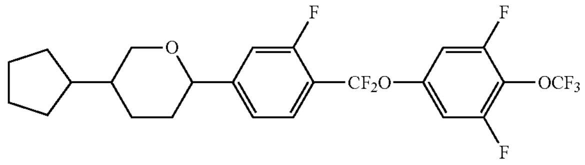
(ID -10)
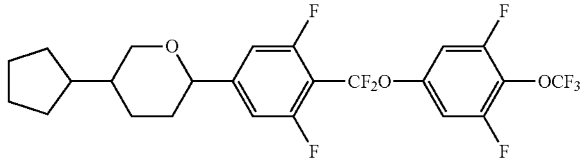
(ID -11)
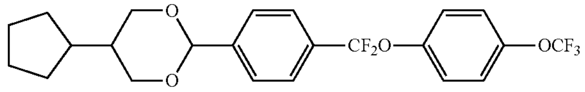
(ID -12)
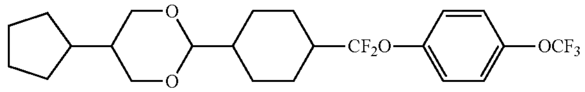
(ID -13)
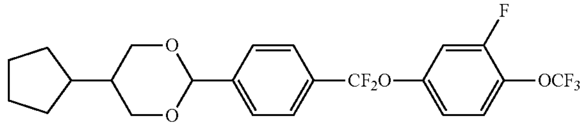
(ID -14)
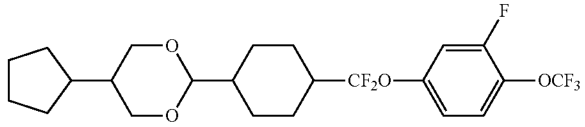
(ID -15)
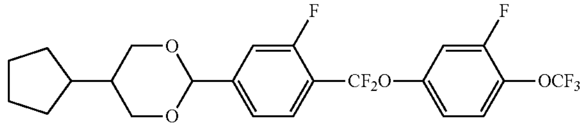
(ID -16)
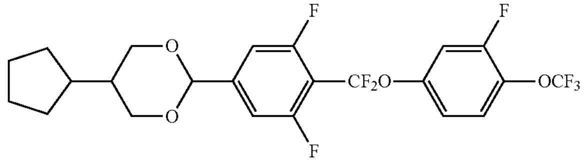
(ID -17)
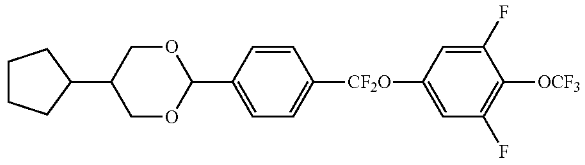
-continued
(ID -18)
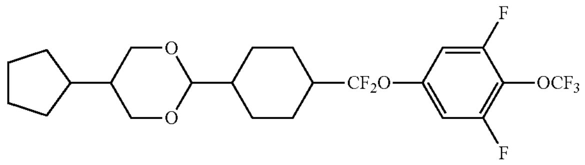
(ID -19)
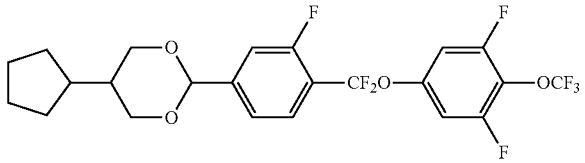
(ID -20)
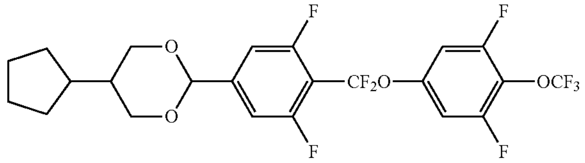
(ID -21)
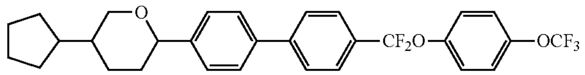
(ID -22)
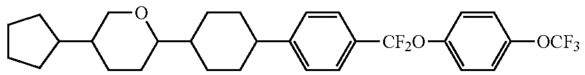
(ID -23)
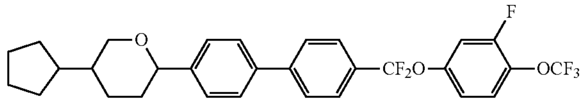
(ID -24)
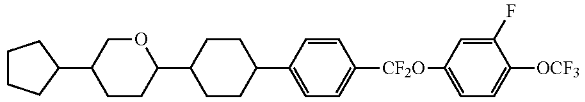
(ID -25)
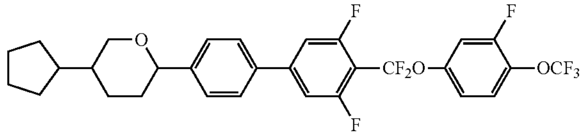
(ID -26)
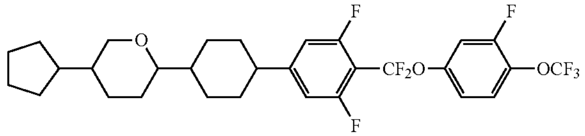
(ID -27)
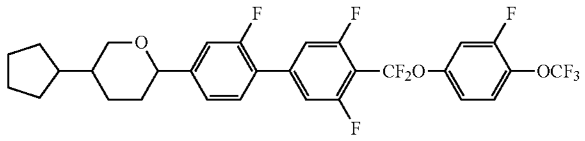

-continued (ID -28)

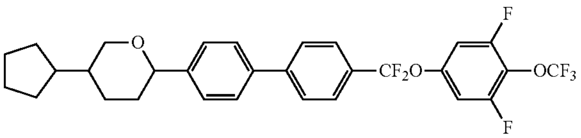

(ID -29)

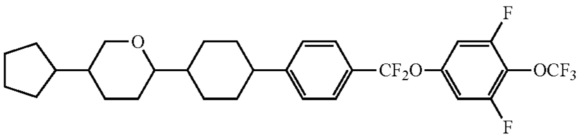

(ID -30)

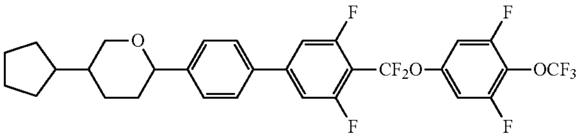

(ID -31)

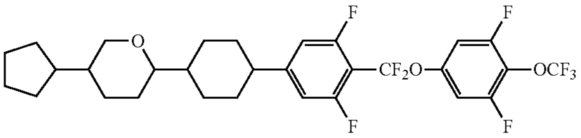

(ID -32)

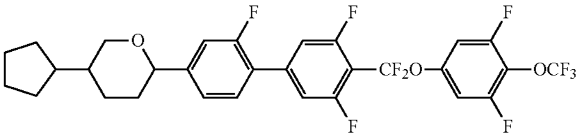

(ID -33)

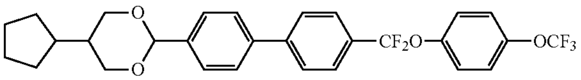

(ID -34)

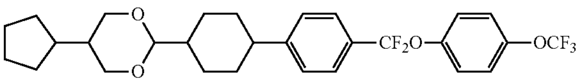

(ID -35)

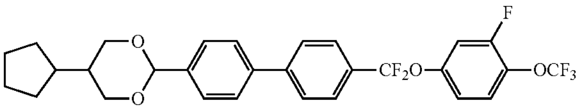

-continued (ID -36)

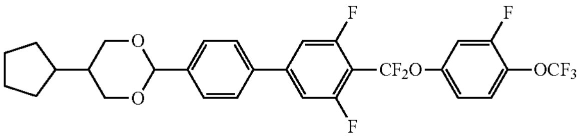

(ID -37)

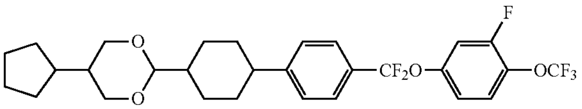

(ID -38)

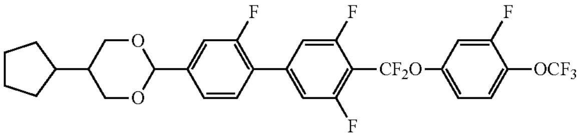

(ID -39)

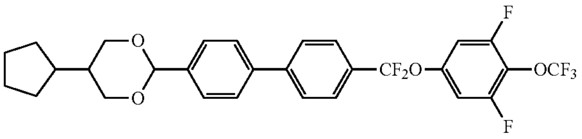

(ID -40)

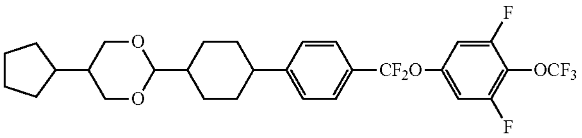

(ID -41)

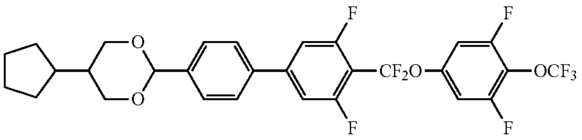

(ID -42)

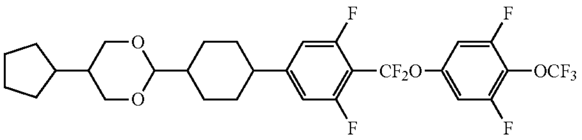

(ID -43)

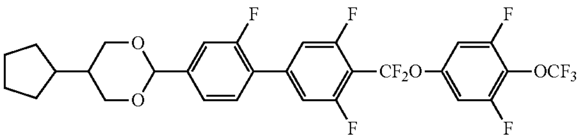

The compounds of the formula I are prepared by methods known per se, as described in the literature (for example in the standard works, such as Houben-Weyl, Methoden der organischen Chemie [Methods of Oranic Chemistry], Georg-Thieme-Verlag, Stuttgart), to be precise under reaction conditions which are known and suitable for the said reactions. Use can also be made here of variants which are known per se, but are not mentioned here in greater detail.

The compounds of the formula I can be prepared, for example, as follows:

Scheme 1
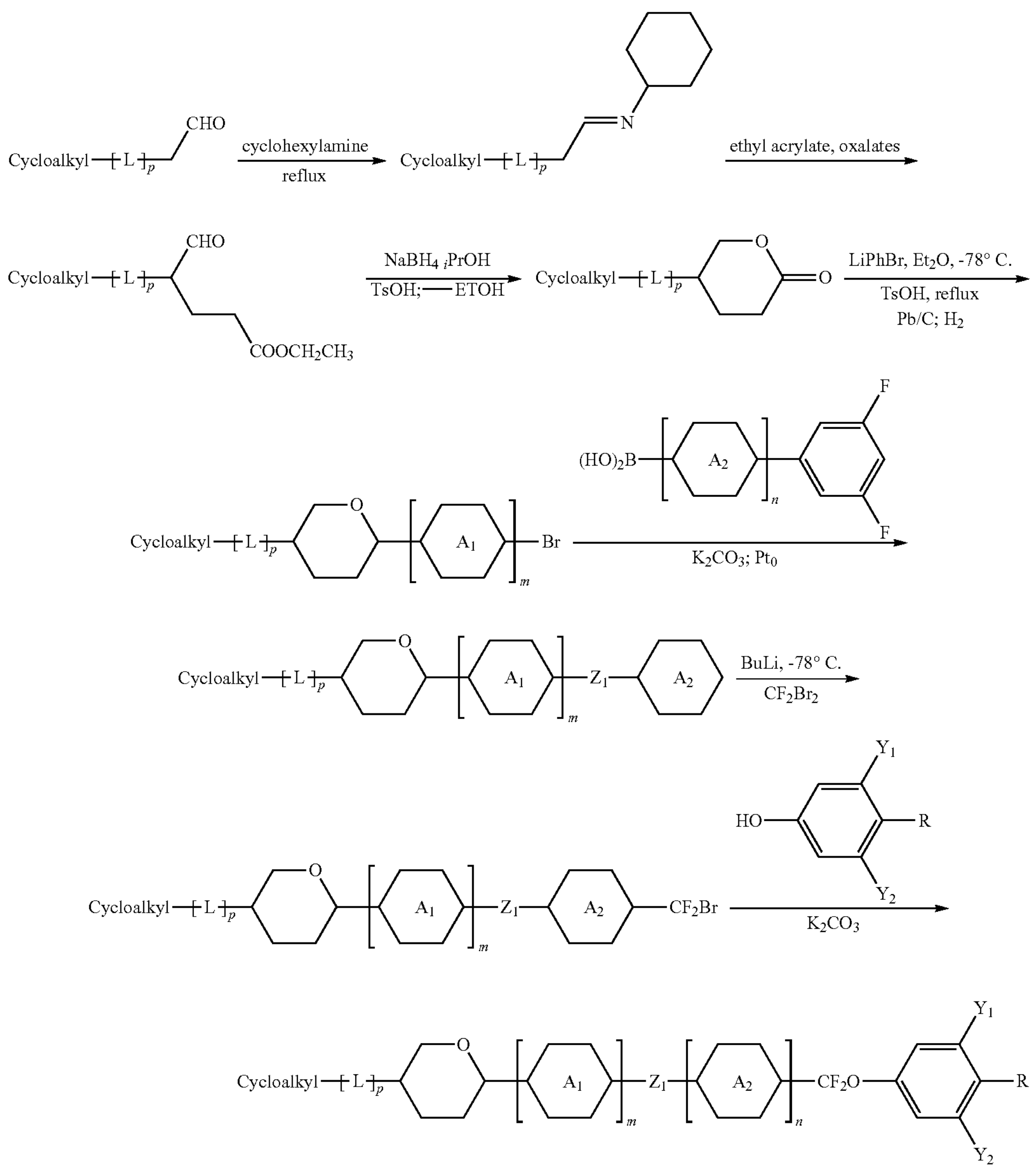
Scheme 2
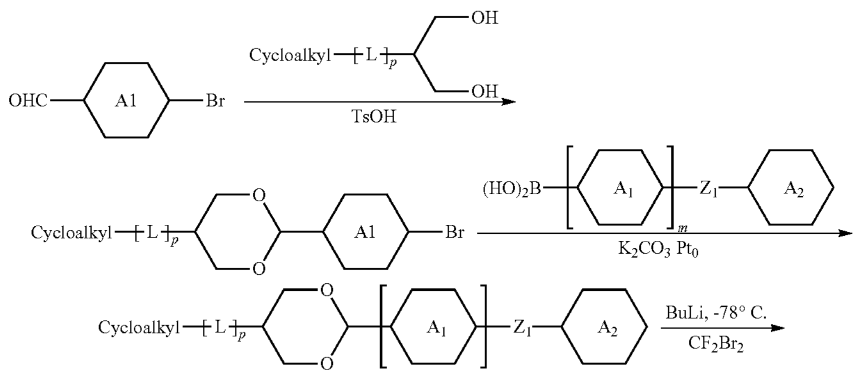

-continued
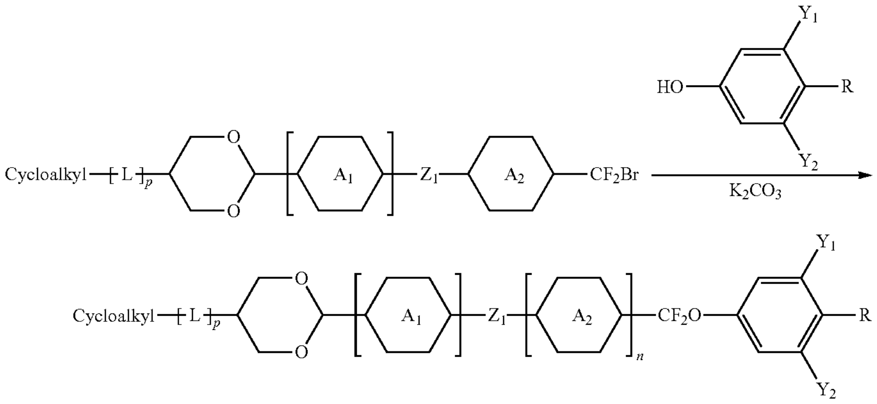
Scheme 3
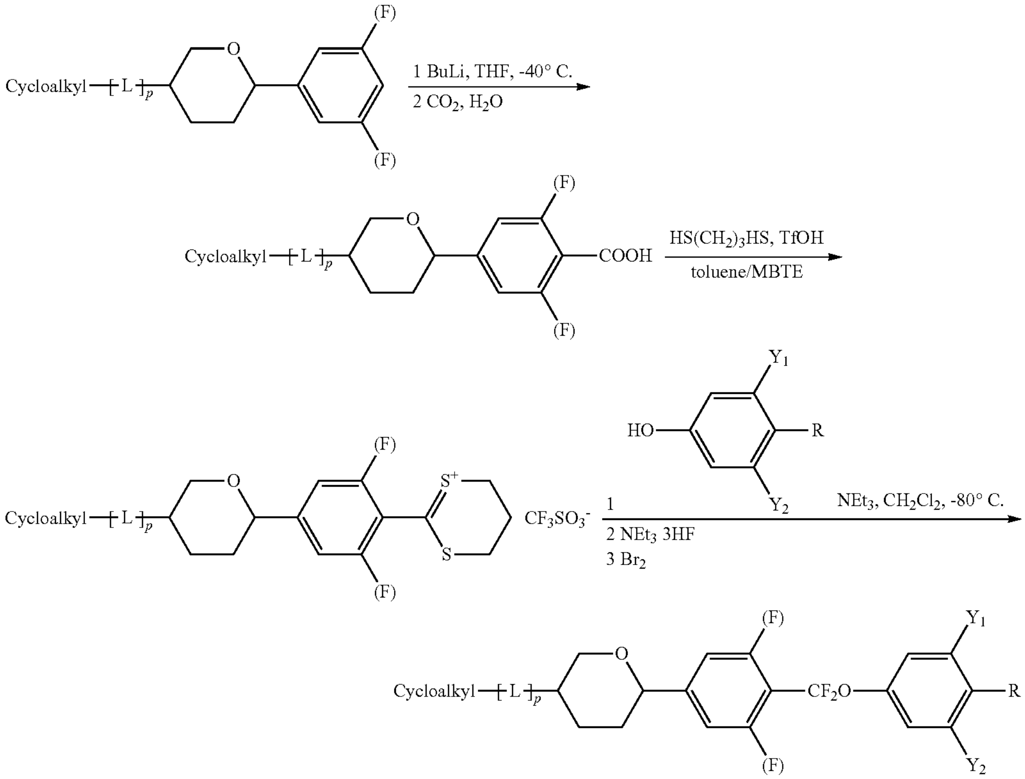
Scheme 4
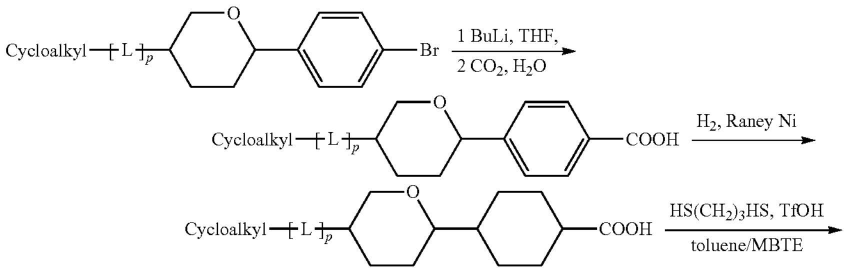

-continued
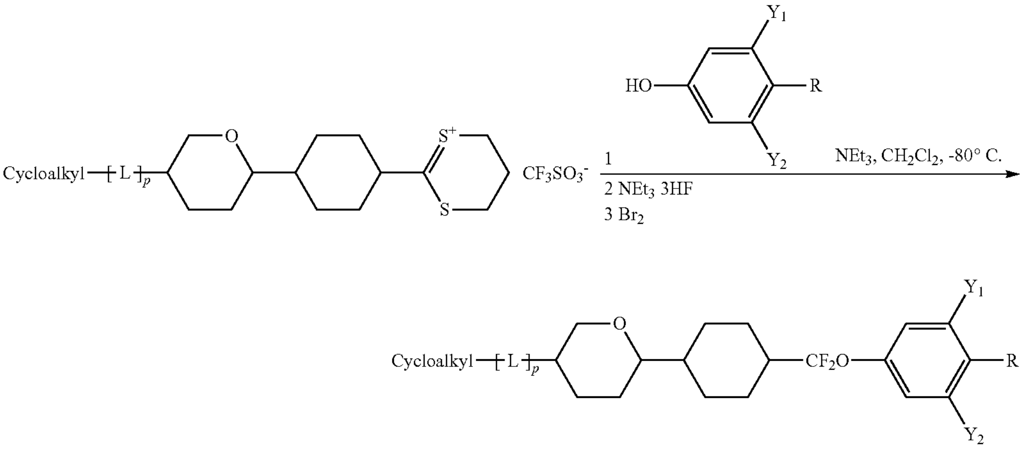
Scheme 5
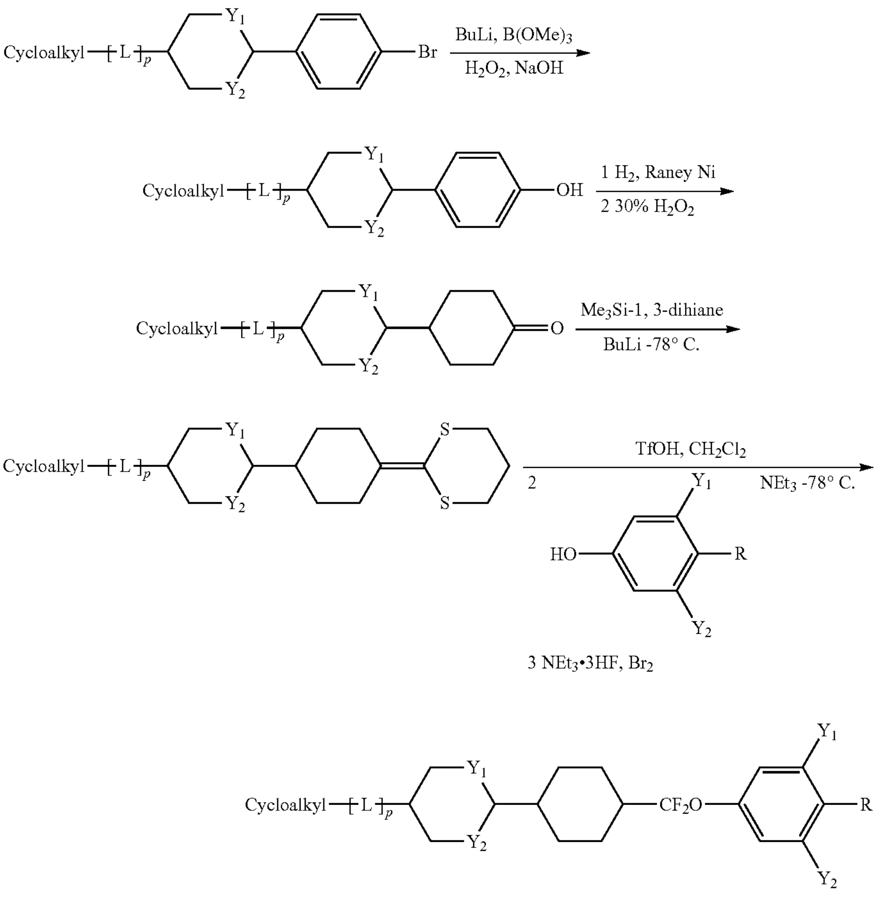
Scheme 6
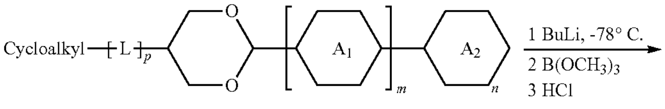

-continued

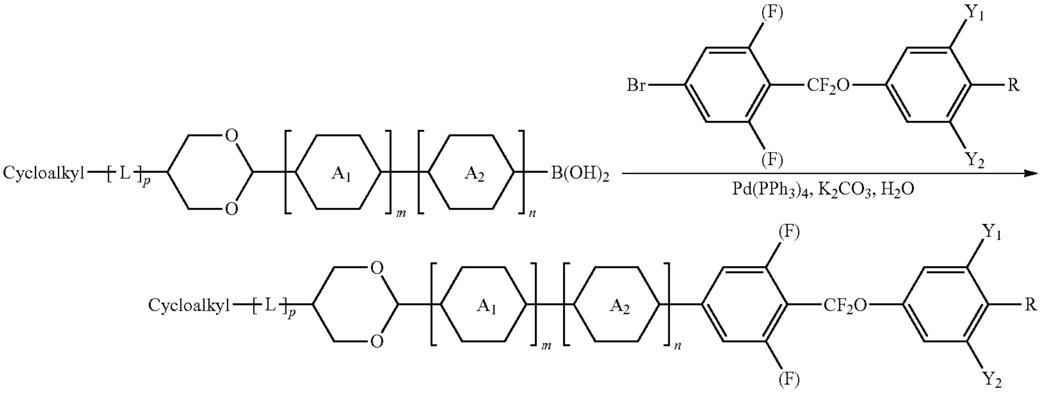

The media according to the invention are preferably based on a plurality of (preferably two, three or more) compounds of the formula I, i.e. The proportion of these compounds is 5-95%, preferably 10-60% and particularly preferably in the range 15-40%.

The individual compounds of the formula I to V and their sub-formula which can be used in the media according to the invention are either known or they can be prepared analogously to the known compounds.

Preferred embodiments are indicated below:

The medium preferably comprises one, two or three homologous compounds of the formula I, where each homologue is present in the mixture in a maximum amount of 10%.

Medium additionally comprises one or more compounds selected from the group consisting of the general formula II to V:

(II)

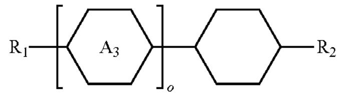

(III)

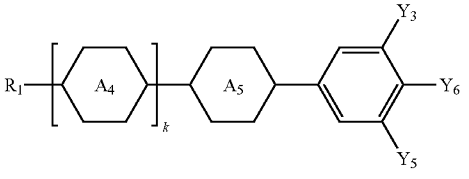

(IV)

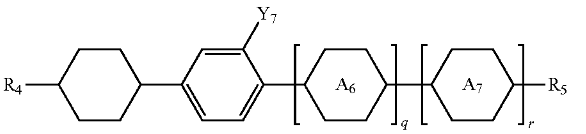

(V)

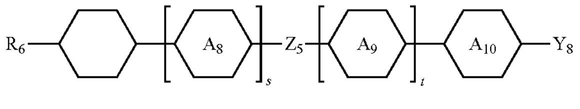

in which the individual radicals have the following meanings:

$R_1$, $R_2$, $R_3$, $R_4$, $R_5$ each, independently of one another, denote one of H, alkyl having 1-10 C atoms, alkoxy having 1-10 C atoms, alkenyl having 2-10 C atoms, alkenyloxy having 3-8 C atoms, or one or more H are fluorine-substituted alkyl having 1-10 C atoms, alkoxy having 1-10 C atoms, alkenyl having 2-10 C atoms, alkenyloxy having 3-8 C atoms at least.

$R_6$, $Y_6$, $Y_8$ each, are one of the radicals listed below:

①: —H, —Cl, —F, —CN, —OCN, $—OCF_3$, $—CF_3$, $—CHF_2$, $—CH_2F$, $—OCHF_2$, —SCN, —NCS, $—SF_5$,

②: Alkyl has 1-15 C atoms, alkoxy has 1-15 C atoms, alkenyl has 2-15 C atoms, or alkenyloxy has 2-15 C atoms, ③: The radicals mentioned in ②, one or more $—CH_2—$ are substituted by —CH═CH—, —C≡C—, —COO —, —OOC—, cyclobutane, cyclopentane, —O—, or —S— and 0 atoms don't link directly, ④: The radicals mentioned above ② and ③, one or more H are substituted by F or CL, $X_6$ denotes —H or —F, $Z_2$, $Z_3$, $Z_4$, $Z_5$ denote single bond, or $—CH_2—$, $—CH_2—CH_2—$, $—(CH_2)_3—$, $—(CH_2)_4—$, —CH═CH—, —C≡C—, —COO —, —OOC—, $—CF_2O—$, $—OCH_2—$, $—CH_2O—$, $—OCF_2—$, $—CF_2CH_2—$, $—CH_2CF_2—$, $—C_2F_4—$ or —CF═CF—,

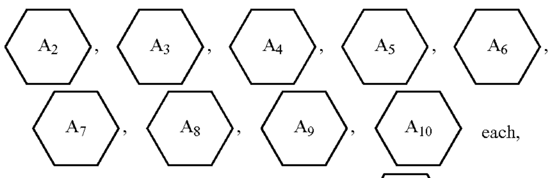

each, independently denote single bond,

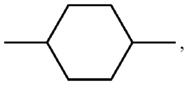

,

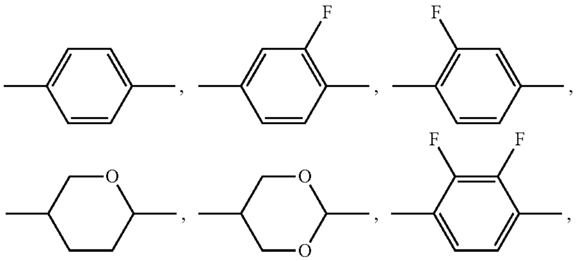

-continued

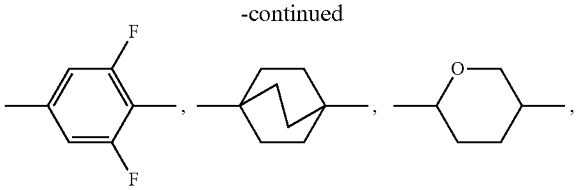

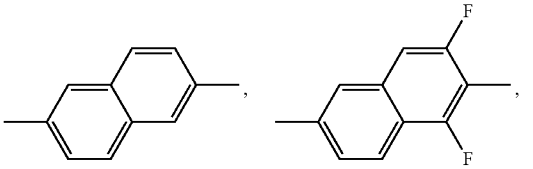

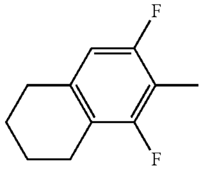

or

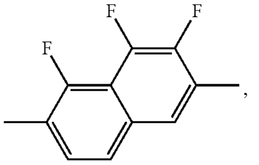

o, k, q, r, s, t denote 0-3, and q+r≤5, s+t≤5.

A LC mixture have polar singles containing a —$CF_2O$— bridge of claim 1, wherein the proportion of the compounds of the formula I in the mixture as a whole is 5 to 60%, the proportion of the compounds of the formula II in the mixture as a whole is 10 to 60%, the proportion of the compounds of the formula III in the mixture as a whole is 5 to 35%, the proportion of the compounds of the formula IV in the mixture as a whole is 5 to 30%, the proportion of the compounds of the formula Vin the mixture as a whole is 5 to 30%. The proportion of the compounds of the formula I to V as a whole is 100%. And the optically active compound 0~0.5% of the proportion of the compounds of the formula I to V as a whole.

The following examples are intended to explain the invention without restricting it. Above and below, percentages are percent by weight. All temperatures are given in degrees Celsius. Cp. denotes clearing point. Furthermore, C=crystalline state, N=nematic phase, S=semcitc phase and I=isotropic phase. The data between these symbols represent the transition temperatures. An denotes optical anisotropy (589 nm, 25° C.), Δ∈ the dielectric anisotropy (1 kHz, 25° C.). The rotational viscosity $\gamma_1$ (mPa·s) is likewise determined at 25° C., VHR (%) denotes voltage hold ratio (5V, 60 Hz, 20° C.), ρ ($\times 10^{13}$ Ω·cm) denotes electrical resistivity (20° C.).

EXAMPLE 1

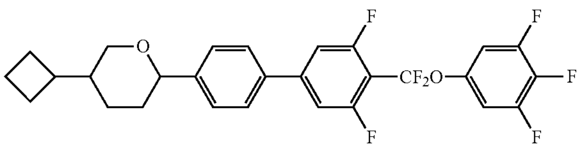

Step1.1

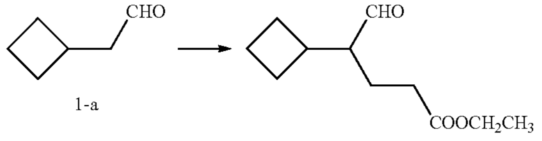

1-a 1-b 100 mmol of 1-a is dissolved in 30 ml of ether, and 100 mmol of cyclohexylamine and 60 mmol of potassium carbonate is added and stirred at room temperature for 8 hours. After cooling, the batch is filtered with a G5 sand core funnel which covered with a layer of 5 mm diatomite, the suspension is distillated under reduced pressure. 18 g of yellow oily liquids is gotten, and dissolved it in 250 mmol of ethyl acrylate, meanwhile 0.4 g of p-dihydroxy benzene is added, and the mixture is refluxed at 105° C. for 10 hours. Placed it to room temperature, 300 ml of THF is added and 200 ml of saturated oxalic acid aqueous solution is added dropwise, then the organic phase is extracted twice with 50 ml of ether, and the mixture is washed twice with 50 ml of water. The solution is dried with anhydrous magnesium sulfate, and filtered to separate the drying agent. The mixture is evaporated to dryness in a rotary evaporator, giving 19.5 g of brown residue. The residue is chromatographyed over silica gel, giving 12.5 g yellow oily liquids 1-b. Yield: 63.0%.

Step1.2

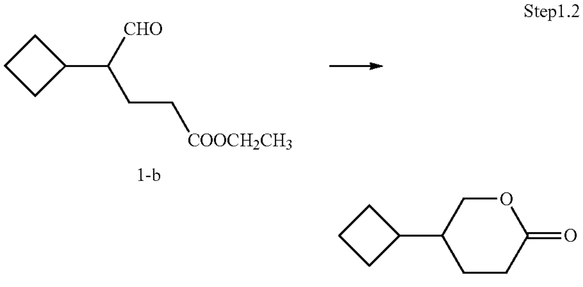

1-b 1-c

The 63 mmol of 1-b gotten from the first step is dissolved in 120 ml of propyl alcohol, and 69 mmol of crano sodium borohydride is added. After stirring for 3 hours at room temperature the mixture is adjusted to pH=3 by addition of 2 mol/L HCL. 100 ml of water is added to the reaction solution and extracted twice with 50 ml of methylbenzene, the organic phase is washed twice with 40 ml of water and dried with anhydrous magnesium sulfate. The organic phase is evaporated in a rotary evaporator. The residue is chromatographyed over silica gel, giving 6.6 g of yellow transparent liquids 1-c. Yield: 68.0%.

Step1.3

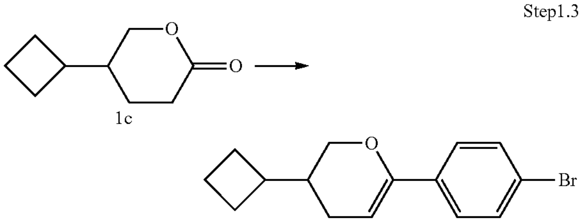

1c

1d 43 mmol of paradibromobenzene in 30 ml of THF are added dropwise to a solution of 45 mmol of magnesium chips in 30 ml of THF and get Grignard reagent. 43 mmol of 1-c in 20 ml of THF are added dropwise and refluxed for 1.5 hours. The mixture is poured into dilute HCL, and the aqueous phase is extracted with methylbenzene. The organic phase is washed to neutral and evaporated. 50 ml of methylbenzene and 0.5 g toluene-p-sulfonic acid are added to the product and refluxed to get rid of the water. Then petroleum ether is added to dissolve the crude product and chromatographyed over silica gel and subsequently recrystallised, giving 11.7 g of 1-d, Yield: 93.2%.

Step1.4

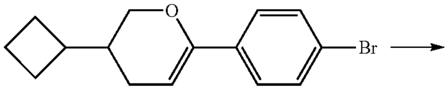

1d

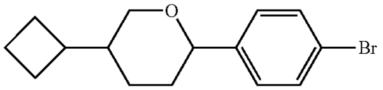

1e

A mixture of 40 mmol of 1-d, 60 ml of methylbenzene, 80 ml of ethanol and 1 g of Raney's nickel is vibrated for 6 hours to hydrogenation at room temperature and constant pressure. Then the mixture is filtered and the residual is evaporated, giving 11.6 g 1-e. Yield: 98.3%.

Step1.5

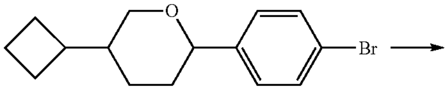

1-e

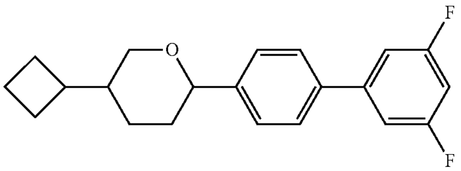

1-f 0.4 mmol of Pd ($PPh_3$) is added to the mixture of 39 mmol of 1-e, 43 mmol of 3,5-difluorophenylo boric acid, 40 ml of methylbenzene, 40 ml of ethanol, 150 ml of water, 2.6 g (0.24 mol) of sodium carbonate under nitrogen atmosphere. The mixture is heated to reflux for 5 hours. The aqueous phase is extracted with methylbenzene. The organic phase is washed with water to neutral and evaporated. The crude product is dissolved in 40 ml of petroleum ether and chromatographyed over silica gel, evaporated, subsequently recrystallised in 60 ml of ethanol, giving yellow crystal 1-f 11.8 g. Yield: 92.3%.

Step1.6

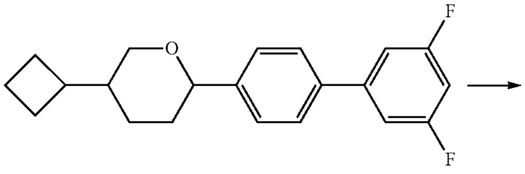

1-f

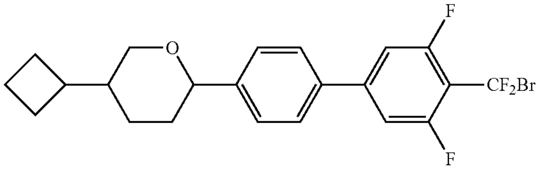

1-g 57 mmol of BuLi (15% in hexane) is added dropwise to the mixture of 36 mmol of 1-f, 50 ml of THF in 1 hour under nitrogen atmosphere at −60° C. The mixture is stirred for half an hour. Then the solution of 42 mmol Difluorodibromomethane in 20 ml THF is added dropwise to the mixture in half an hour at the same temperature. Then allowed to come to −40° C. (in 2 hours) and poured it to 2 ml of HCL in 33 ml of water, and the aqueous phase is extracted with petroleum ether once. The organic phase is washed to neutral with salt solution and evaporated. The crude yellow oily liquid is dissolved in petroleum ether and chromatographyed over silica gel, evaporated, giving 13.2 g of yellow solid 1-g. Yield: 55.6%.

Step1.7

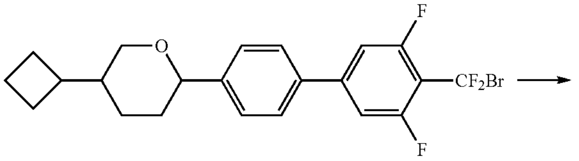

1-g

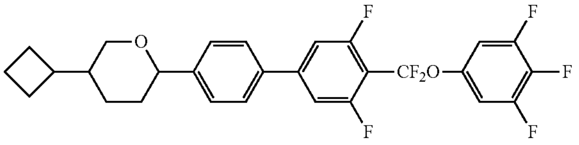

1-h

A mixture of 20 mmol of 1-g, 23 mmol of 3,4,5-Trifluoro phenol, 43 mmol of potassium carbonate, 80 ml of dimethyl sulfoxide are stirred at 60° C. for 3 hours. Then the mixture is poured into 150 ml of water, and the product is extracted with 30 ml petroleum ether twice. The resulting organic layer is washed with water and chromatographed over silica gel and subsequently recrystallised fourth from petroleum ether, giving white crystal 6.3 g 1-h. Yield: 60.1% C, 101.2; N, 134.5; I, $\Delta n$=0.139; $\Delta\epsilon$=27.2.

EXAMPLE 2

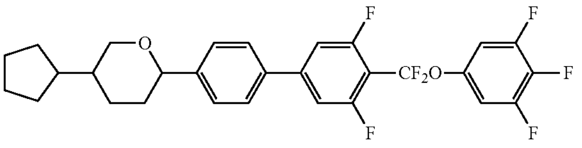

Step2.1

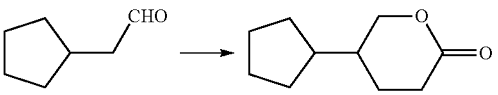

2-a 2-b

The method is as same as the Example 1, the crude material is changed to cyclopentyl acetaildehyde giving 6.72 g of 2-b at last.

Step2.2

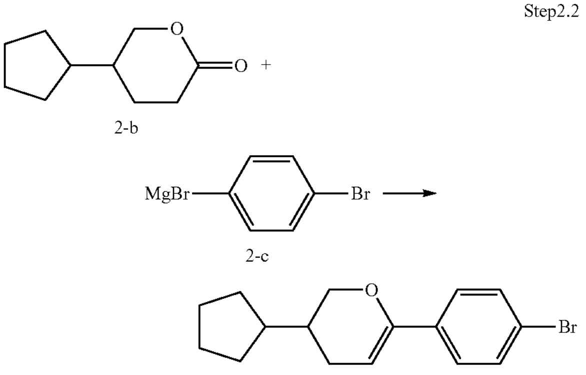

2-b 2-c 2-d 40 mmol of paradibromobenzene in 30 ml of THF are added dropwise to a solution of 42 mmol of magnesium chips in 30 ml of THF and get Grignard reagent. 40 mmol of 2-b in 20 ml of THF are added dropwise and refluxed for 1.5 hours. The mixture is poured into dilute HCL, and the aqueous phase is extracted with methylbenzene. The organic phase is washed to neutral and evaporated. 50 ml of methylbenzene and 0.5 g toluene-p-sulfonic acid are added to the product and refluxed to get rid of the water. Then petroleum ether is added to dissolve the crude product and chromatographyed over silica gel and subsequently recrystallised, giving 6.1 g of 2-d. Yield: 96.5%.

Step2.3

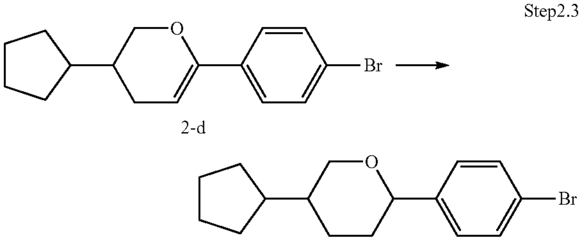

2-d 2-e

A mixture of 6.1 g of 2-d, 30 ml of methylbenzene, 40 ml of ethanol and 1 g of Raney's nickel is vibrated for 6 hours to hydrogenation at room temperature and constant pressure. Then the mixture is filtered and the residual is evaporated, giving 5.8 g 2-e. Yield: 98.2%.

Step2.4

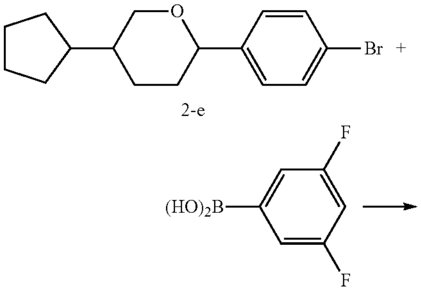

2-e 2-f

-continued

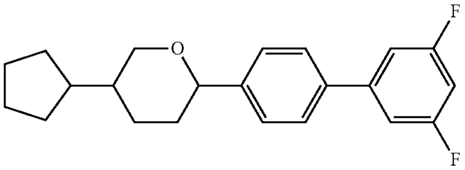

2-g 0.2 mmol of Pd $(PPh_3)_4$ is added to the mixture of 19 mmol of 2-e, 21 mmol of 3,5-diflurophenylo boric acid, 20 ml of methylbenzene, 20 ml of ethanol, 60 ml of water, 0.24 mol of sodium carbonate under nitrogen atmosphere. The mixture is heated to reflux for 5 hours. The aqueous phase is extracted with 100 ml methylbenzene. The organic phase is washed with water to neutral and evaporated. The crude product is dissolved in 20 ml of petroleum ether and chromatographyed over silica gel, evaporated, subsequently recrystallised in 30 ml of ethanol, giving yellow crystal 2-g 5.8 g. Yield: 90.0%.

Step2.5

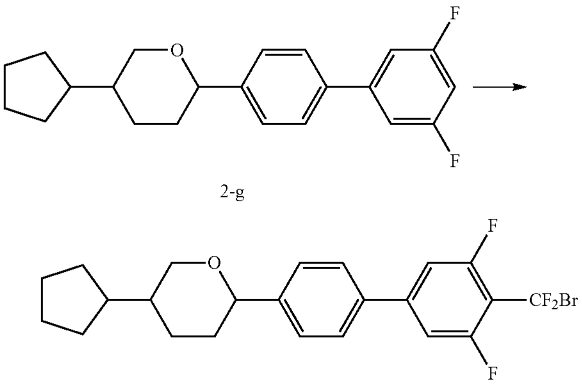

2-g 2-h 27.5 mmol of BuLi (15% in hexane) is added dropwise to the mixture of 17 mmol of 2-g, 20 ml of THF in 1 hour under nitrogen atmosphere at −60° C. The mixture is stirred for half an hour. Then the solution of 20 mmol Difluorodibromomethane in 7 ml THF is added dropwise to the mixture in half an hour at the same temperature. Then allowed to come to −40° C. (in 2 hours) and poured it to 2 ml of HCL in 33 ml of water, and the aqueous phase is extracted with petroleum ether once. The organic phase is washed to neutral with salt solution and evaporated. The crude yellow oily liquid is dissolved in petroleum ether and chromatographyed over silica gel, evaporated, giving 6.9 g yellow solid 2-h. Yield: 70.6%.

Step2.6

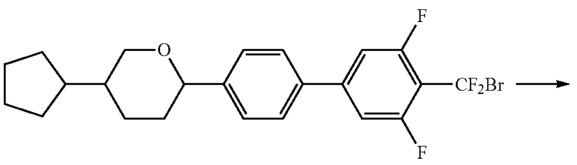

2-h

-continued

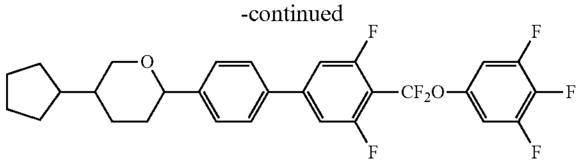

2-i

A mixture of 12 mmol of 2-h, 14 mmol of 3,4,5-Trifluoro phenol, 26 mmol of potassium carbonate, 50 ml of dimethyl sulfoxide are stirred at 60° C. for 3 hours. Then the mixture is poured into 100 ml of water, and the product is extracted with 15 ml petroleum ether twice. The resulting organic layer is washed with water and chromatographed over silica gel and subsequently recrystallised fourth from petroleum ether, giving white crystal 3.2 g 1-h. Yield: 50.4% C, 118.2; N, 156.3I, $\Delta n=0.148$; $\Delta\epsilon=28.4$.

The following compounds of the formula are prepared analogously:

(IA -21)

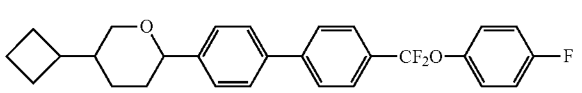

(IA -23)

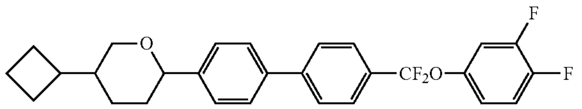

(IA -25)

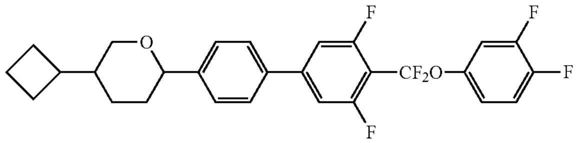

(IA -27)

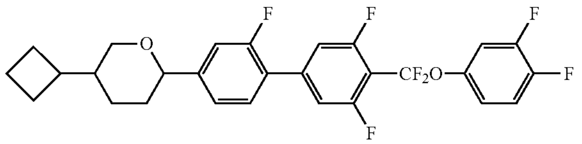

(IA -28)

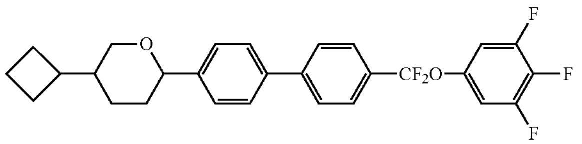

(IA -30)

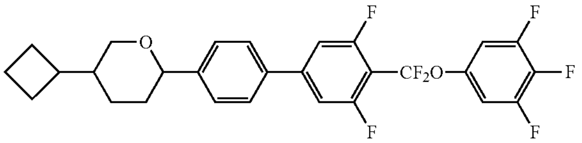

(IA -32)

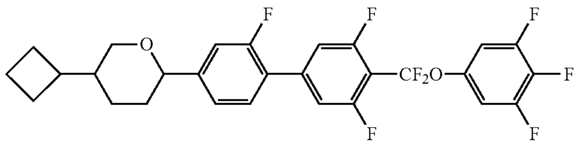

-continued (IB -21)

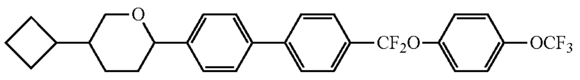

(IB -23)

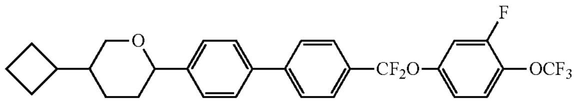

(IB -25)

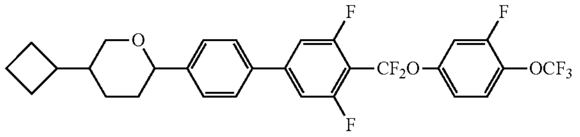

(IB -27)

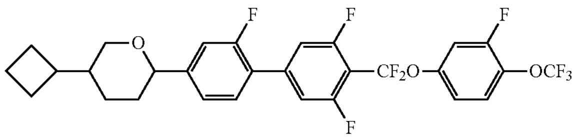

(IB -28)

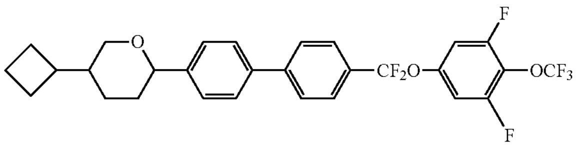

(IB -30)

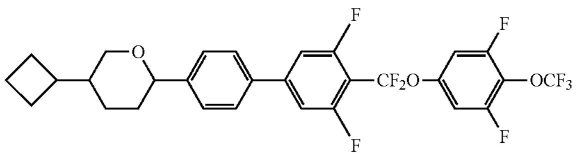

(IB -32)

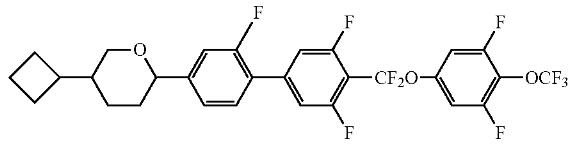

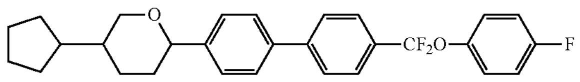

(IC -23)

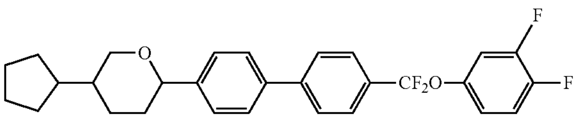

(IC -25)

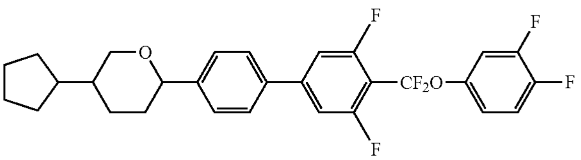

-continued (IC -27)

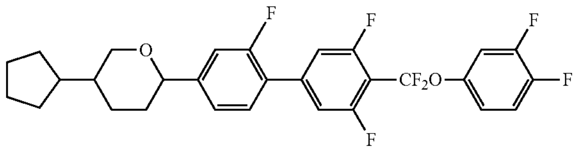

(IC -28)

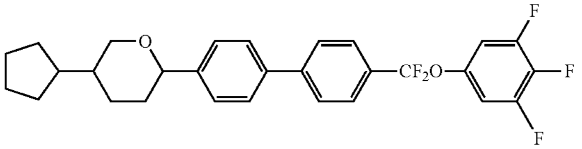

(IC -30)

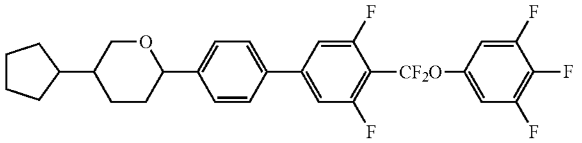

(IC -32)

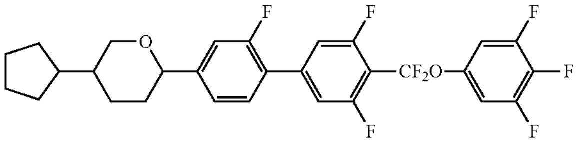

(ID -21)

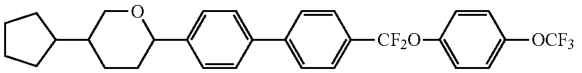

(ID -23)

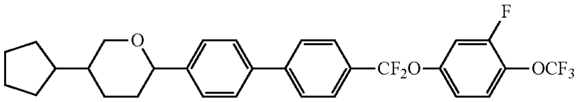

(ID -25)

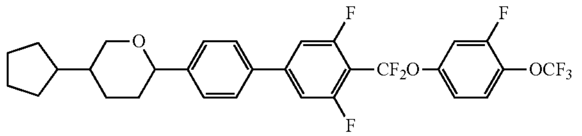

(ID -27)

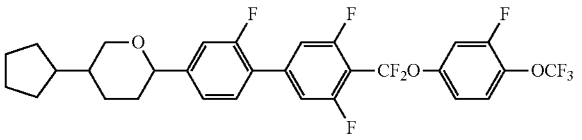

(ID -28)

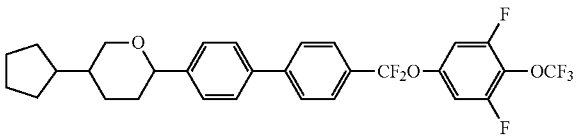

(ID -30)

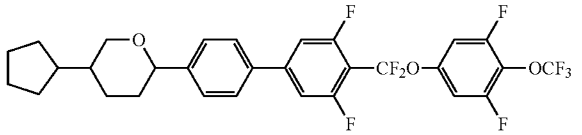

-continued (ID -32)

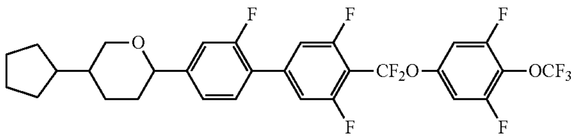

EXAMPLE 3

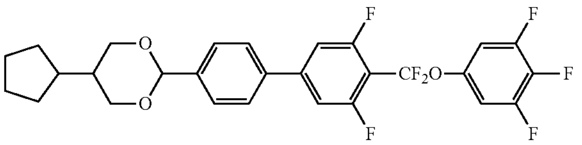

Step3.1

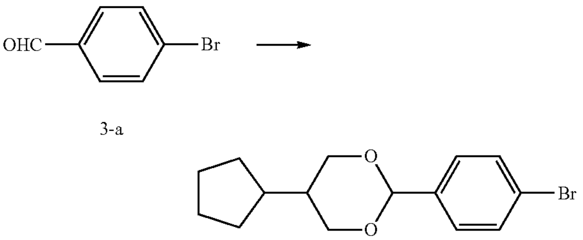

3-a 3-b 250 ml of 3-a and 1 mol of 2-cyclopentyl-1,3-propylenediol are dissolved in 300 ml of methylbenzene, and 8 mmol of p-toluenesulfonic acid is added. The mixture is heated to reflux and stirred for 4 hours. The mixture evaporated to dryness in a rotary evaporator. The residue is purified by column chromatography (silica gel/petroleum ether), giving 25.4 g of yellow oily liquids 3-b. Yield: 81.6%.

Step3.2

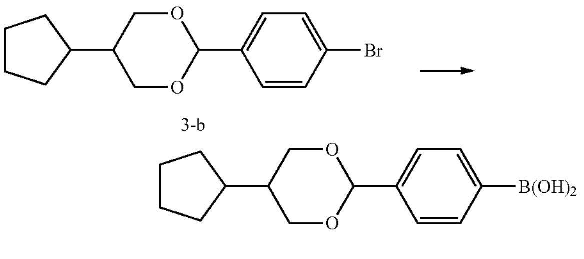

3-b 3-c 200 mmol of 3-b is dissolved in 500 ml of THF and cooled to −70° C. Firstly 200 mmol of BuLi (15% in hexane) followed by 200 mmol of trimethyl borate in 150 ml of THF are added dropwise. The mixture is allowed come to −30° C., adjusted to pH=2 by addition of 2 mol/L HCl and subjected to aqueous work-up. The crude product is digested with hot petroleum ether and crystallized at 0° C., giving 41.2 g of white solid 3-c. Yield: 74.6%.

Step3.3

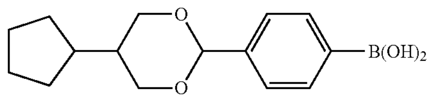

+

3-c

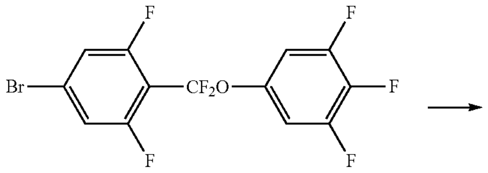

3-d

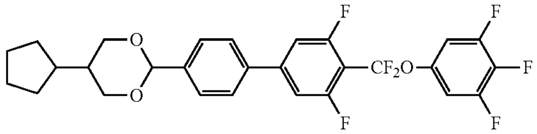

3-e

A mixture of 9 mmol of 3-c, 149 mmol of 3-d, 0.4 mmol of Pd $(PPh_3)_4$, 600 ml of methylbenzene and 600 ml of Na borate buffer (pH=9) is stirred at 80° C., for 20 hours. The mixture is poured into 0.3 mol/L HCL 100 ml, and the product is extracted with $CH_2Cl_2$, dried over $Na_2SO_4$ and evaporated to dryness in a rotary evaporator. The crude product is purified by column chromatography (silica gel/petroleum ether) and subsequently recrystallised from petroleum ether at −20° C., giving 74.2 g of 3-e. Yield: 92.2%. C, 132; N, 168.2; I, $\Delta n$=0.1346; $\Delta\epsilon$=29.2.

The following compounds of the formula are prepared analogously:

(IA -33)

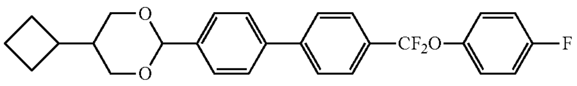

(IA -35)

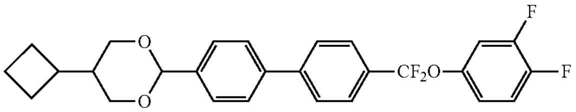

(IA -36)

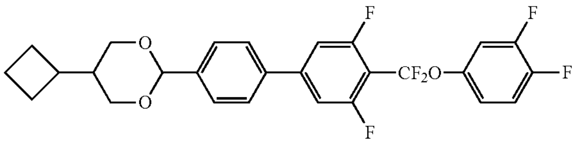

(IA -38)

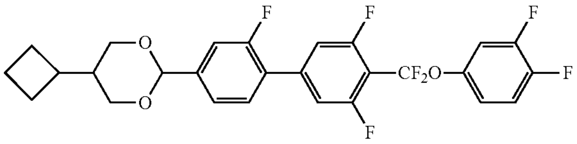

-continued (IA -39)

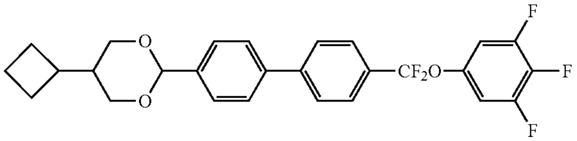

(IA -41)

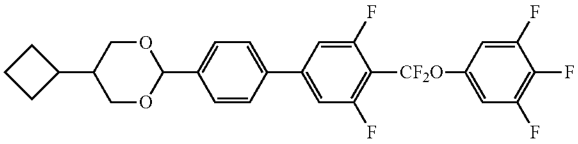

(IA -43)

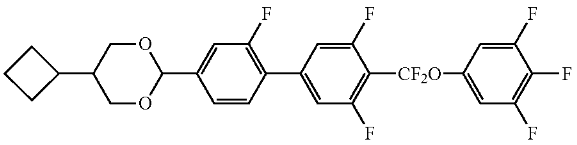

(IB -33)

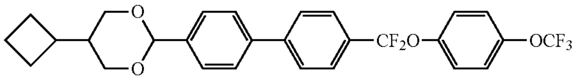

(IB -35)

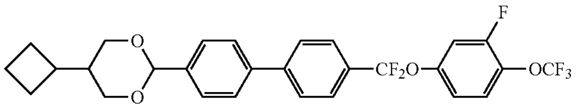

(IB -36)

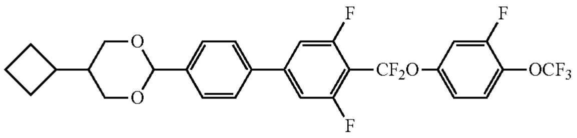

(IB -38)

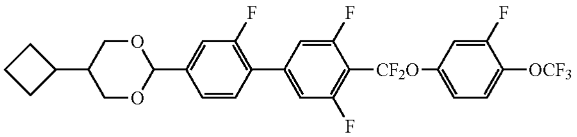

(IB -39)

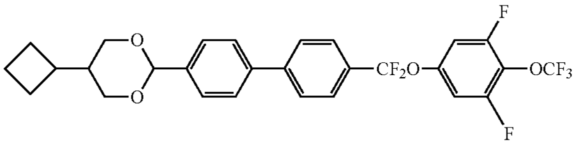

(IB -41)

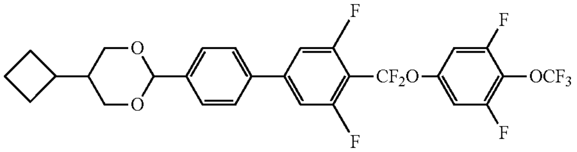

(IB -43)

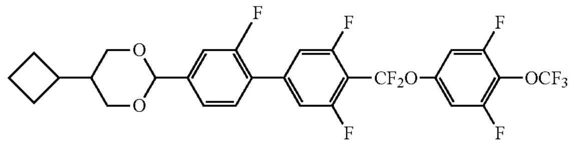

-continued (IC -33)

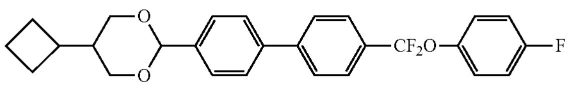

(IC -35)

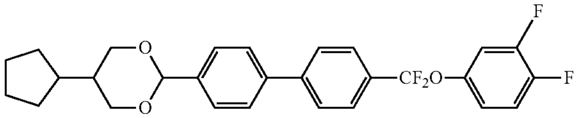

(IC -36)

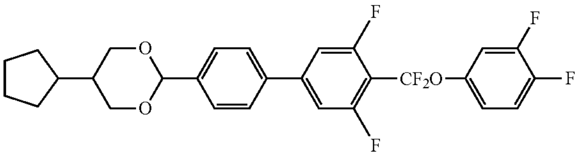

(IC -38)

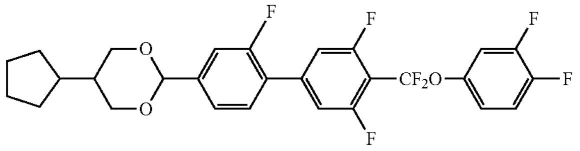

(IC -39)

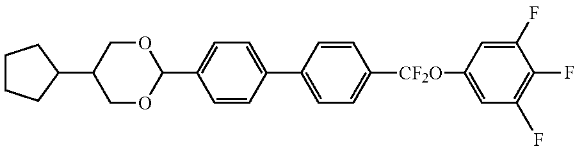

(IC -41)

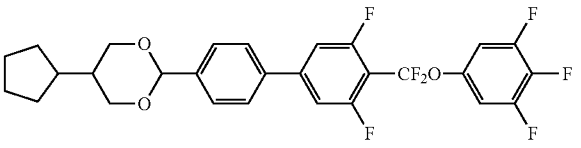

(IC -43)

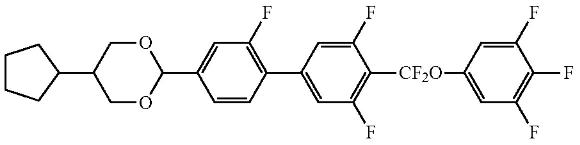

(ID -33)

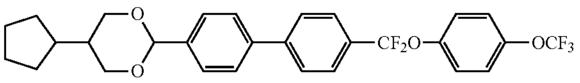

(ID -35)

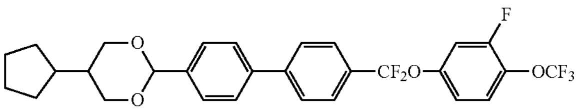

(ID -36)

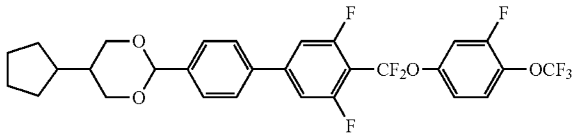

-continued (ID -38)

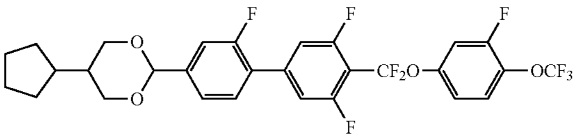

(ID -39)

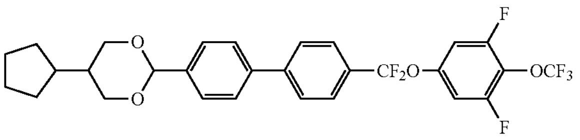

(ID -41)

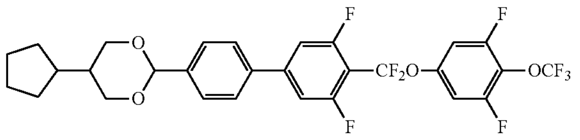

(ID -43)

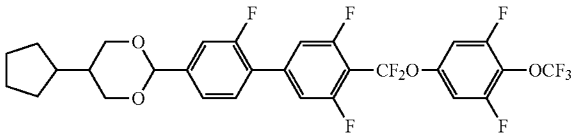

EXAMPLE 4

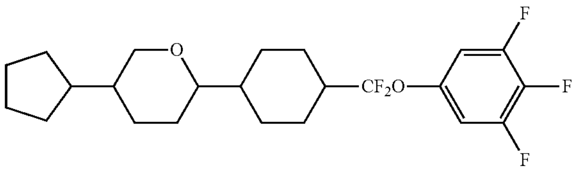

Use the 2-e gotten from Example 2 as the crude material.

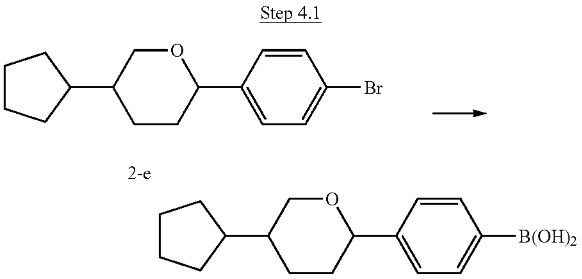

2-e 4-a 80 mmol of 2-e is dissolved in 200 ml of THF and cooled to −70° C. Firstly 80 mmol of BuLi (15% in hexane) followed by 80 mmol of trimethyl borate in 60 ml of THF are added dropwise. The mixture is allowed come to −30° C., adjusted to pH=2 by addition of 2 mol/L HCL and subjected to aqueous work-up. The crude product is digested with hot heptanes and crystallized at 0° C., giving 17.5 g of white solid. Yield: 79.8%.

Step4.2

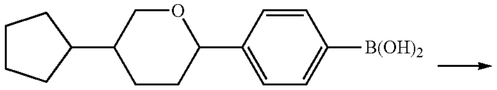

4-a

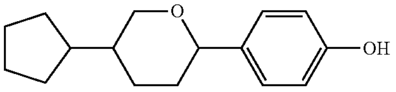

4-b

A mixture of 60 mmol of 4-a, 300 ml of methylbenzene, 120 mmol of NaOH, 50 ml of water and 30 ml of 30% $H_2O_2$ is stirred at 45° C. for 2 hours. The mixture is adjusted to pH=2 by addition of 10% HCL and subjected to aqueous work-up. The crude product is recrystallised from heptane, giving 6.7 g of white crystal. Yield: 45.4%.

Step4.3

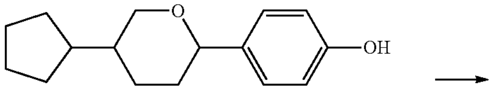

4-b

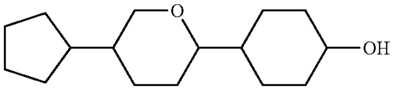

4-c 27 mmol of 4-b is hydrogenated at 15 MP pressure and 130° C. for 10 hours in 100 ml solution (methylbenzene: ethanol=1:5) in the presence of 1.5 g of Raney's nickel catalyst. Conventional work-up gives 6.4 g of white solid 4-c. Yield: 94.1%.

Step4.4

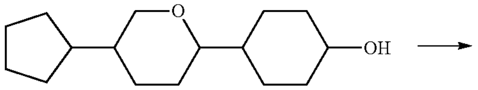

4-c

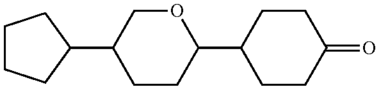

4-d 25 mmol of 4-c is dissolved in 50 ml of methylbenzene, and 20 ml of 30% $H_2O_2$ is added. The mixture stirred at 45° C. for 2 hours. Then the mixture is distillated under reduced pressure, giving 5.5 g of colorless oily liquid 4-d. Yield: 88.0%.

Step4.5

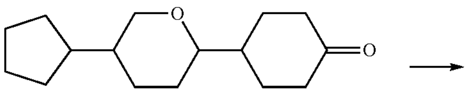

4-d

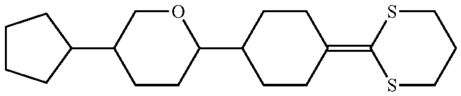

4-e 24.2 mmol of BuLi (15% in hexane) are added into 24.2 mmol of 2-trimethylsilyl-1,3-dithiane in 80 ml of THF at −70° C. After 4 hours, the mixture is allowed to −10° C., and then cooled to −78° C. A solution of 22 mmol of 4-d in 25 ml of THF are added, the mixture is allowed to come to room temperature and stirred for 15 hours. After conventional work-up, the crude product is recrystallised from heptane, giving 3.27 g of colorless solid 4-e. Yield: 42.3%.

Step4.6

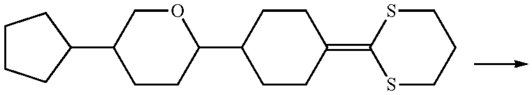

4-e

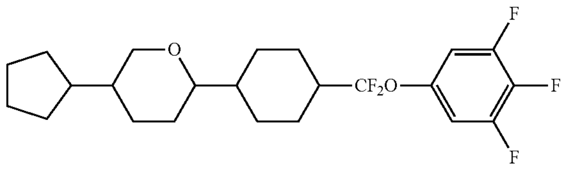

4-f 9.5 mmol of trifluoromethanesulfonic acid are added dropwise at −20° C. to a solution of 9.3 mmol of 4-e in 60 ml of $CH_2Cl_2$. The mixture is allowed to come to room temperature for 30 minutes and then cooled to −78° C. Firstly a solution of 14 mmol of 3,4,5-Trifluoro phenol and 15.4 mmol of trithylamine in 30 ml of $CH_2Cl_2$ and 5 minutes later 38 mmol of triethylamine tris(hydrofluoride) are added. Then a solution of 39 mmol of $Br_2$ in 40 ml of $CH_2Cl_2$ is added. The mixture is stirred at −70° C. for 1 hour. The reaction mixture is allowed to come to −10° C., and is poured into 450 ml of 4 mol/L ice-cold NaOH. The mixture is subjected to conventional aqueous work-up, and the crude product is purified by chromatography on silica gel (heptanes/MTB ether 1:1) and recrystallised from petroleum ether at −50° C., giving 1.6 g of colorless solid 4-f. Yield is 39.8%. C, 55.2; N, 80.51; $\Delta n=0.0640$; $\Delta\epsilon=14.6$.

The following compounds of the formula are prepared analogously:

(IA-2)

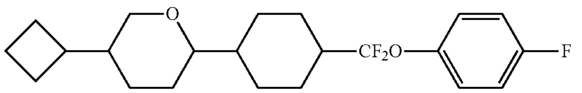

-continued
(IA -4)
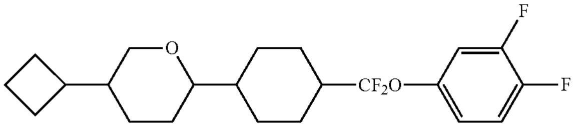
(IA -8)
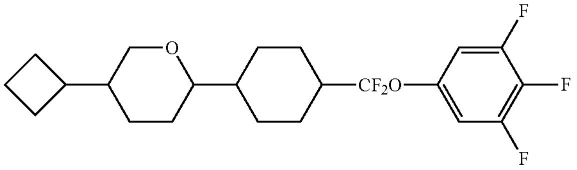
(IA -12)
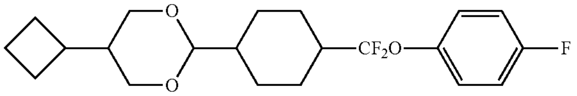
(IA -14)
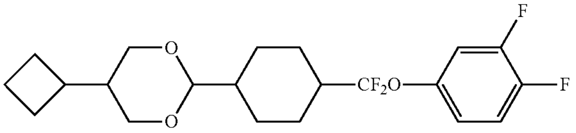
(IA -18)
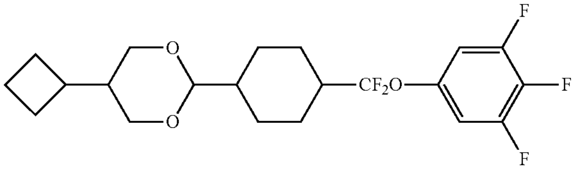
(IB -2)
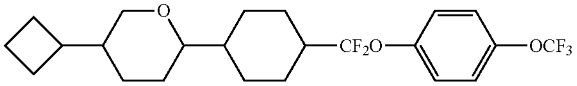
(IB -4)
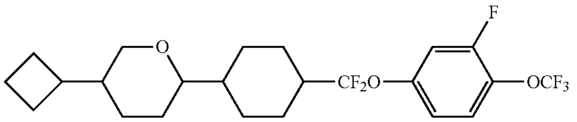
(IB -8)
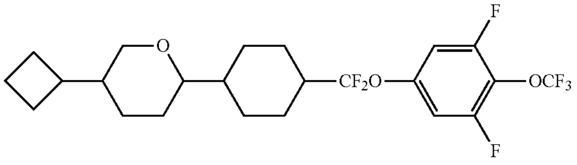
(IB -12)
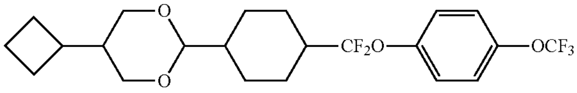
(IB -14)
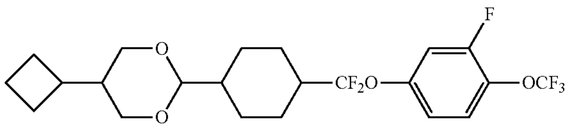
-continued
(IB -18)
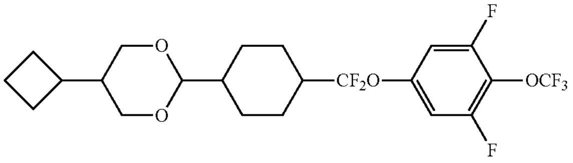
(IC -2)
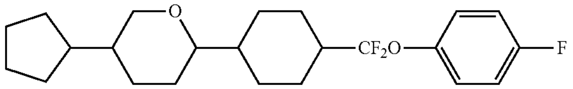
(IC -4)
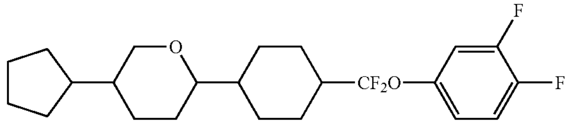
(IC -8)
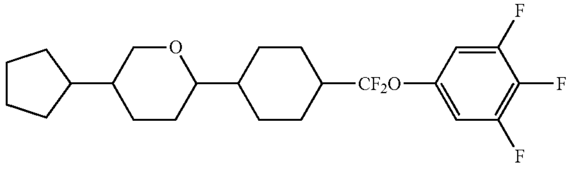
(IC -12)
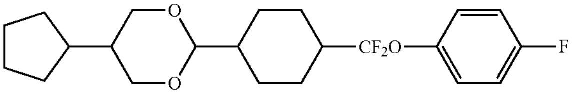
(IC -14)
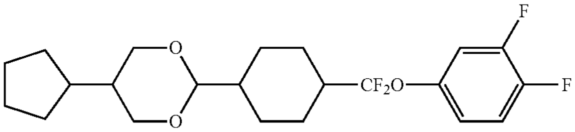
(IC -18)
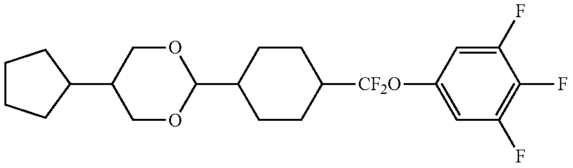
(ID -2)
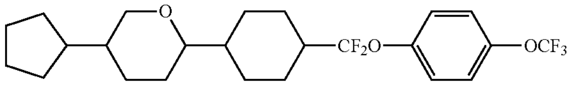
(ID -4)
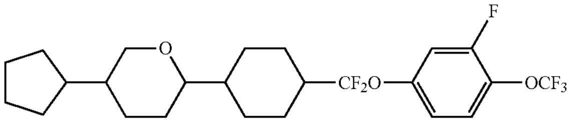
(ID -8)
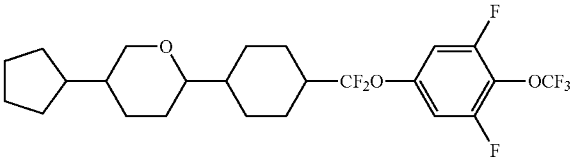

-continued (ID -12)

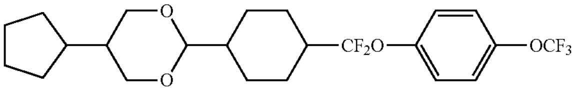

(ID -14)

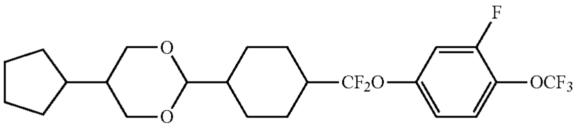

(ID -18)

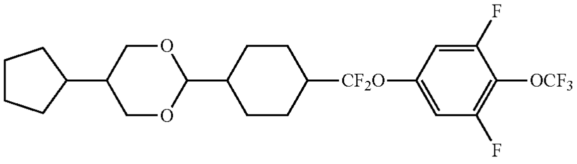

EXAMPLE 5

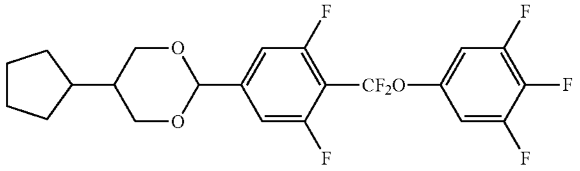

Step 5.1

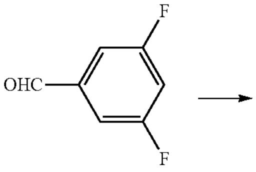

5-a

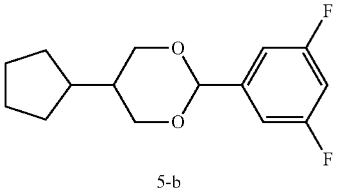

5-b 100 mmol of 5-a and 400 mmol of 2-cyclopentyl-1,3-propylenediol are dissolved in 100 ml of methylbenzene, 0.9 g of p-toluenesulfonic acid is added, then heat to reflux, and stirred for 4 hours. The mixture evaporated to dryness in a rotary evaporator. The mixture is purified by chromatography on silica gel with petroleum ether, giving 23.9 g colorless oil 5-b. Yield: 89.3%.

Step 5.2

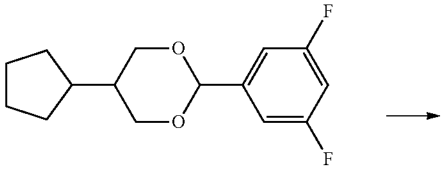

5-b

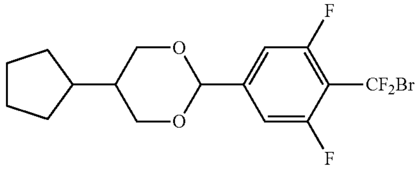

5-c 130 mmol of BuLi (15% in hexane) are added dropwise at −60° C. to a solution of 89 mmol of 5-b in 120 ml of THF under nitrogen atmosphere. The mixture is stirred for a further 30 minutes at the same temperature. A solution of 107 mmol of Difluorodibromomethane in 100 ml of THF is then added dropwise at the same temperature, and the mixture is stirred for a further 30 minutes, allowed to come to −40° C. The mixture is poured into 100 ml of 2 mol/L HCL, the product is extracted with 100 ml petroleum ether. The resulting organic layer is washed with water, dried over $Na_2SO_4$ and evaporated to dryness in a rotary evaporator. The crude product is chromatographed over silica gel in petroleum ether, giving 25.7 g of yellow solid 5-c. Yield: 72.8%.

Step 5.3

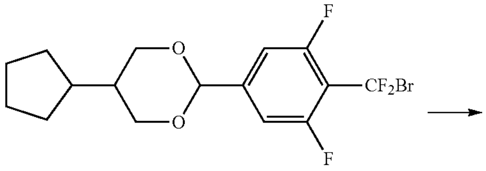

5-c

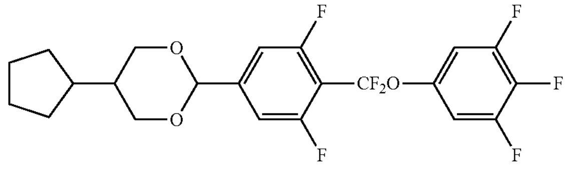

5-d

A mixture of 64 mmol of 5-c, 76 mmol of 3,4,5-Trifluoro phenol, 160 mmol of potassium carbonate, 250 ml of dimethyl sulfoxide are stirred at 60° C. for 3 hours. Then the mixture is poured into 500 ml of water, and the product is extracted with 150 ml petroleum ether twice. The resulting organic layer is washed with water, dried over $Na_2SO_4$ and evaporated to dryness in a rotary evaporator. The residue is chromatographed over silica gel in petroleum ether and subsequently recrystallised twice from petroleum ether at −20° C., giving 19.2 g of 5-d. Yield: 64.8%. C, 52.1; N, 93.2; I, Δn=0.081; ΔΔ=17.8.

The following compounds of the formula are prepared analogously:

-continued
(IA -1)
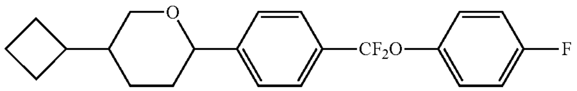
(IA -3)
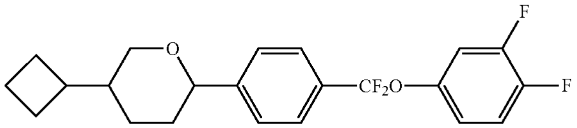
(IA -5)
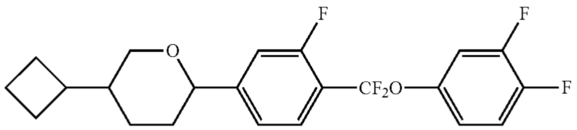
(IA -6)
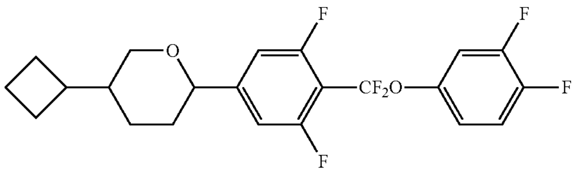
(IA -7)
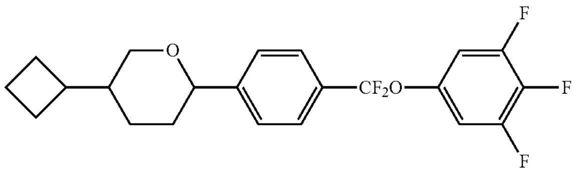
(IA -9)
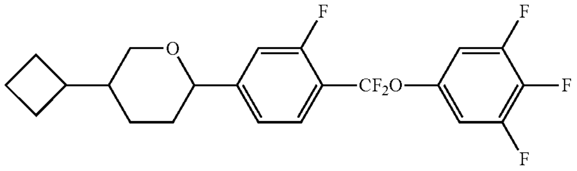
(IA -10)
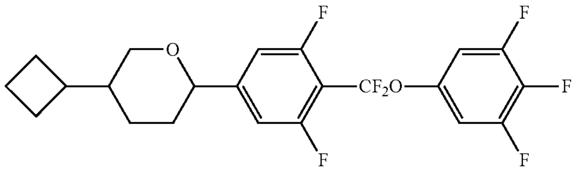
(IA -11)
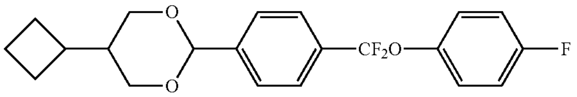
(IA -13)
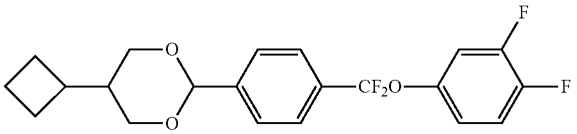
(IA -15)
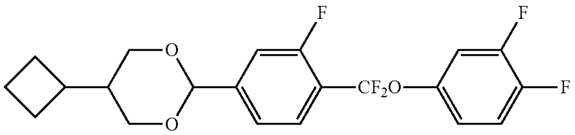
(IA -16)
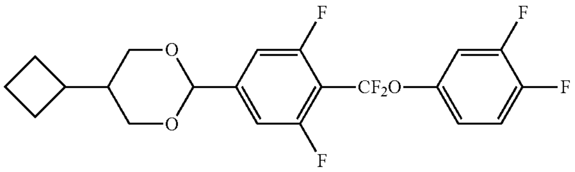
(IA -17)
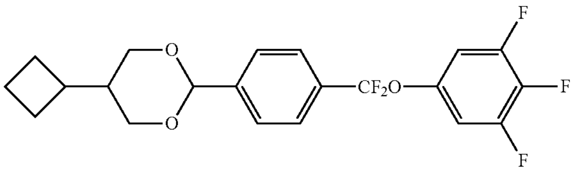
(IA -19)
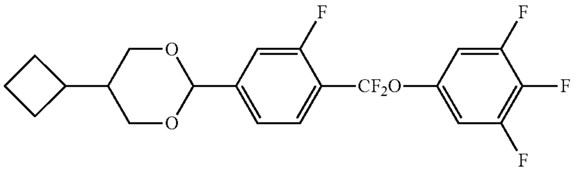
(IA -20)
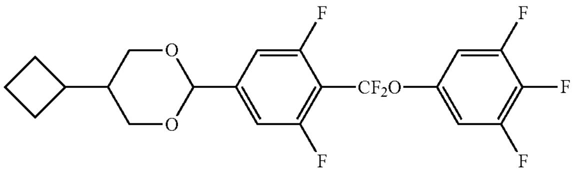
(IB -1)
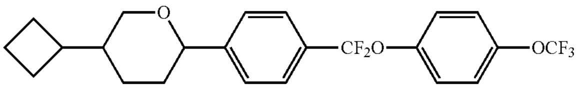
(IB -3)
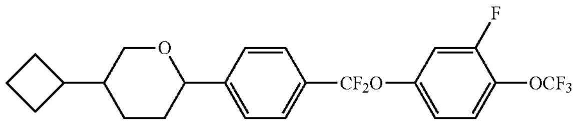
(IB -5)
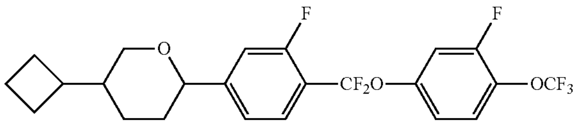
(IB -6)
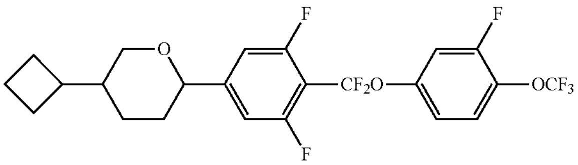

-continued
(IB -7)
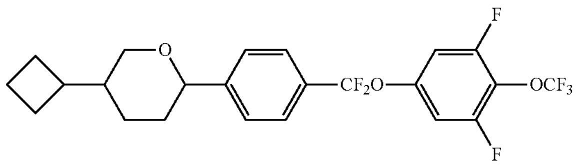
(IB -9)
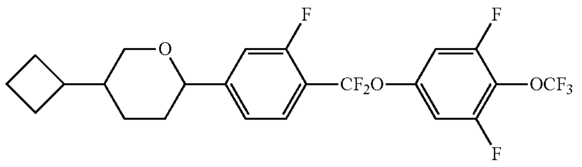
(IB -10)
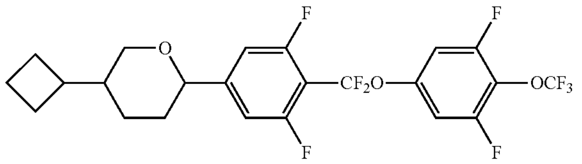
(IB -11)
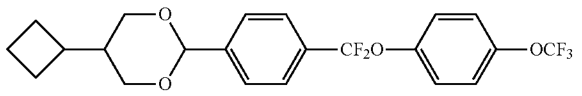
(IB -13)
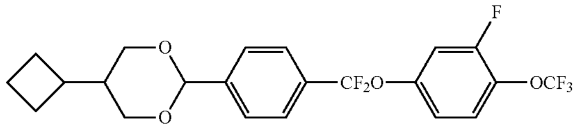
(IB -15)
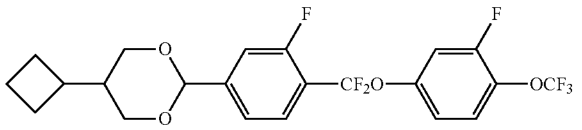
(IB -16)
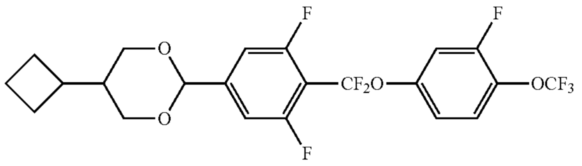
(IB -17)
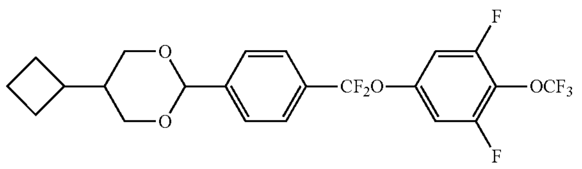
(IB -19)
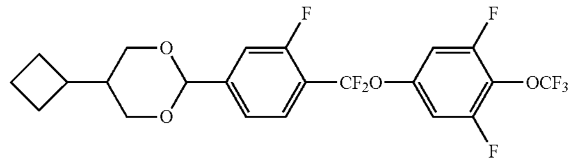
-continued
(IB -20)
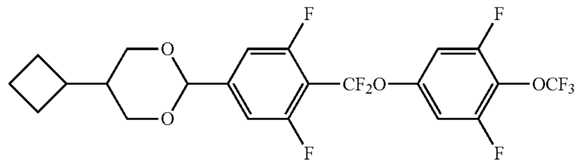
(IC -1)
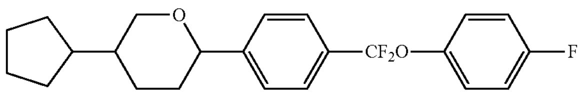
(IC -3)
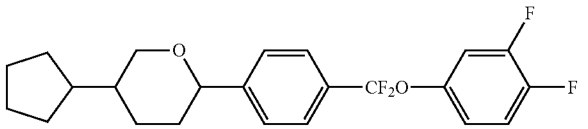
(IC -5)
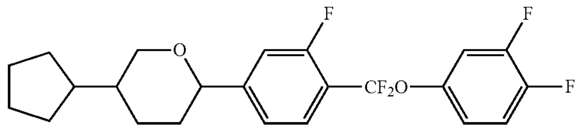
(IC -6)
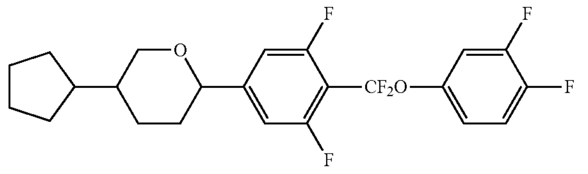
(IC -7)
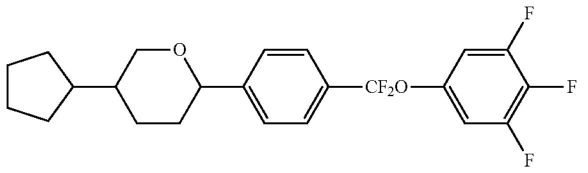
(IC -9)
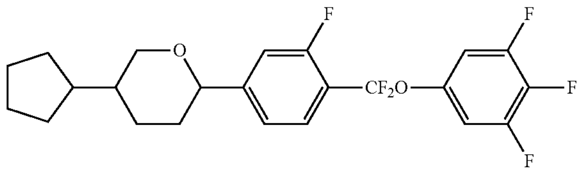
(IC -10)
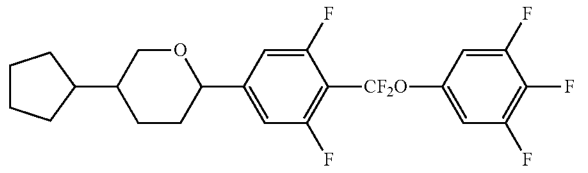
(IC -11)
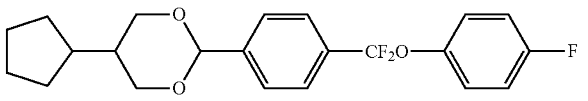

-continued
(IC-13)
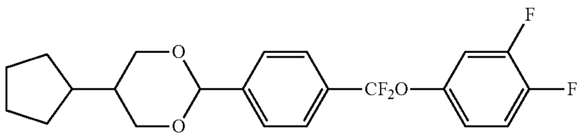
(IC-15)
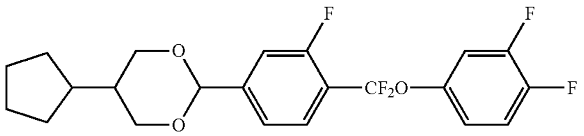
(IC-16)
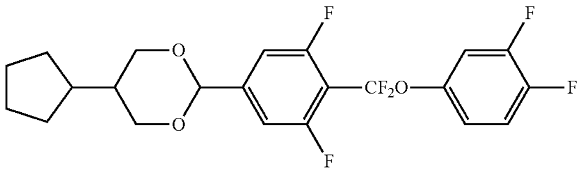
(IC-17)
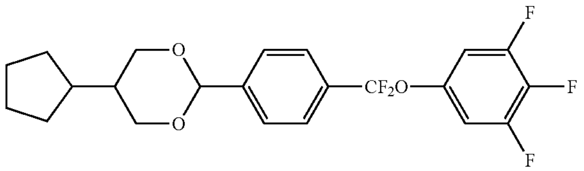
(IC-19)
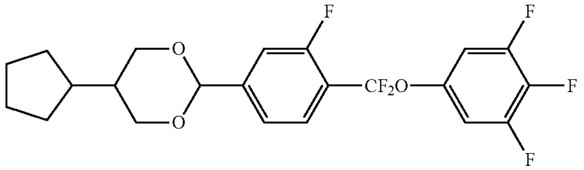
(IC-20)
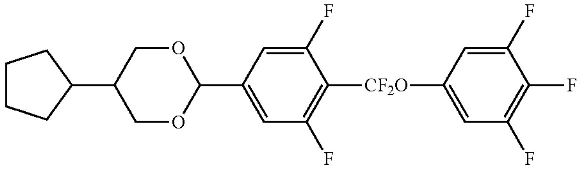
(ID-1)
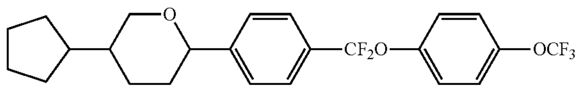
(ID-3)
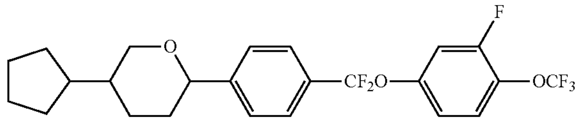
(ID-5)
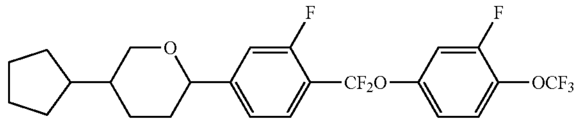
-continued
(ID-6)
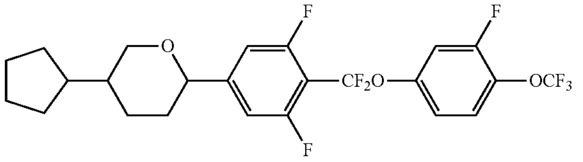
(ID-7)
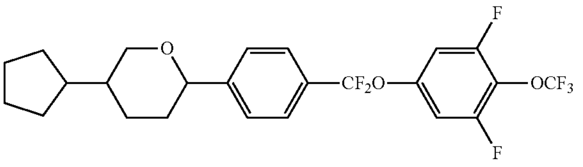
(ID-9)
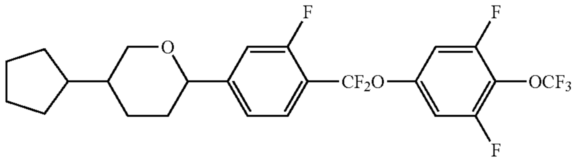
(ID-10)
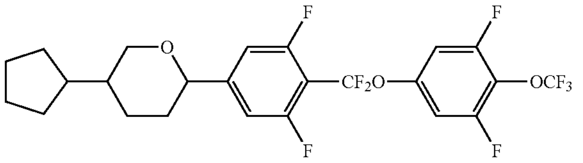
(ID-11)
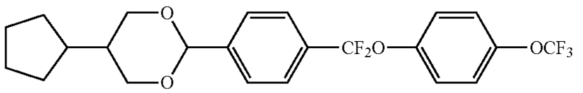
(ID-13)
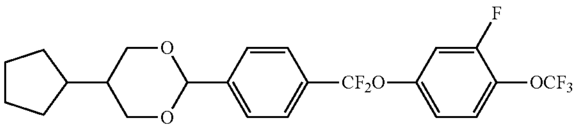
(ID-15)
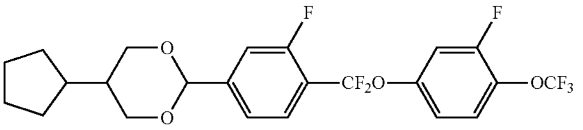
(ID-16)
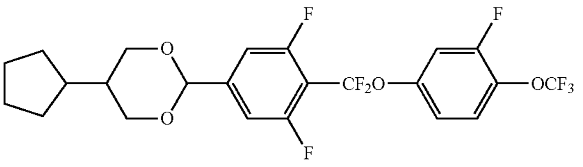
(ID-17)
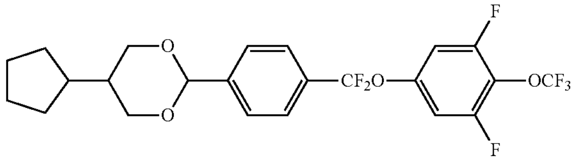

-continued (ID -19)

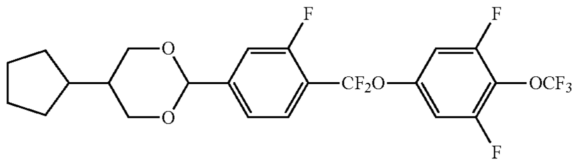

(ID -20)

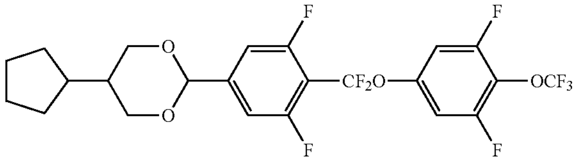

EXAMPLE 6

Step 6.1

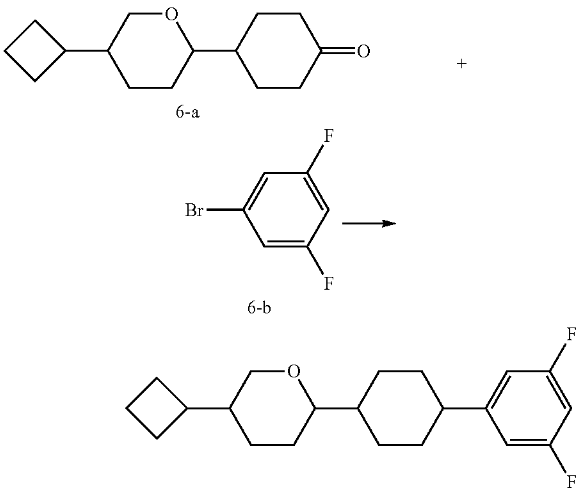

6-a 6-b 6-c 105 mmol of Magnesium-chips in 70 ml of THF are reacted with 100 mmol of 1-bromo-3,5-difluorobenzene in 70 ml of THF at boiling heat. After the addition of the 1-bromo-3,5-difluorobenzene, the reaction mixture is refluxed conditions of a Grignard reaction for 30 min. Afterwards 40 mmol 6-a in 50 ml of THF are added dropwise. The mixture is stirred for a further 1.5 hours at the same temperature. Then the reaction solution is cooled to room temperature, poured into 100 ml of 1 mol/L HCL, the product is extracted with 50 ml of methylbenzene. The resulting organic layer is washed with water, dried over $Na_2SO_4$ and evaporated to dryness in a rotary evaporator. The residue was dissolved in 120 ml of methylbenzene, 0.8 g of p-toluenesulfonic acid is added, then heat to reflux, and stirred for 8 hours. The mixture evaporated to dryness in a rotary evaporator. The mixture is purified by chromatography on silica gel with petroleum ether to get a colorless solid. Then the solid is hydrogenated at 40° C. For 8 hours in 60 ml of methylbenzene and 30 ml of ethanol in the presence of 1.5 g of water-moist 5% Pd/C catalyst. Conventional work-up gives a colorless solid 32.2 g 6-c. Yield: 96.4%.

Step 6.2

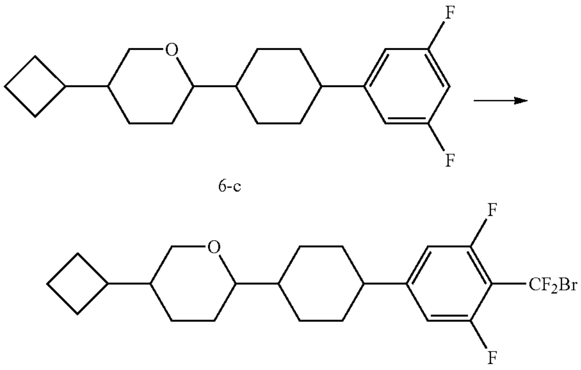

6-c 6-d 150 mmol of BuLi (2.5 mol/L in hexane) are added dropwise at −60° C. to a solution of 96 mmol of 6-c in 120 ml of THF, under nitrogen atmosphere, the mixture is stirred for a further 30 minutes at the same temperature. A solution of 113 mmol of Difluorodibromomethane in 60 ml of THF is then added dropwise at the same temperature, and the mixture is stirred for a further 30 minutes, allowed to come to −40° C. The mixture is poured into 300 ml of 2 mol/L HCL, the product is extracted with petroleum ether. The resulting organic layer was washed with water, dried over $Na_2SO_4$ and evaporated to dryness in a rotary evaporator. The crude product is chromatographed over silica gel in petroleum ether, giving colorless solid 29.5 g of 6-d. Yield: 66.4%.

Step 6.3

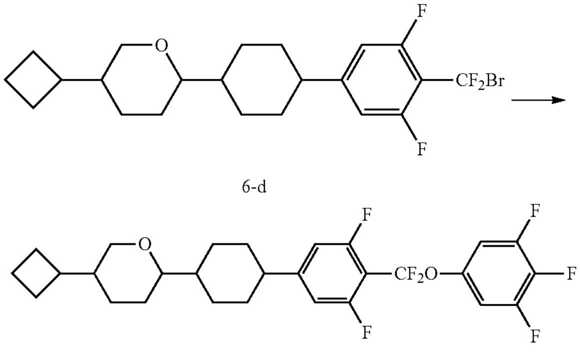

6-d 6-e

A mixture of 63 mmol of 6-d, 74 mmol of 3,4,5-Trifluoro phenol, 130 mmol of potassium carbonate, 250 ml of dimethyl sulfoxide are stirred at 60° C. for 3 hours. Then the mixture is poured into 100 ml of water, and the product is extracted with 70 ml petroleum ether twice. The resulting organic layer is washed with water, dried over $Na_2SO_4$ and evaporated to dryness in a rotary evaporator. The residue is chromatographed over silica gel in petroleum ether and subsequently recrystallised twice from petroleum ether at −20° C., giving 22.4 g 6-e. Yield: 66.7% C, 135.2; N, 162.2; I, $\Delta n=0.138$; $\Delta\epsilon=22.3$.

The following compounds of the formula are prepared analogously:

(IA -22)
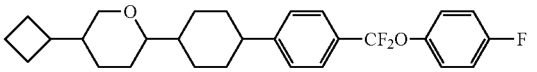
(IA -24)
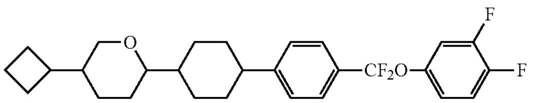
(IA -26)
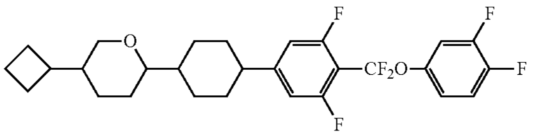
(IA -29)
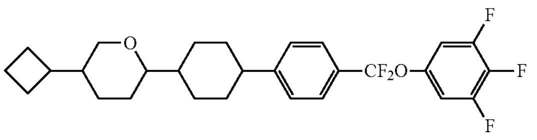
(IA -31)
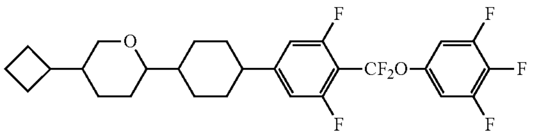
(IA -34)
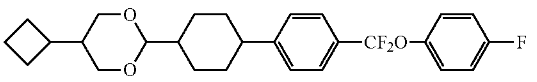
(IA -37)
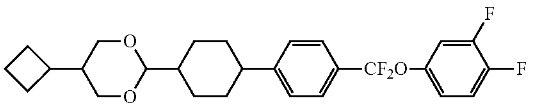
(IA -40)
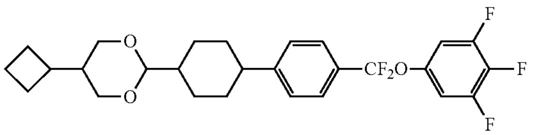
(IA -42)
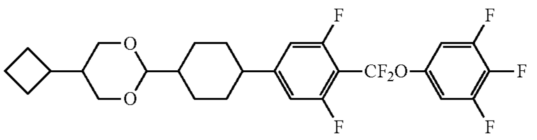
(IB -22)
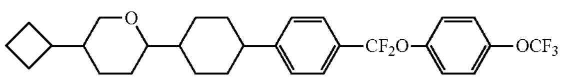
(IB -24)
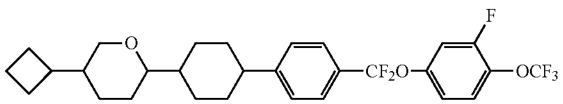
-continued
(IB -26)
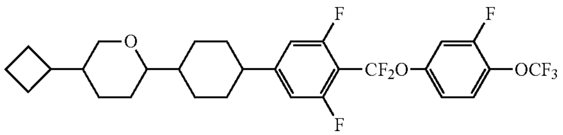
(IB -29)
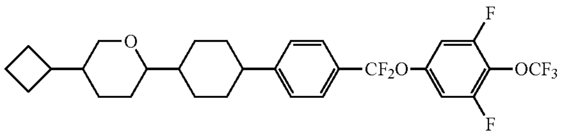
(IB -31)
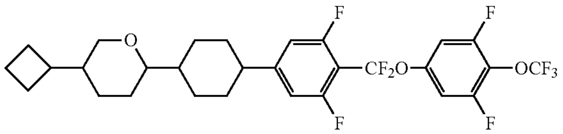
(IB -34)
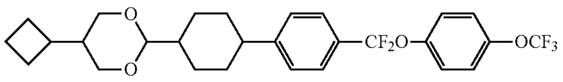
(IB -37)
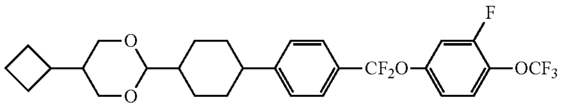
(IB -40)
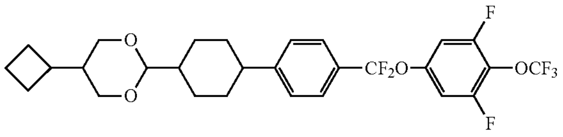
(IB -42)
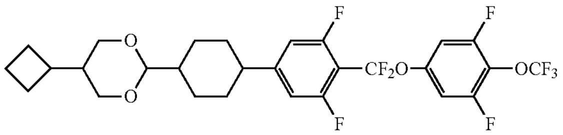
(IC -22)
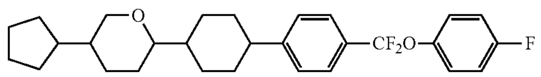
(IC -24)
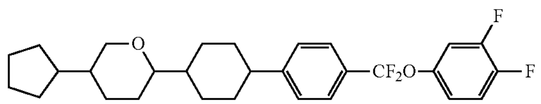
(IC -26)
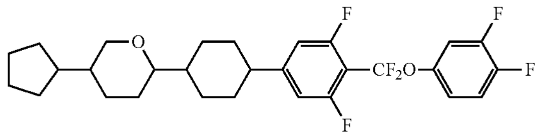
(IC -29)
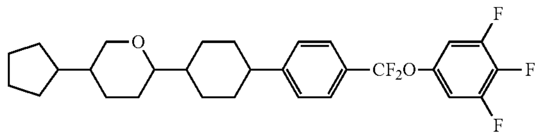

-continued
(IC -31)
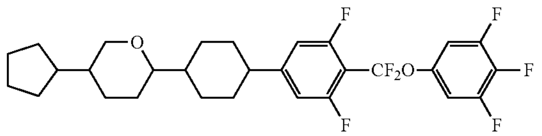
(IC -34)
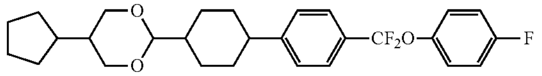
(IC -37)
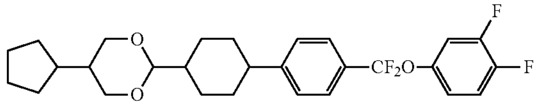
(IC -40)
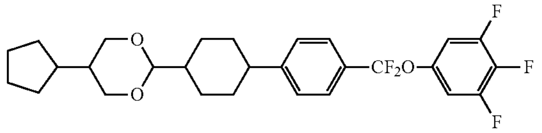
(IC -42)
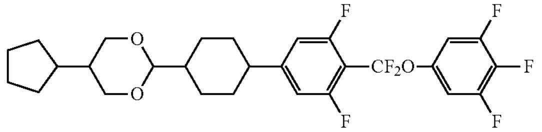
(ID -22)
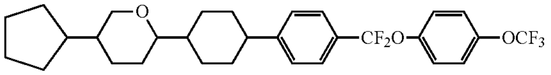
(ID -24)
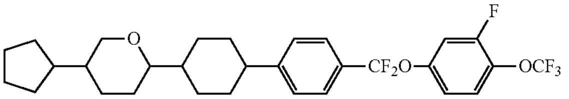
(ID -26)
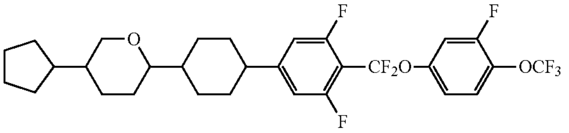
-continued
(ID -29)
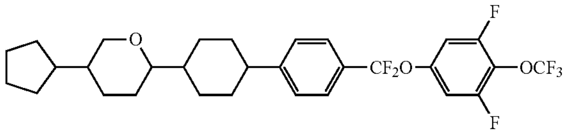
(ID -31)
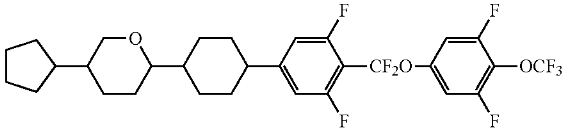
(ID -34)
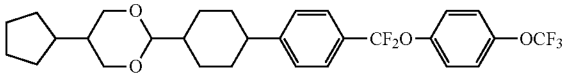
(ID -37)
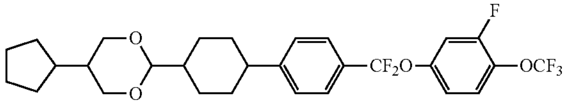
(ID -40)
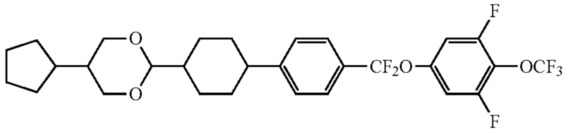
(ID -42)
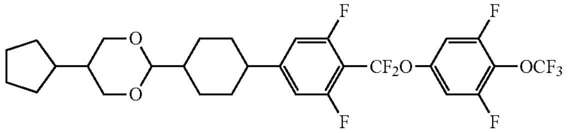
MIXTURE EXAMPLES
| Mixture 1 | | |
|---|---|---|
| 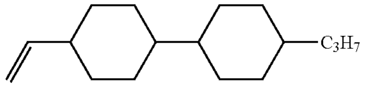 | 28% | S—N (° C.): ≤−40<br>Cp (° C.): 100<br>γ 1 (mPa · s): 99.8<br>Δn: 0.112<br>Δϵ: 11.3 |
| 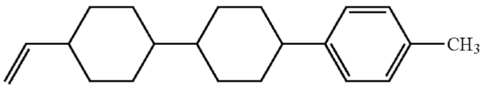 | 5% | $V_{10}$ (V): 1.54<br>$V_{90}$ (V): 2.47<br>τ (ms, 4 V): 9.23<br>ρ (×$10^{13}$ Ω · cm): 15.2<br>VHR (%): 99.85 |
| 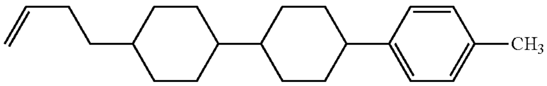 | 5% | |

-continued
| Mixture 1 | |
|---|---|
| 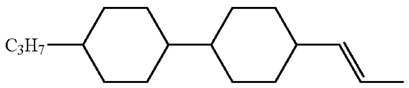 | 3% |
| 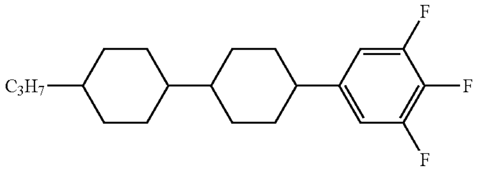 | 7% |
| 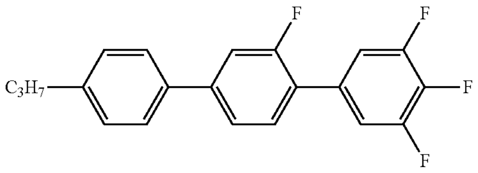 | 3% |
| 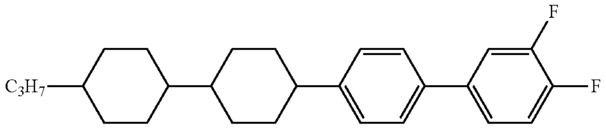 | 2% |
| 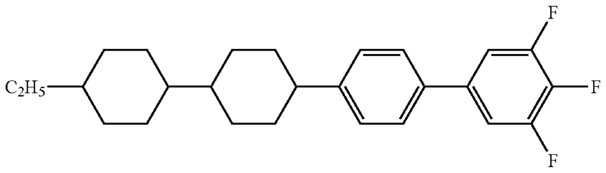 | 5% |
| 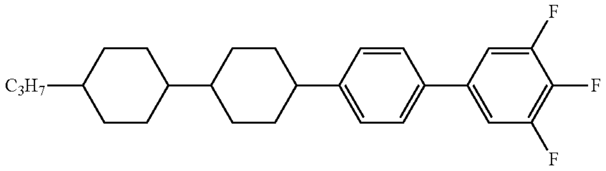 | 5% |
| 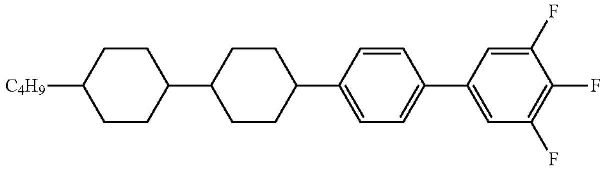 | 3% |
| 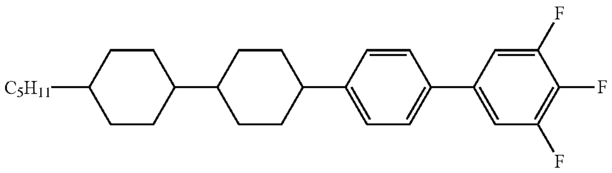 | 5% |
| 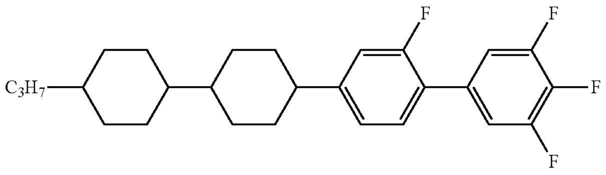 | 5% |

-continued
| Mixture 1 | |
|---|---|
| 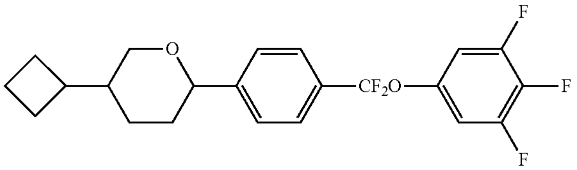 | 10% |
| 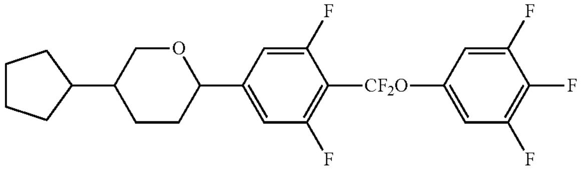 | 11% |
| 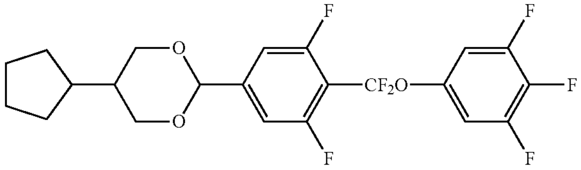 | 3% |
| Mixture 2 | | |
|---|---|---|
| 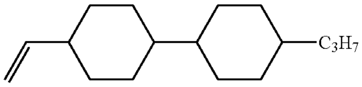 | 13% | S—N (° C.): ≤−40<br>Cp (° C.): 96<br>$\gamma$ 1 (mPa · s): 77.7<br>$\Delta n$: 0.100<br>$\Delta\epsilon$: 6.5 |
| 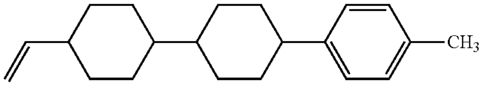 | 15% | $V_{10}$ (V): 1.98<br>$V_{90}$ (V): 3.03<br>$\tau$ (ms, 4.5 V): 10.50<br>$\rho$ ($\times 10^{13}$ $\Omega$ · cm): 29.0<br>VHR (%): 99.86 |
| 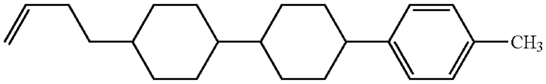 [SMILES: C=CCCC1CCC(C2CCC(c3ccc(C)cc3)CC2)CC1] | 6% | |
| 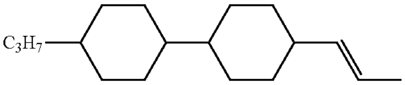 | 8% | |
| 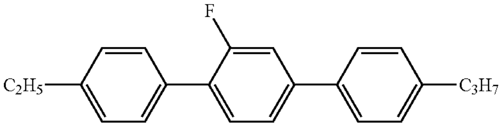 | 1% | |
| 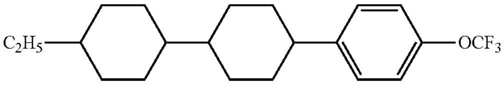 [SMILES: CCC1CCC(C2CCC(c3ccc(OC(F)(F)F)cc3)CC2)CC1] | 3% | |
| 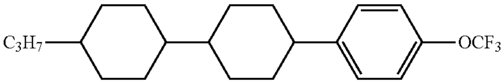 | 4% | |
| 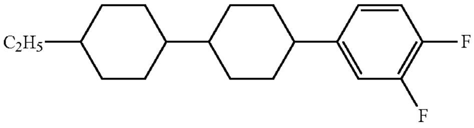 | 7% | |

-continued
| Mixture 2 | |
|---|---|
| 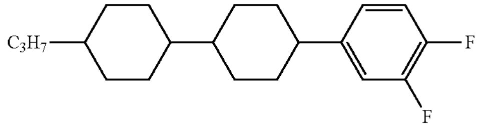 | 7% |
| 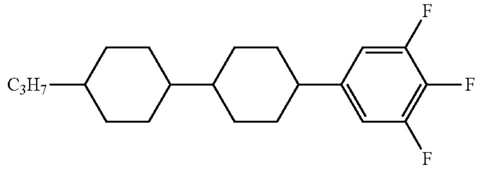 | 5% |
| 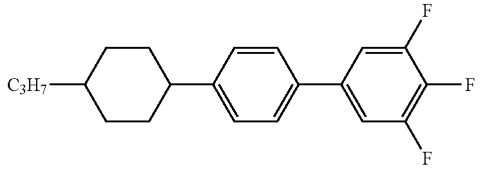 | 27% |
| 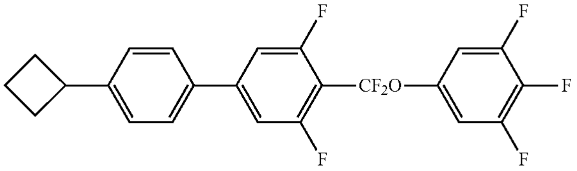 | 2% |
| 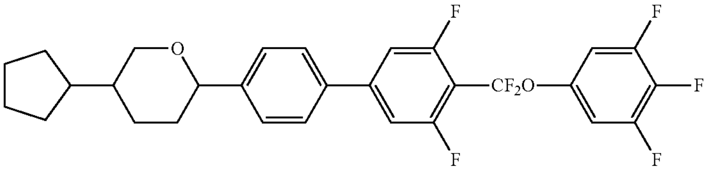 | 2% |
| Mixture 3 | | |
|---|---|---|
| 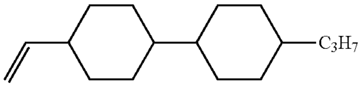 | 16% | S—N (° C.): ≤−40<br>Cp (° C.): 90<br>γ 1 (mPa · s): 80.0<br>Δn: 0.100<br>Δε: 5.5 |
| 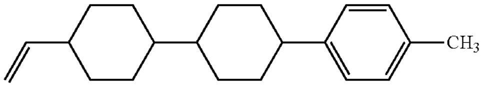 [SMILES: C=CC1CCC(C2CCC(c3ccc(C)cc3)CC2)CC1] | 12% | $V_{10}$ (V): 1.88<br>$V_{90}$ (V): 3.02<br>τ (ms, 4.5 V): 8.30<br>ρ (×$10^{13}$ Ω · cm): 25.9 |
| 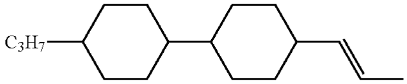 | 10% | VHR (%): 99.72 |
| 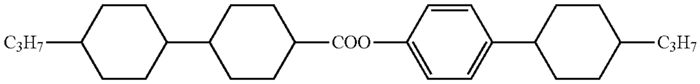 | 3% | |
| 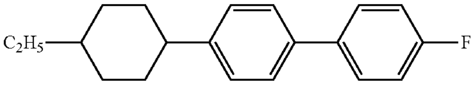 | 3% | |
| 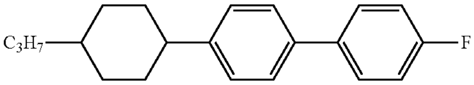 | 3% | |

-continued
| Mixture 3 | |
|---|---|
| 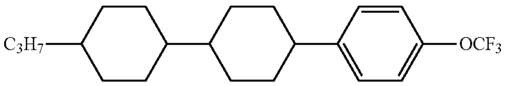 | 4% |
| 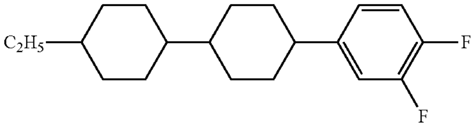 | 7% |
| 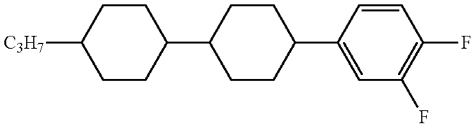 | 8% |
| 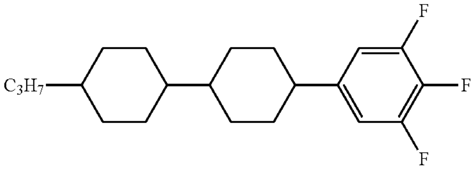 | 2% |
| 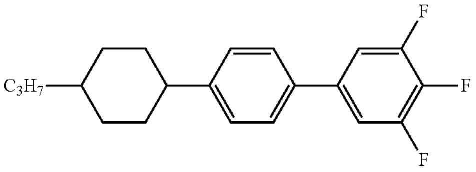 | 20% |
| 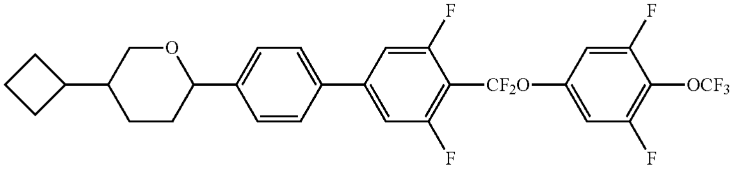 | 6% |
| 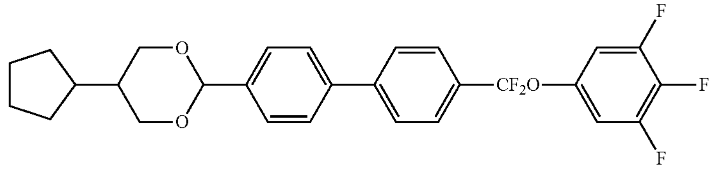 | 6% |
| Mixture 4 | | |
|---|---|---|
| 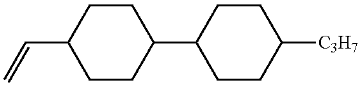 | 20% | S—N (° C.): ≤−40<br>Cp (° C.): 85<br>γ 1 (mPa · s): 80.6<br>Δn: 0.098<br>Δε: 8.0 |
| 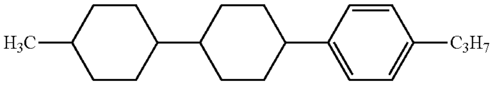 | 3% | $V_{10}$ (V): 1.58<br>$V_{90}$ (V): 2.64<br>τ (ms, 4.5 V): 12.10<br>ρ (×$10^{13}$ Ω · cm): 18.0 |
| 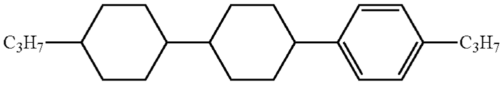 | 5% | VHR (%): 99.65 |

-continued
| Mixture 4 | |
|---|---|
| 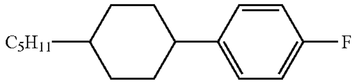 | 3% |
| 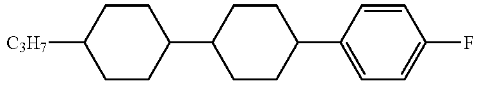 | 3% |
| 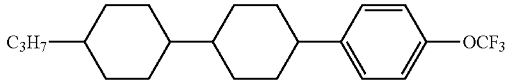 | 5% |
| 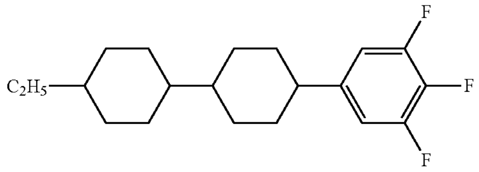 | 7% |
| 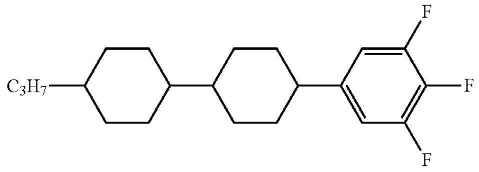 | 8% |
| 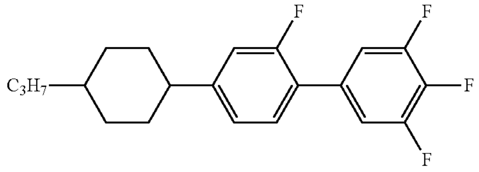 | 4% |
| 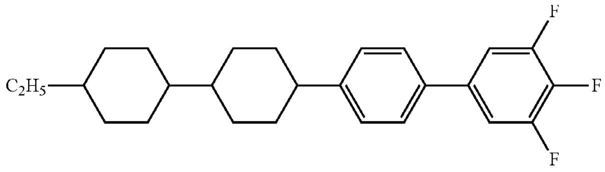 | 2% |
| 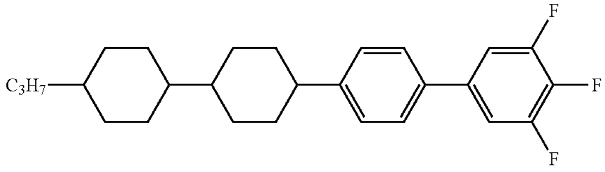 | 3% |
| 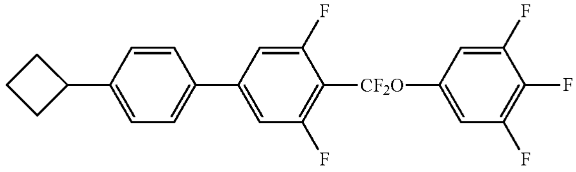 | 7% |
| 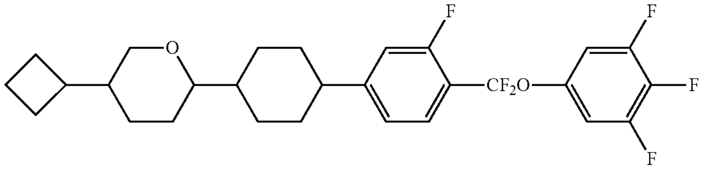 | 5% |

-continued
| Mixture 4 | |
|---|---|
| 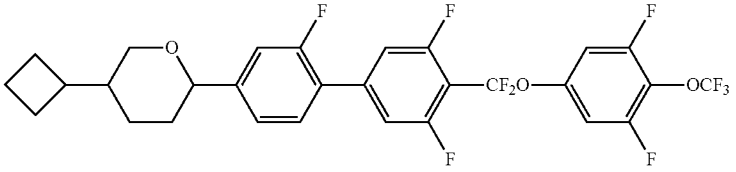 | 10% |
| 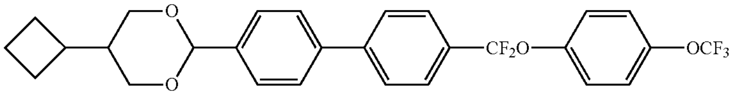 | 7% |
| 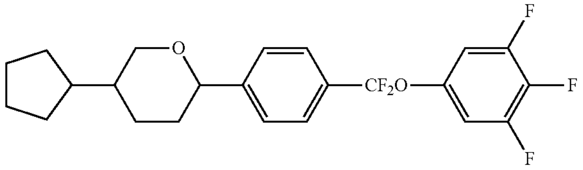 | 8% |
| Mixture 5 | | |
|---|---|---|
| 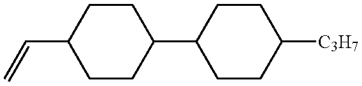 | 29% | S—N (° C.): ≤−40<br>Cp (° C.): 100<br>γ 1 (mPa · s): 90.5<br>Δn: 0.100<br>Δϵ: 10.0 |
| 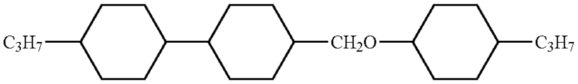 | 7% | ρ (×$10^{13}$ Ω · cm): 25.2<br>VHR (%): 99.75<br>$V_{10}$ (V): 1.91<br>$V_{90}$ (V): 2.96 |
| 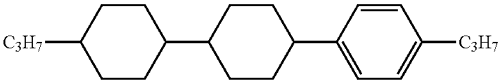 | 3% | τ (ms, 4.5 V): 20.40 |
| 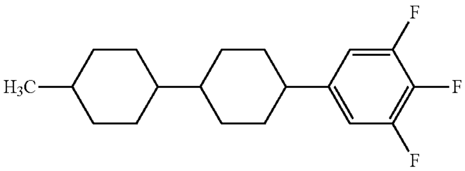 [SMILES: CC1CCC(C2CCC(c3cc(F)c(F)c(F)c3)CC2)CC1] | 2% | |
| 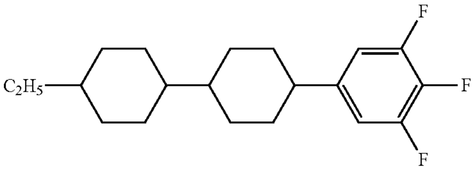 | 5% | |
| 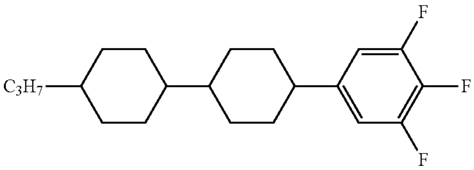 | 8% | |
| 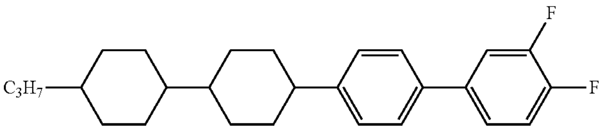 | 2% | |

-continued
| Mixture 5 | |
|---|---|
| 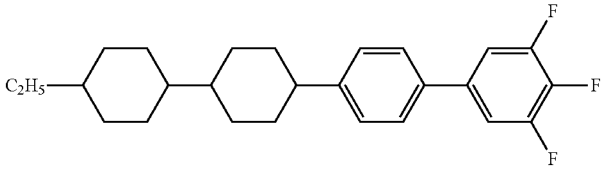 | 4% |
| 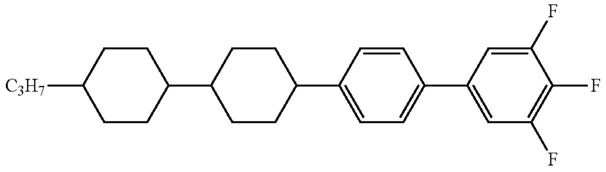 | 5% |
| 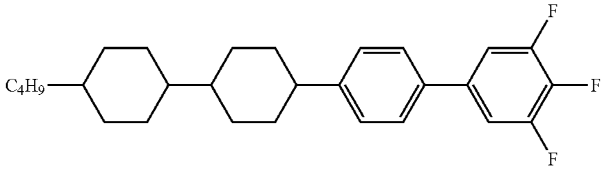 | 3% |
| 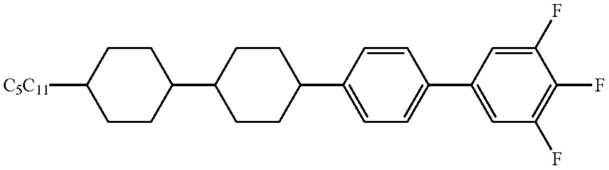 | 5% |
| 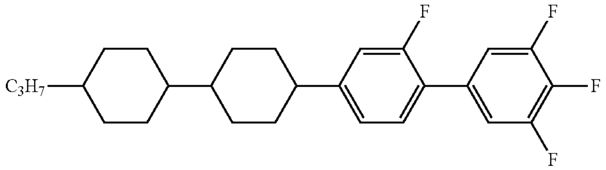 | 6% |
| 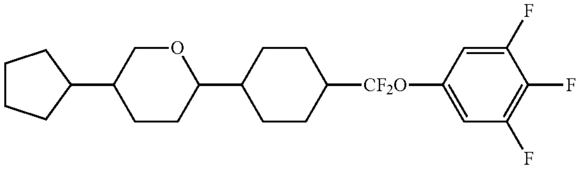 | 8% |
| 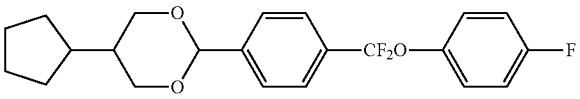 | 8% |
| 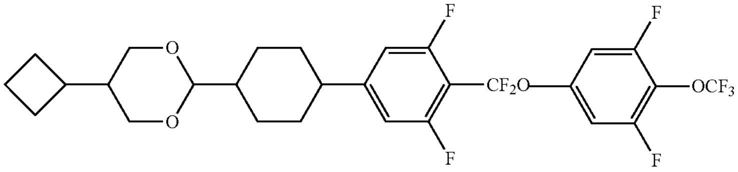 | 5% |

| Mixture 6 | | |
|---|---|---|
| 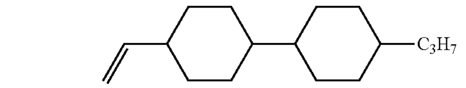 | 37% | S—N (° C.): ≤−40<br>Cp (° C.): 100<br>$\gamma$ 1 (mPa · s): 87.7<br>$\Delta n$: 0.112<br>$\Delta\epsilon$: 8.5 |
| 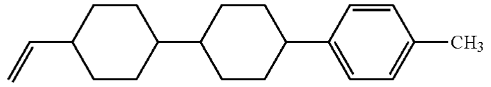 | 8% | $\rho$ ($\times 10^{13}$ $\Omega \cdot$ cm): 27.9<br>VHR (%): 99.80<br>$V_{10}$ (V): 1.61<br>$V_{90}$ (V): 2.59 |
| 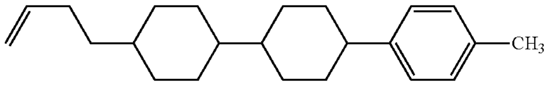 | 8% | $\tau$ (ms, 4.5 V): 19.30 |
| 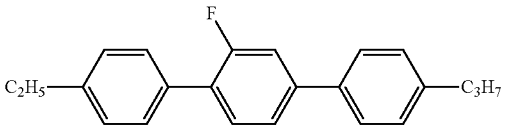 | 3% | |
| 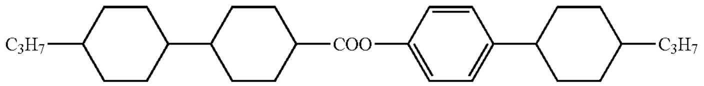 | 4% | |
| 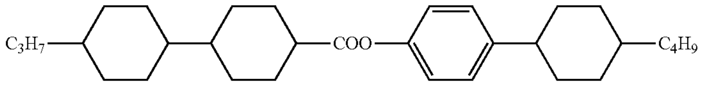 | 4% | |
| 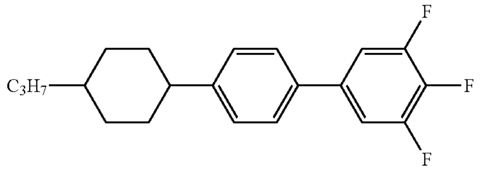 | 3% | |
| 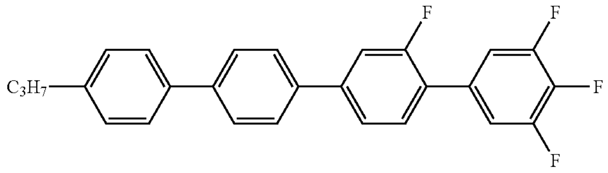 | 2% | |
| 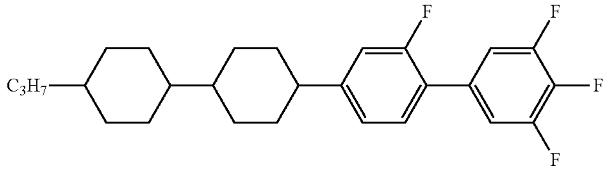 | 4% | |
| 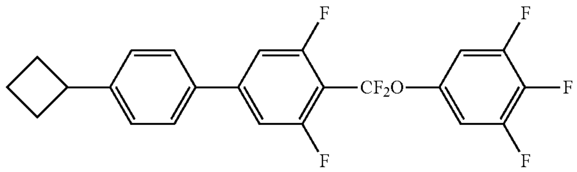 | 7% | |
| 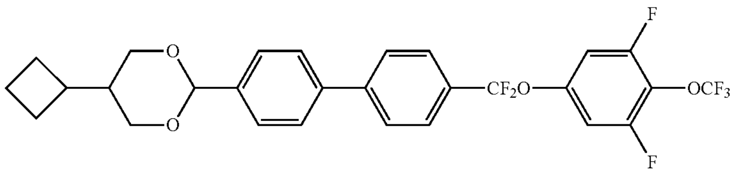 | 8% | |

-continued
| Mixture 6 | |
|---|---|
| 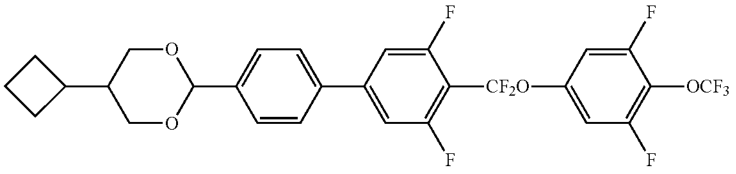 | 6% |
| 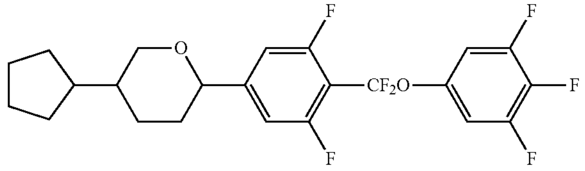 | 6% |
| Mixture 7 | | |
|---|---|---|
| 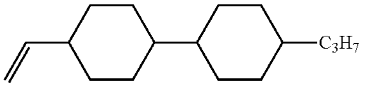 | 15% | S—N (° C.): ≤−40<br>Cp (° C.): 110<br>γ 1 (mPa · s): 95<br>Δn: 0.100 |
| 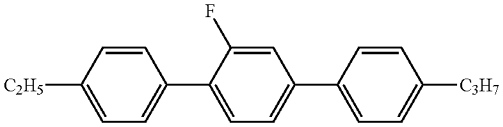 | 5% | Δϵ: 7.8<br>$V_{10}$ (V): 1.64<br>$V_{90}$ (V): 2.61<br>τ (ms, 4.5 V): 25.80<br>ρ (×$10^{13}$ Ω · cm):<br>19.10<br>VHR (%): 99.7 |
| 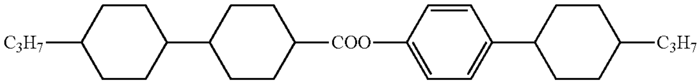 | 7% | |
| 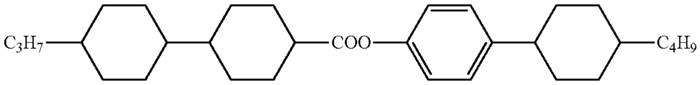 | 8% | |
| 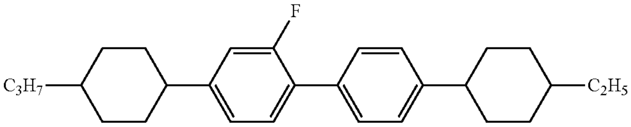 | 5% | |
| 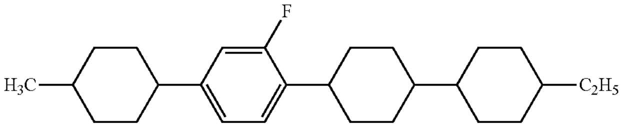 [SMILES: CCC1CCC(C2CCC(c3ccc(C4CCC(C)CC4)cc3F)CC2)CC1] | 6% | |
| 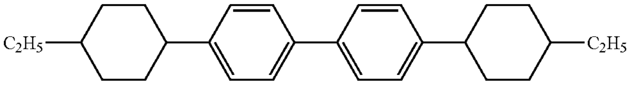 [SMILES: CCC1CCC(c2ccc(-c3ccc(C4CCC(CC)CC4)cc3)cc2)CC1] | 4% | |
| 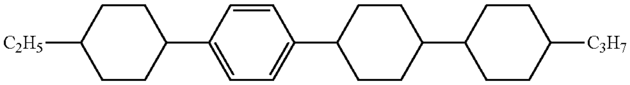 | 5% | |
| 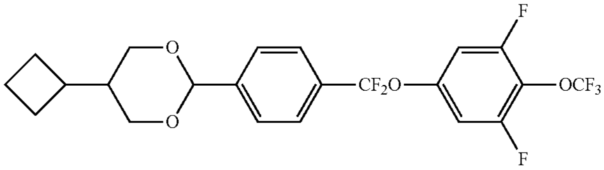 | 10% | |

-continued
| Mixture 7 | |
|---|---|
| 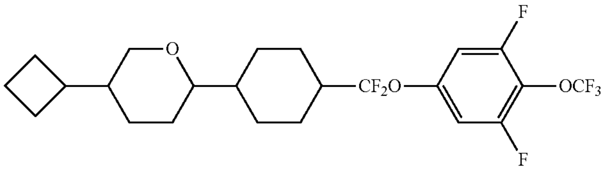 | 7% |
| 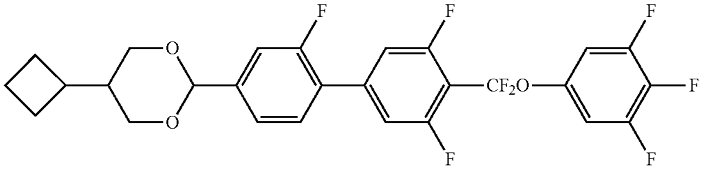 | 12% |
| 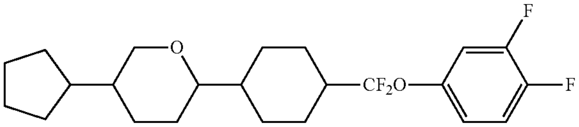 | 6% |
| 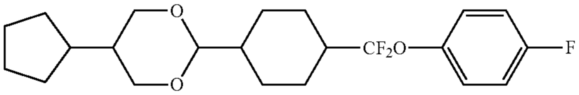 | 10% |
| Mixture 8 | | |
|---|---|---|
| 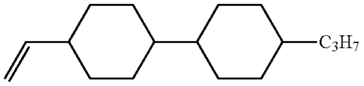 | 23% | S—N (° C.): ≤−40<br>Cp (° C.): 97<br>γ 1 (mPa · s): 90.1<br>Δn: 0.111<br>Δε: 8.4 |
| 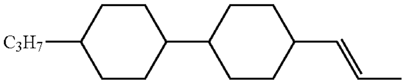 | 5% | $V_{10}$ (V): 1.56<br>$V_{90}$ (V): 2.57<br>τ (ms, 4 V): 9.50<br>ρ (×$10^{13}$ Ω · cm): 21.3 |
| 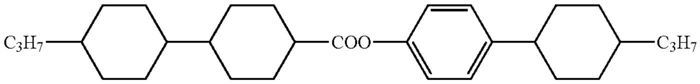 | 6% | VHR (%): 99.67 |
| 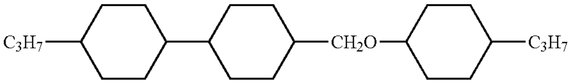 | 6% | |
| 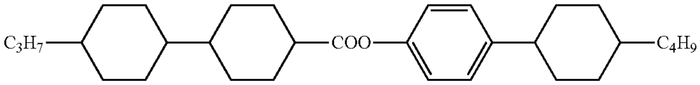 | 6% | |
| 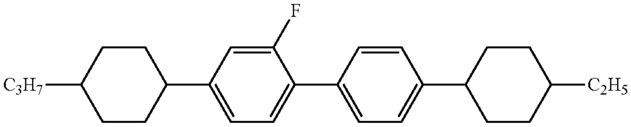 | 5% | |
| 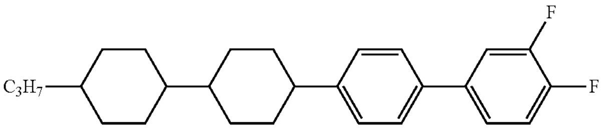 | 5% | |

-continued
| Mixture 8 | |
|---|---|
| 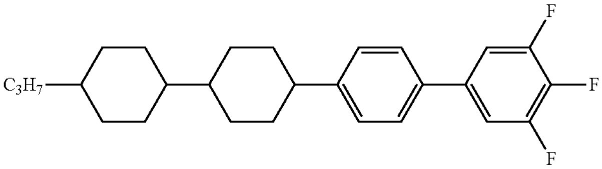 | 8% |
| 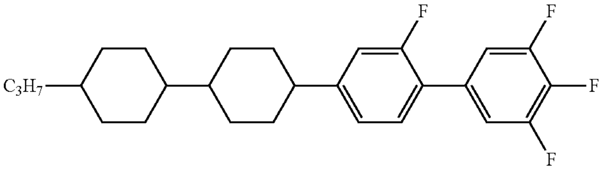 | 10% |
| 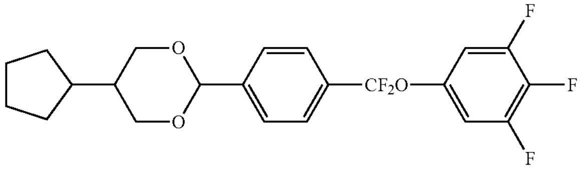 | 21% |
| 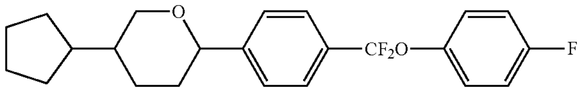 | 5% |
| Mixture 9 | | |
|---|---|---|
| 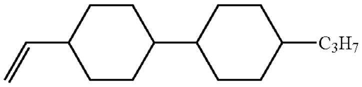 | 13% | S—N (° C.): ≤−40<br>Cp (° C.): 100<br>γ 1 (mPa · s): 88.1<br>Δn: 0.110<br>Δε: 8.3 |
| 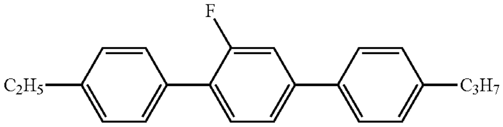 | 4% | $V_{10}$ (V): 1.87<br>$V_{90}$ (V): 3.00<br>τ (ms, 4.5 V): 11.70<br>ρ (×$10^{13}$ Ω · cm): 26.2<br>VHR (%): 99.8 |
| 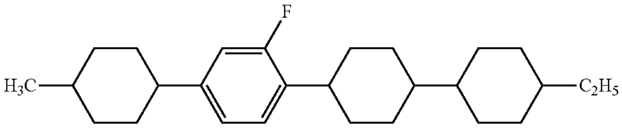 [SMILES: CCC1CCC(C2CCC(c3ccc(C4CCC(C)CC4)cc3F)CC2)CC1] | 9% | |
| 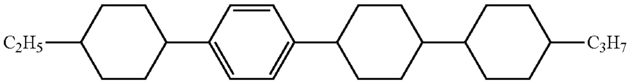 | 7% | |
| 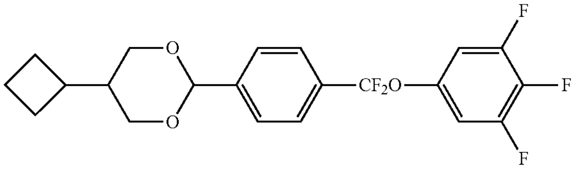 | 7% | |
| 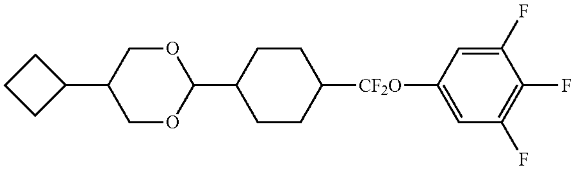 | 11% | |

-continued
| Mixture 9 | |
|---|---|
| 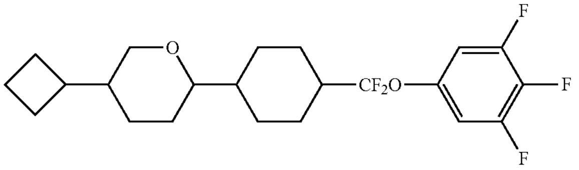 | 17% |
| 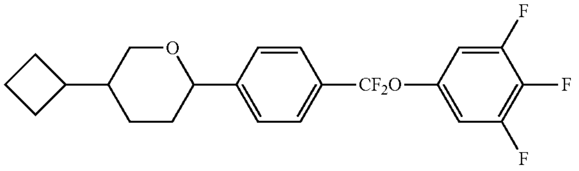 | 6% |
| 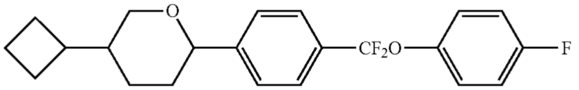 | 11% |
| 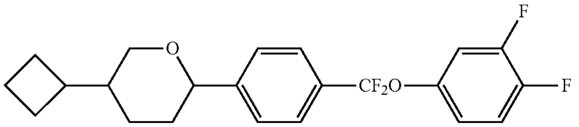 | 4% |
| 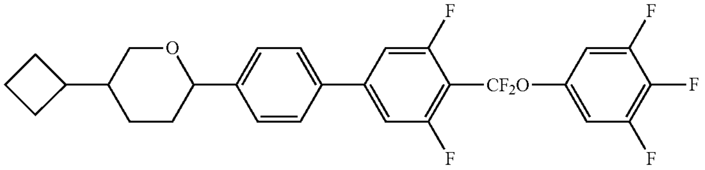 | 11% |
| Mixture 10 | | |
|---|---|---|
| 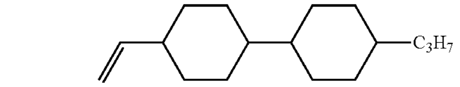 | 29% | S—N (° C.): ≤−40<br>Cp (° C.): 100<br>γ 1 (mPa · s): 90.4<br>Δn: 0.099<br>Δε: 9.8 |
| 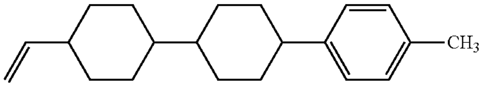 [SMILES: C=CC1CCC(C2CCC(c3ccc(C)cc3)CC2)CC1] | 17% | $V_{10}$ (V): 1.45<br>$V_{90}$ (V): 2.51<br>τ (ms, 4.5 V): 9.80<br>ρ (×$10^{13}$ Ω · cm): 25.4 |
| 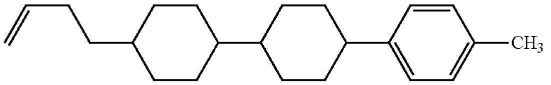 [SMILES: C=CCCC1CCC(C2CCC(c3ccc(C)cc3)CC2)CC1] | 14% | VHR (%): 99.75 |
| 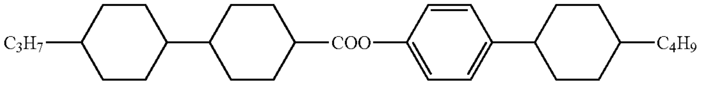 | 5% | |
| 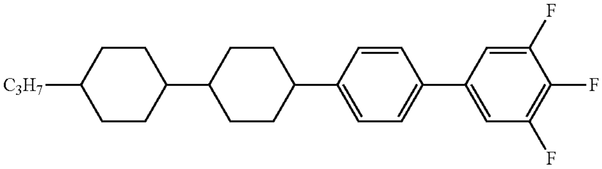 | 7% | |

-continued
| Mixture 10 | |
|---|---|
| 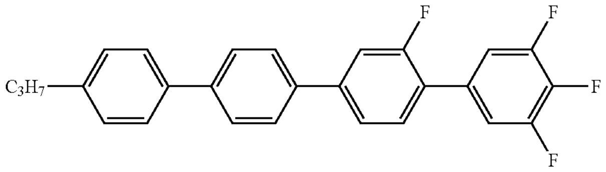 | 5% |
| 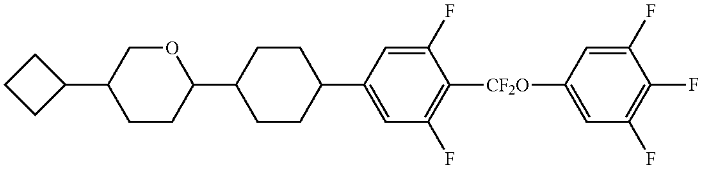 | 4% |
| 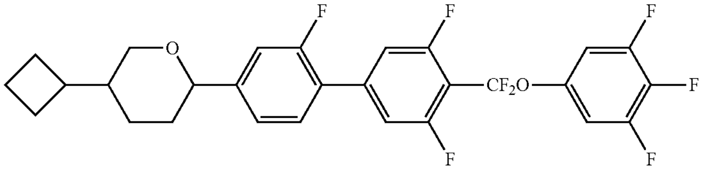 | 11% |
| 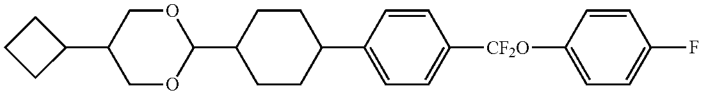 | 8% |
| Mixture 11 | | |
|---|---|---|
| 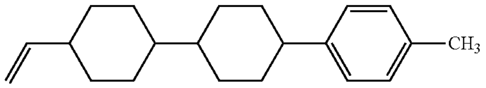 | 19% | S—N (° C.): ≤−40<br>Cp (° C.): 96<br>γ 1 (mPa · s): 98.7<br>Δn: 0.098<br>Δε: 10.5 |
| 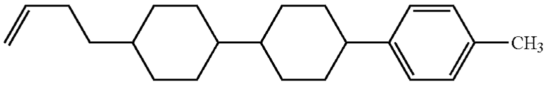 | 14% | $V_{10}$ (V): 1.35<br>$V_{90}$ (V): 2.45<br>τ (ms, 4.0 V): 11.80<br>ρ (×$10^{13}$ Ω · cm): 27.4 |
| 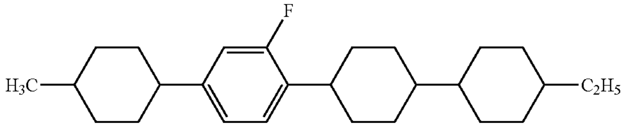 [SMILES: CCC1CCC(C2CCC(c3ccc(C4CCC(C)CC4)cc3F)CC2)CC1] | 5% | VHR (%): 99.84 |
| 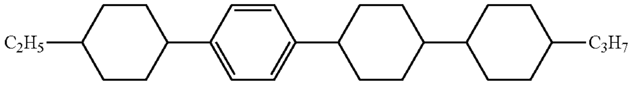 | 6% | |
| 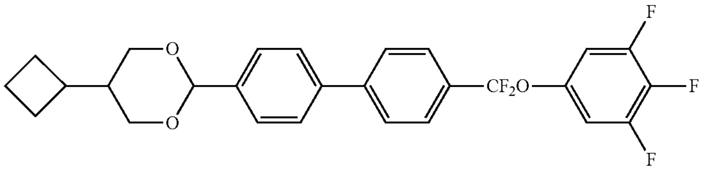 | 9% | |
| 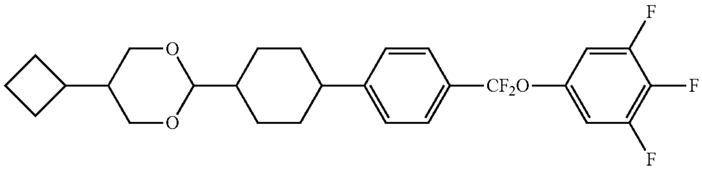 | 13% | |

-continued
| Mixture 11 | |
|---|---|
| 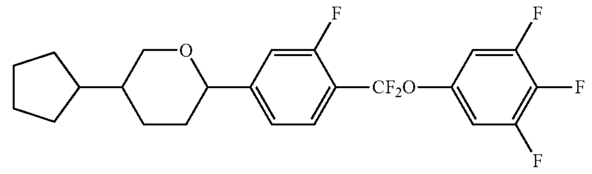 | 23% |
| 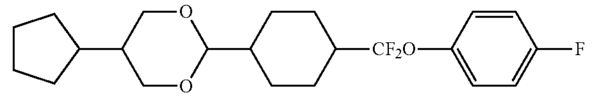 | 11% |
| Mixture 12 | | |
|---|---|---|
| 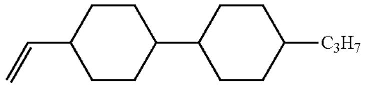 | 25% | S—N (° C.): ≤−40<br>Cp (° C.): 101<br>γ 1 (mPa · s): 92<br>Δn: 0.112<br>Δε: 8.9 |
| 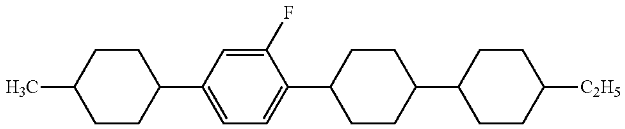 | 4% | $V_{10}$ (V): 1.85<br>$V_{90}$ (V): 2.90<br>τ (ms, 4.5 V): 14.50<br>ρ (×$10^{13}$ Ω · cm): 25.8<br>VHR (%): 99.82 |
| 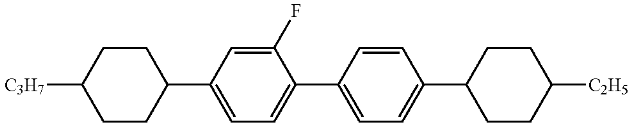 | 7% | |
| 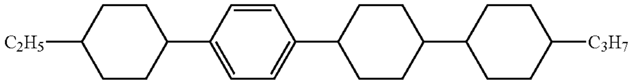 | 4% | |
| 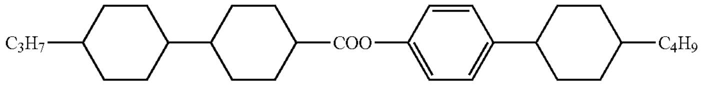 | 7% | |
| 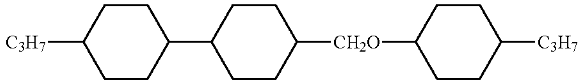 | 8% | |
| 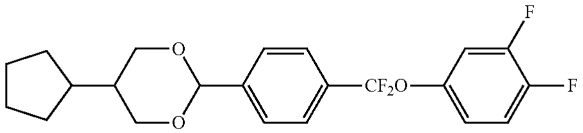 | 9% | |
| 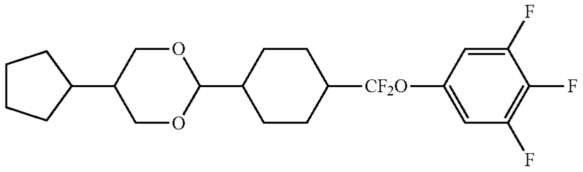 | 14% | |
| 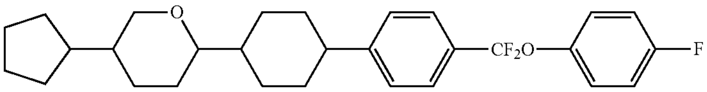 | 13% | |

-continued
| Mixture 12 | | |
|---|---|---|
| 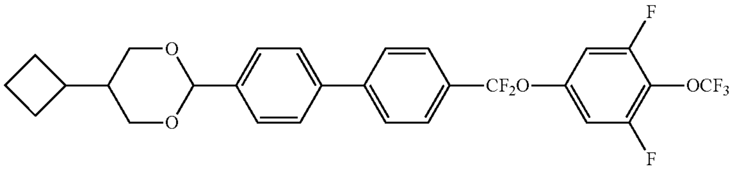 | 9% | |
| Mixture 13 | | |
|---|---|---|
| 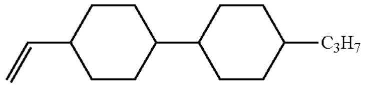 | 38% | S—N (° C.): ≤−40<br>Cp (° C.): 99<br>γ 1 (mPa · s): 90.5<br>Δn: 0.100<br>Δε: 6.3 |
| 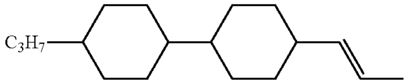 | 12% | $V_{10}$ (V): 1.95<br>$V_{90}$ (V): 3.05<br>τ (ms, 4.5 V): 12<br>ρ (×$10^{13}$ Ω · cm):<br>20.5 |
| 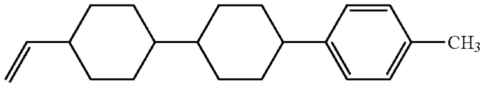 | 8% | VHR (%): 99.76 |
| 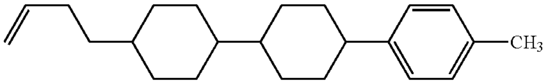 | 12% | |
| 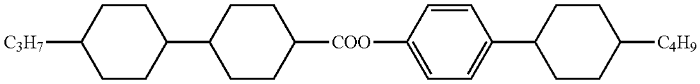 | 6% | |
| 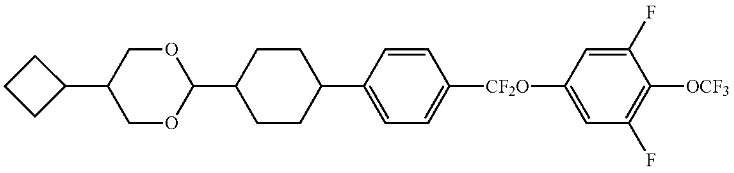 | 1% | |
| 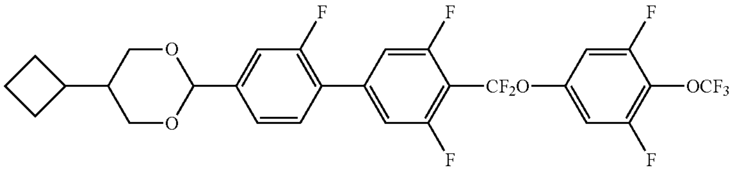 | 5% | |
| 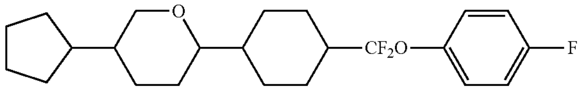 | 10% | |
| 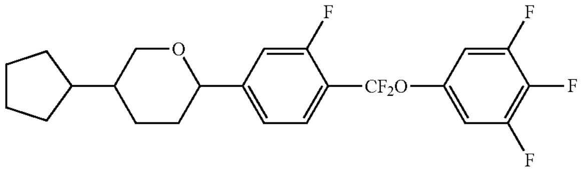 | 8% | |

| Mixture 14 | | |
|---|---|---|
| 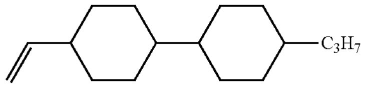 | 12% | S—N (° C.): ≤−40<br>Cp (° C.): 97<br>γ 1 (mPa · s): 80.0<br>Δn: 0.105<br>Δε: 9.3 |
| 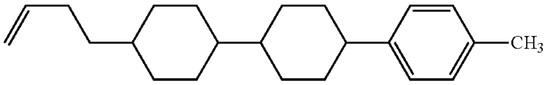 | 2% | $V_{10}$ (V): 1.79<br>$V_{90}$ (V): 2.87<br>τ (ms, 4.5 V): 11<br>ρ (×$10^{13}$ Ω · cm): 28.7 |
| 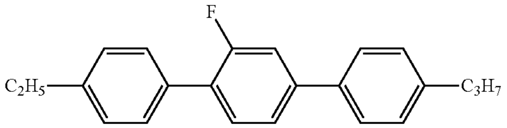 | 5% | VHR (%): 99.73 |
| 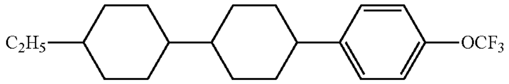 [SMILES: CCC1CCC(C2CCC(c3ccc(OC(F)(F)F)cc3)CC2)CC1] | 4% | |
| 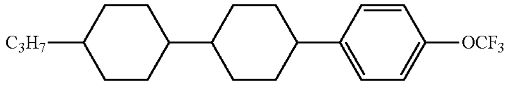 | 8% | |
| 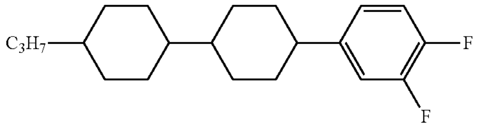 | 5% | |
| 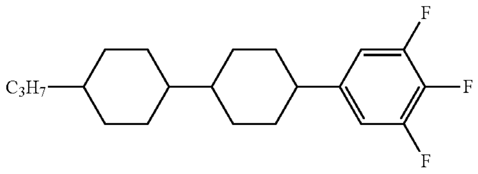 | 14% | |
| 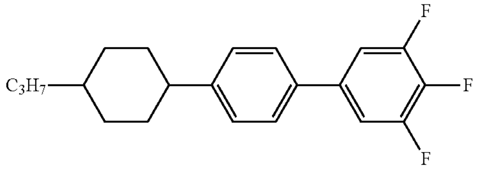 | 34% | |
| 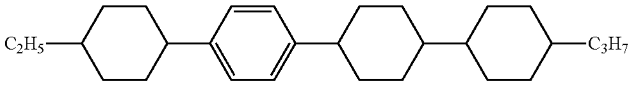 | 1% | |
| 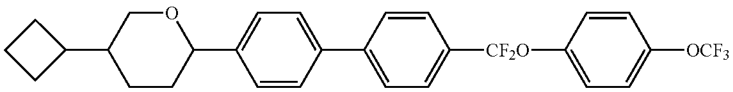 | 8% | |
| 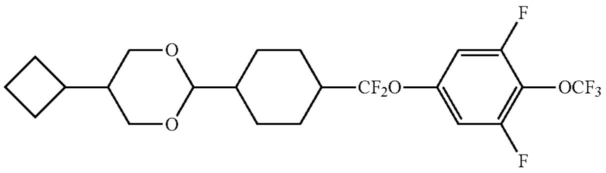 | 7% | |

| Mixture 15 | | |
|---|---|---|
| 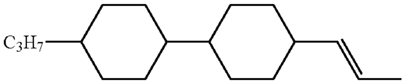 | 21% | S—N (° C.): ≤−40<br>Cp (° C.): 100<br>γ 1 (mPa · s): 85<br>Δn: 0.110<br>Δε: 7.9 |
| 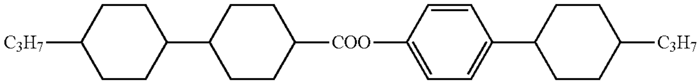 | 12% | $V_{10}$ (V): 1.88<br>$V_{90}$ (V): 2.86<br>τ (ms, 4 V): 11.60<br>ρ (×$10^{13}$ Ω · cm): 26.8 |
| 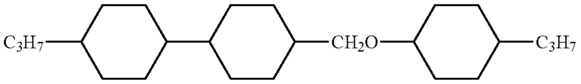 | 10% | VHR (%): 99.82 |
| 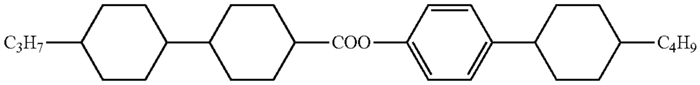 | 11% | |
| 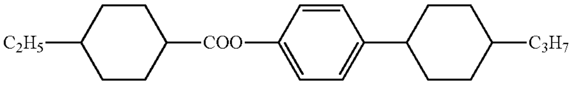 | 7% | |
| 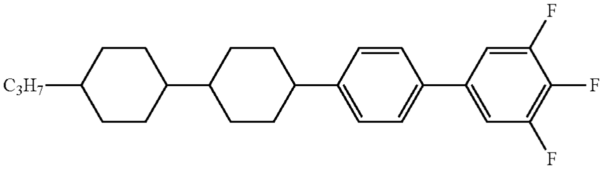 | 6% | |
| 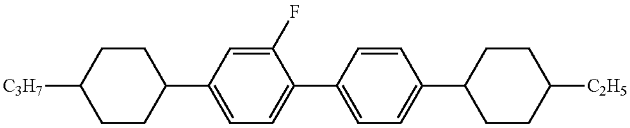 | 1% | |
| 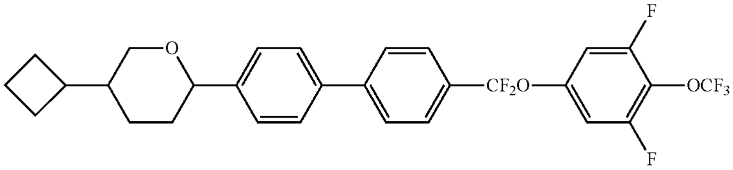 | 2% | |
| 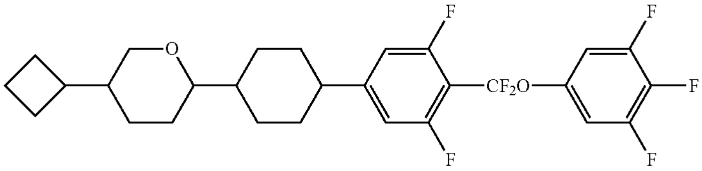 | 7% | |
| 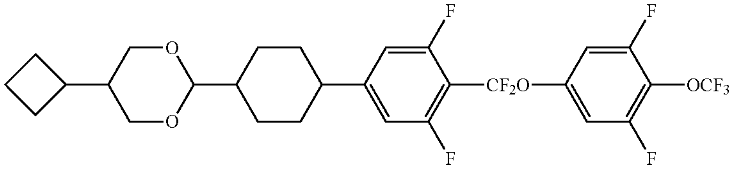 | 12% | |
| 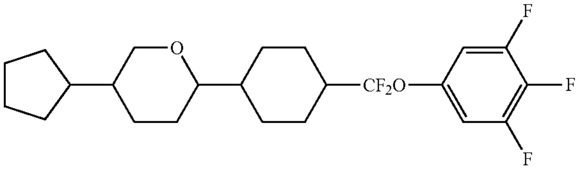 | 8% | |

-continued

| Mixture 15 | |
| --- | --- |
| 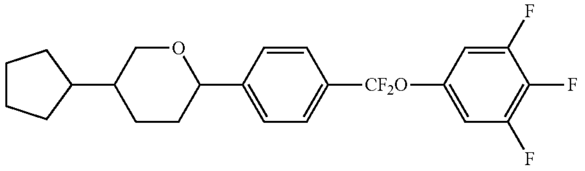 | 3% |

The invention claimed is:

1. A liquid-crystalline compound of the formula I

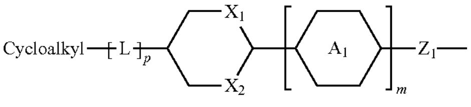

(I)

-continued

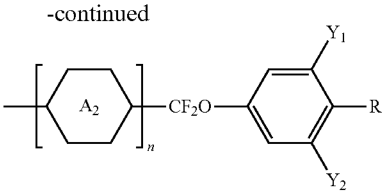

Wherein Cycloalkyl denotes cyclobutyl, cyclopentyl, or cycloheptyl;

[L] denotes $CH_2$ or 0, wherein [L]p comprising at most one 0;

$X_1$ and $X_2$, independent of one another, each denote $CH_2$ or 0; wherein at least one of $X_1$ or $X_2$ is 0;

$A_1$ and $A_2$ each, denote 1,4-cyclohexylidene, 1,4-phenylene or fluoro-1,4-phenylene;

$Z_1$ denotes $—CH_2—$, $—CH_2—CH_2—$, $—(CH_2)_3—$, $—(CH_2)_4—$, $—CH{=}CH—$, $—C{\equiv}C—$, $—COO—$, $—OOC—$, $—CF_2O—$, $—OCH_2—$, $—CH_2O—$, $—OCF_2—$, $—CF_2CH_2—$, $—CH_2CF_2—$, $—C_2F_4—$, $—CF{=}CF—$, or a single bond;

$Y_1$, $Y_2$ independently denote H or F;

R denotes H, F, CL, $CF_3$, $CHF_2$, OCF, or $OCHF_2$; and p denotes an integer between 0-6, m denotes 0, 1, 2, or 3, n denotes 0 or 1.

2. A liquid-crystalline compound of claim 1, wherein m+n=1 or 2, wherein when n=0, $Z_1$ independently denotes a single bond, and $Y_1$, $Y_2$ each, independently of one another, denote H or F.

3. A liquid-crystalline compound of claim 2, wherein $Y_1$ denotes F, and $Y_2$ denotes F or H.

4. A liquid-crystalline compound of claim 2, wherein $Y_1$ and $Y_2$ denote F.

5. A liquid-crystalline compound of claim 3, wherein p=0.

6. A liquid-crystalline compound of claim 5, wherein $Z_1$ independently denotes a single bond.

7. A liquid-crystalline compound of claim 6, wherein Cycloalkyl denotes cyclobutyl, $X_1$ denotes 0, and $X_2$ denotes $CH_2$, or $X_1$ and $X_2$ independently denotes 0, R denotes F, as shown in formula I A.

(IA)

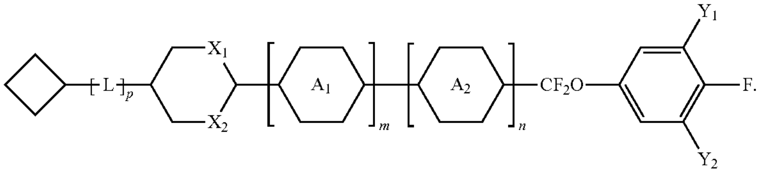

8. A liquid-crystalline compound of claim 7, selected from the group consisting of formulae IA-1 to I A-43:

(IA -1)

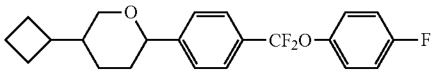

(IA -2)

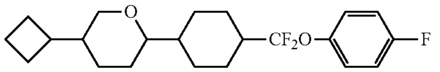

(IA -3)

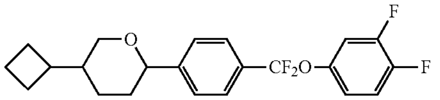

(IA -4)

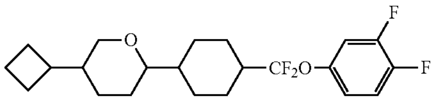

(IA -5)

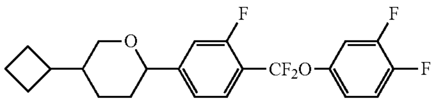

-continued
(IA -6)
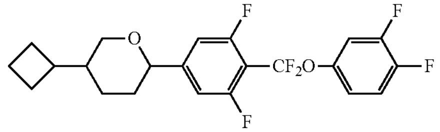
(IA -7)
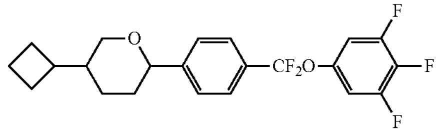
(IA -8)
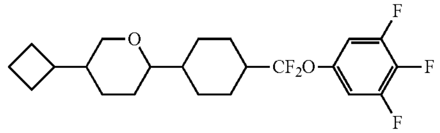
(IA -9)
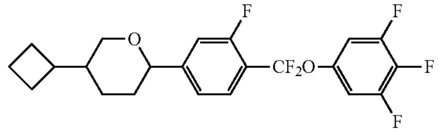
(IA -10)
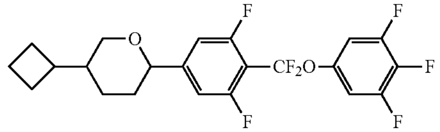
(IA -11)
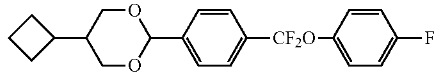
(IA -12)
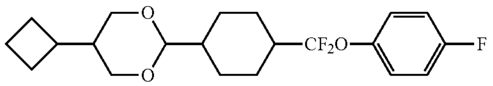
(IA -13)
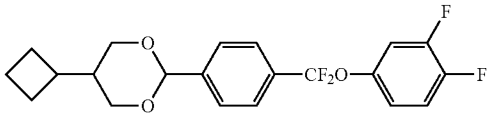
(IA -14)
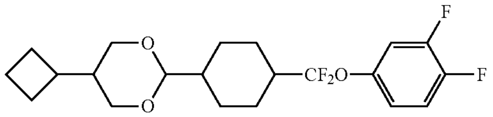
(IA -15)
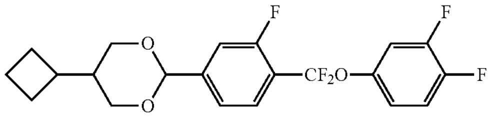
(IA -16)
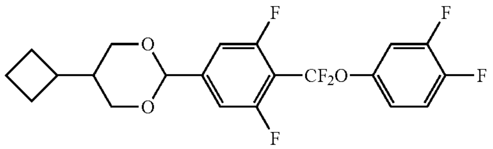
-continued
(IA -17)
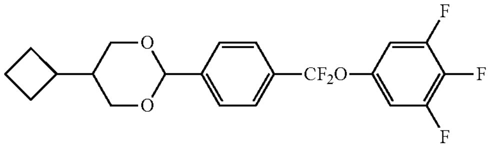
(IA -18)
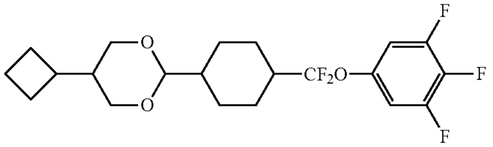
(IA -19)
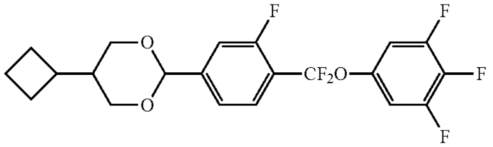
(IA -20)
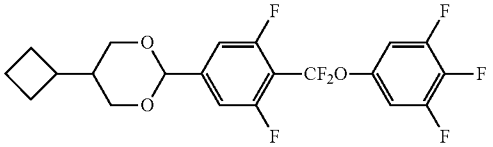
(IA -21)
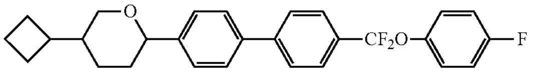
(IA -22)
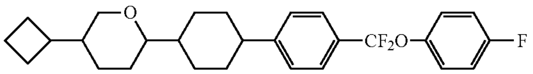
(IA -23)
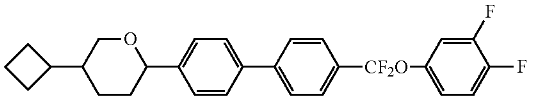
(IA -24)
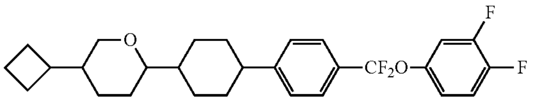
(IA -25)
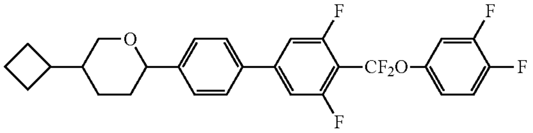
(IA -26)
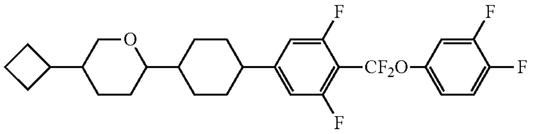

-continued
(IA -27)
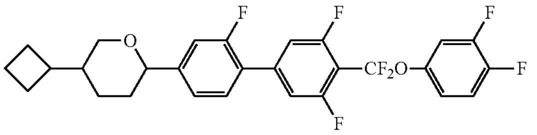
(IA -28)
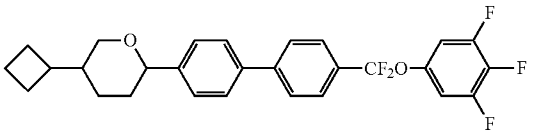
(IA -29)
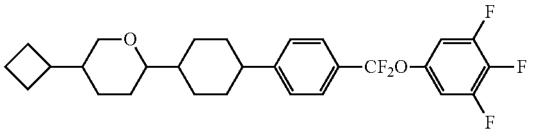
(IA -30)
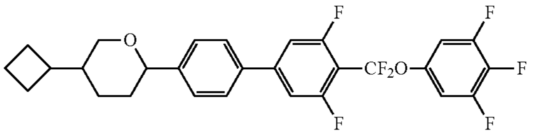
(IA -31)
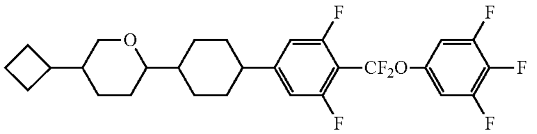
(IA -32)
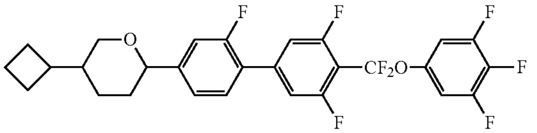
(IA -33)
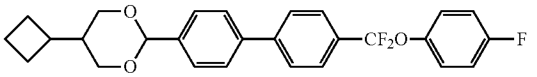
(IA -34)
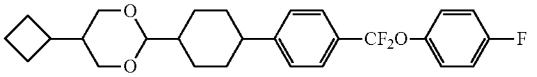
(IA -35)
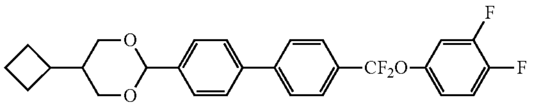
(IA -36)
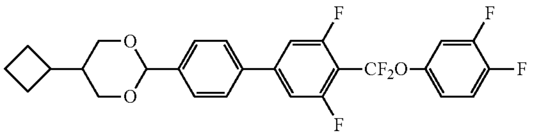
-continued
(IA -37)
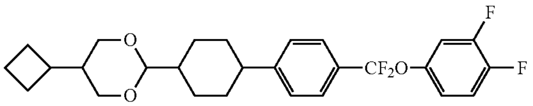
(IA -38)
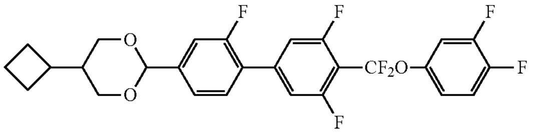
(IA-35)
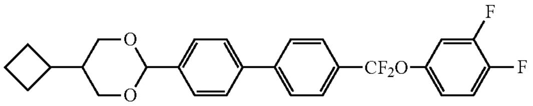
(IA-36)
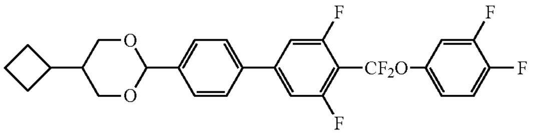
(IA-37)
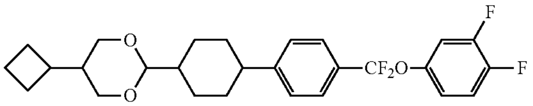
(IA -39)
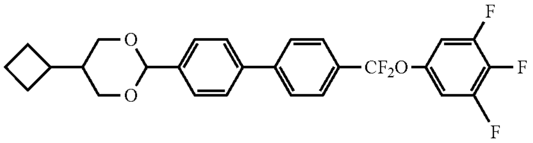
(IA -40)
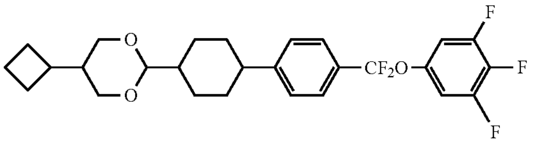
(IA -41)
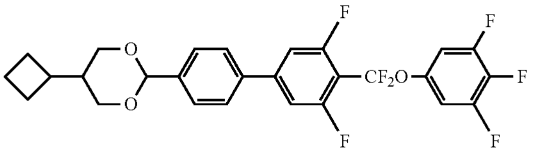
(IA -42)
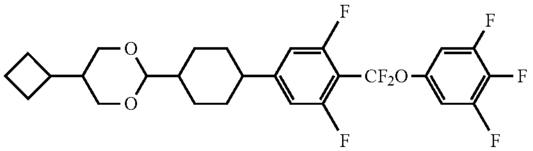

-continued
(IA -43)
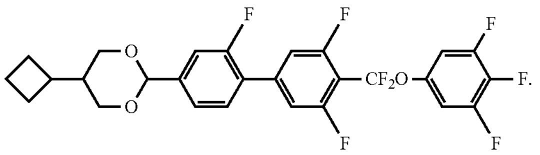
9. A liquid-crystalline compound of claim 6, wherein Cycloalkyl denotes cyclobutyl, $X_1$ denotes 0 and $X_2$ denotes $CH_2$, or $X_1$ and $X_2$ independently denotes 0, R denotes $OCF_3$, as shown in formula I B.
(IB)
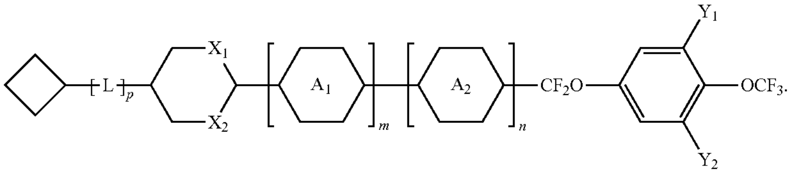
10. A liquid-crystalline compound of claim 9, selected from the group consisting of formulae I B-1 to I B-43:
(IB -1)
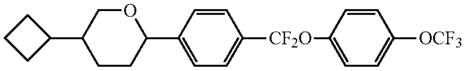
(IB -2)
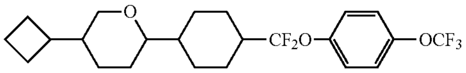
(IB -3)
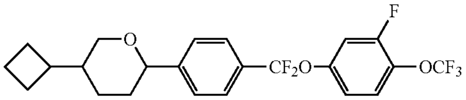
(IB -4)
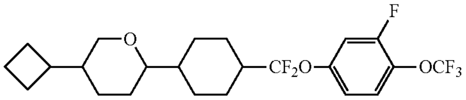
(IB -5)
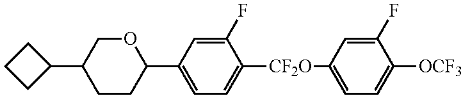
(IB -6)
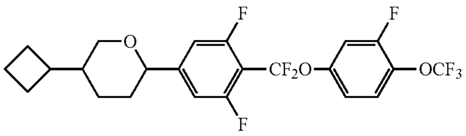
(IB -7)
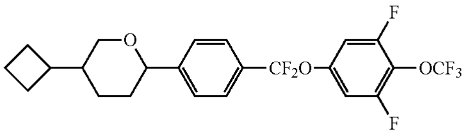
-continued
(IB -8)
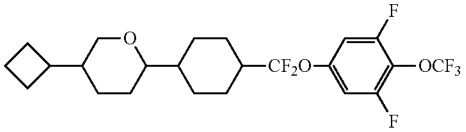
(IB -9)
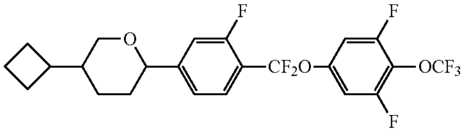
-continued
(IB -10)
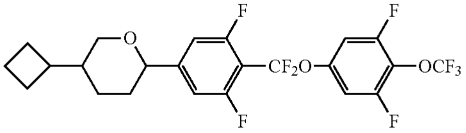
(IB -11)
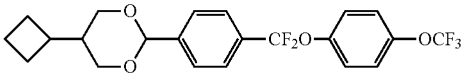
(IB -12)
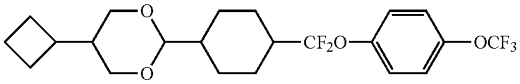
(IB -13)
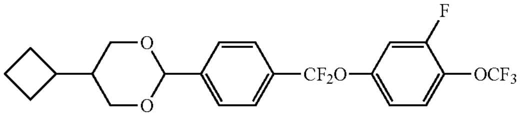
(IB -14)
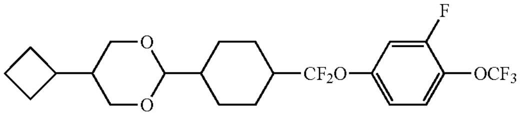
(IB -15)
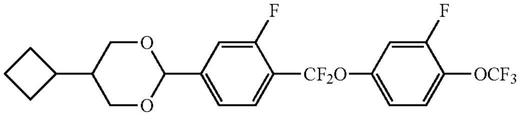
(IB -16)
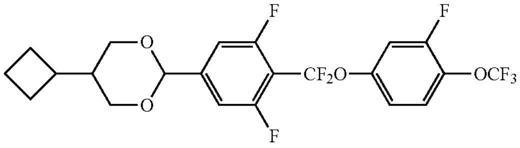

-continued
(IB-17)
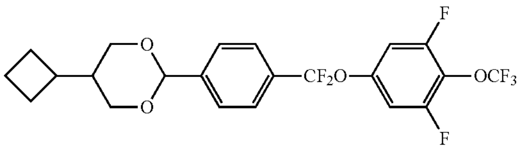
(IB-18)
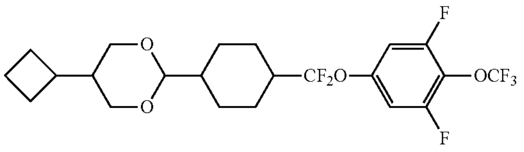
(IB-19)
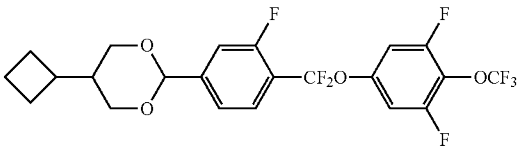
(IB-20)
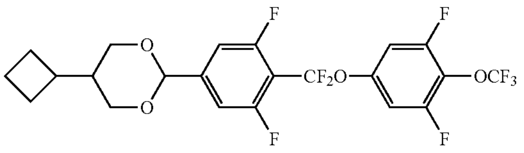
(IB-21)
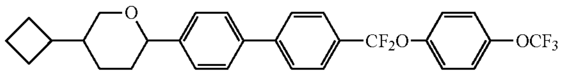
(IB-22)
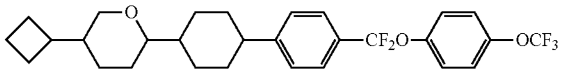
(IB-23)
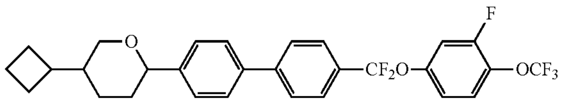
(IB-24)
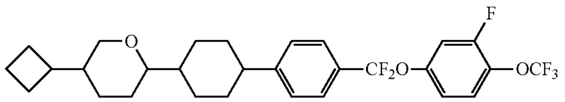
(IB-25)
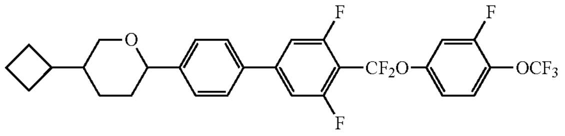
(IB-26)
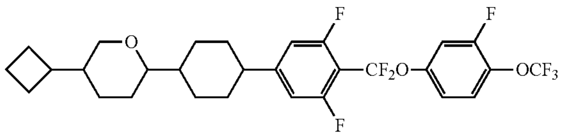
-continued
(IB-27)
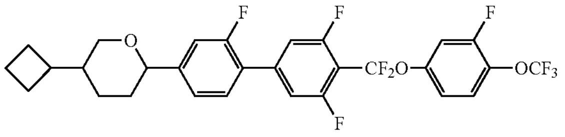
(IB-28)
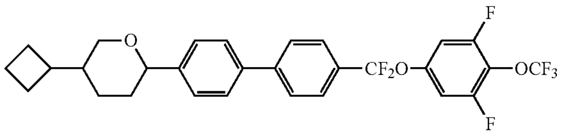
(IB-29)
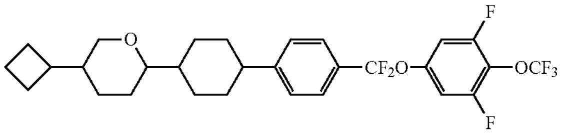
(IB-30)
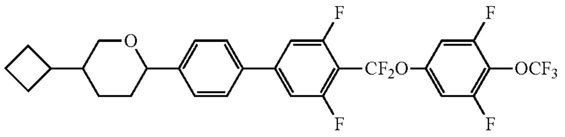
(IB-31)
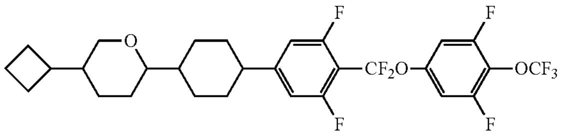
(IB-32)
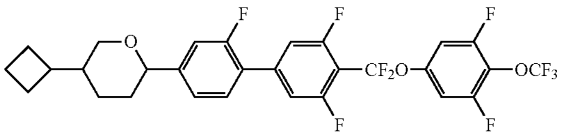
(IB-33)
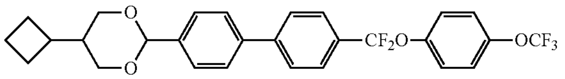
(IB-34)
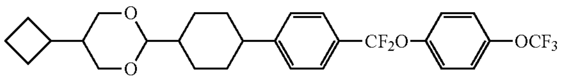
(IB-35)
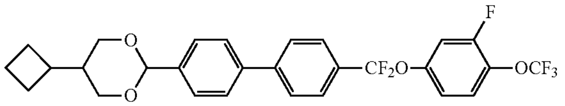
(IB-36)
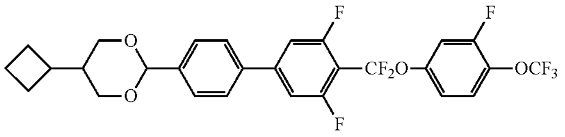

-continued
(IB -37)
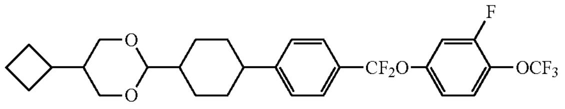
(IB -38)
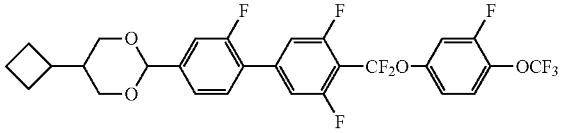
(IB -39)
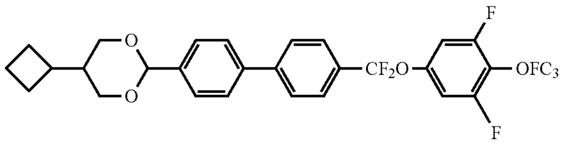
(IB -40)
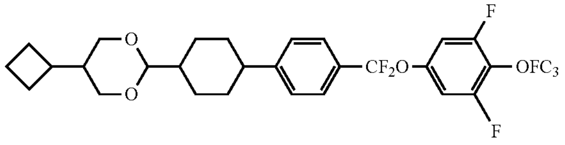
(IB -41)
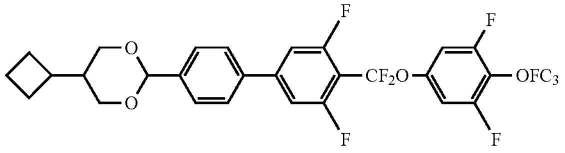
(IB -42)
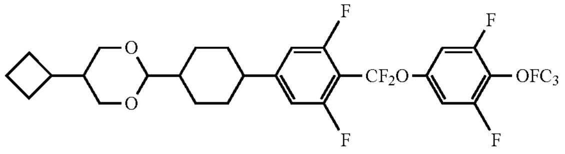
(IB -43)
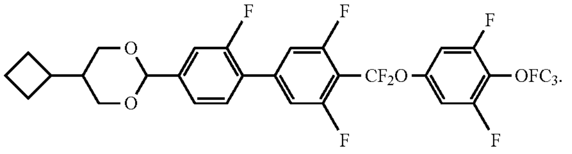
11. A liquid-crystalline compound of claim 6, wherein Cycloalkyl denotes cyclopentyl, $X_1$ denotes 0 and $X_2$ denotes $CH_2$, or $X_1$ and $X_2$ independently denotes 0, R denotes F, as shown in formula I C.
12. A liquid-crystalline compound of claim 11, selected from the group consisting formulae I C-1 to I C-43:
(IC -1)
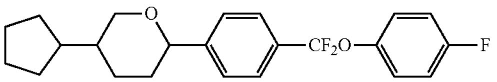
(IC -2)
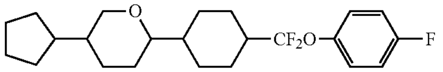
(IC -3)
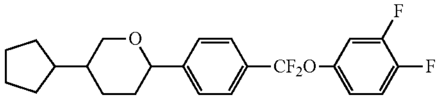
(IC -4)
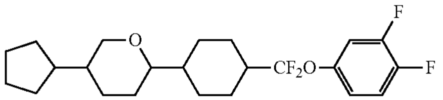
(IC -5)
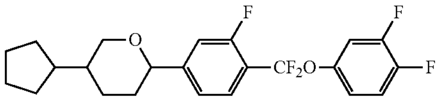
(IC -6)
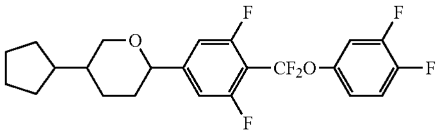
(IC -7)
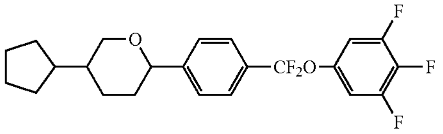
(IC -8)
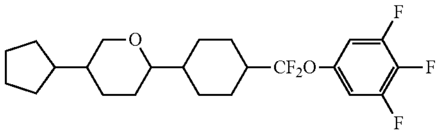
(IC -9)
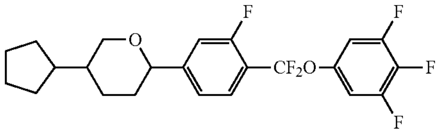
(IC -10)
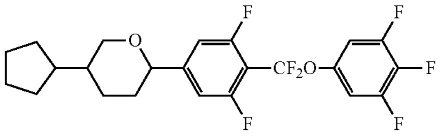
(IC)
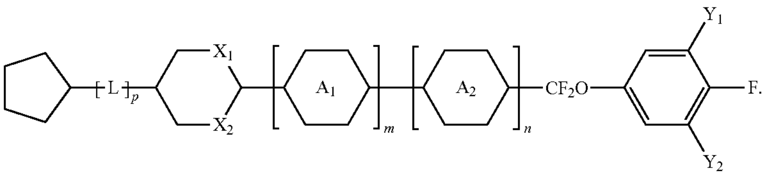

-continued
(IC -11)
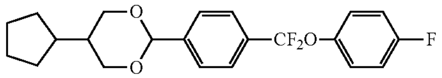
(IC -12)
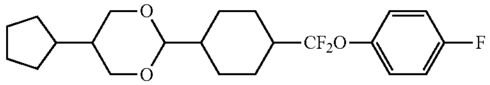
(IC -13)
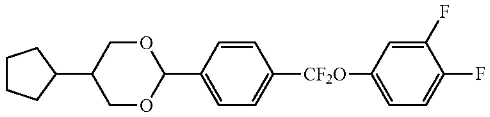
(IC -14)
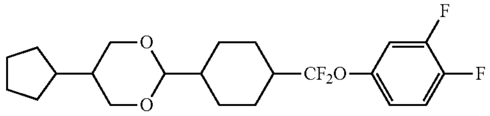
(IC -15)
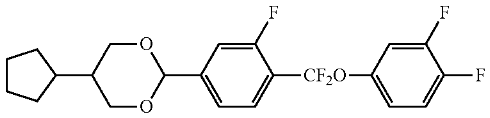
(IC -16)
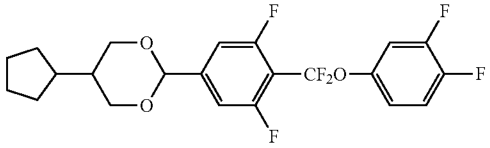
(IC -17)
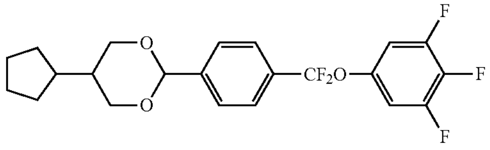
(IC -18)
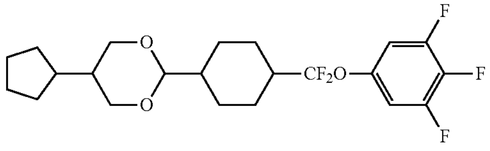
(IC -19)
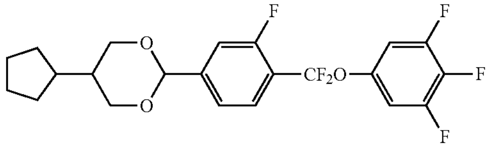
(IC -20)
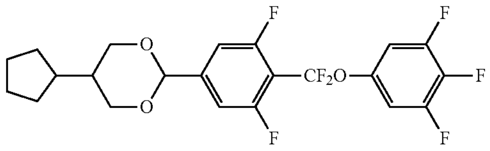
-continued
(IC -21)
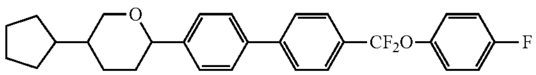
(IC -22)
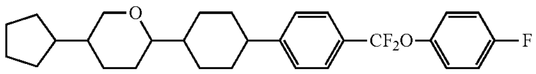
(IC -23)
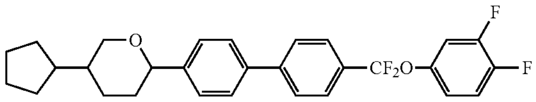
(IC -24)
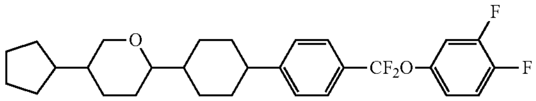
(IC -25)
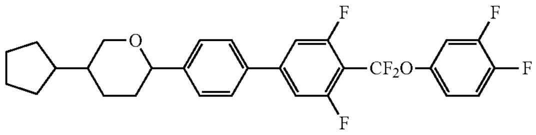
(IC -26)
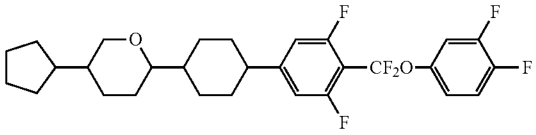
(IC -27)
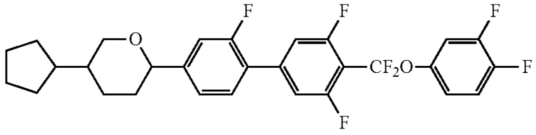
(IC -28)
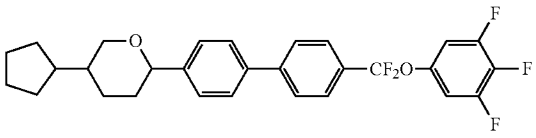
(IC -29)
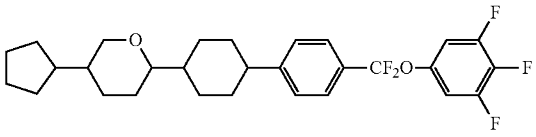
(IC -30)
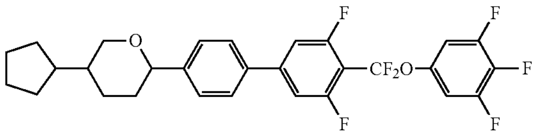
(IC -31)
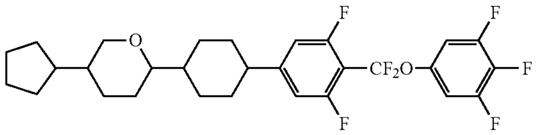

-continued
(IC-32)
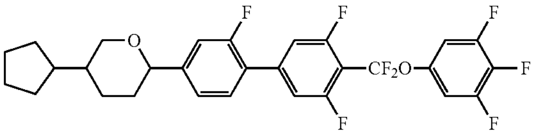
(IC-33)
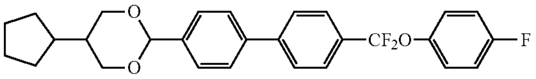
(IC-34)
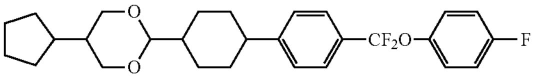
(IC-35)
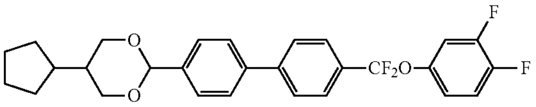
(IC-36)
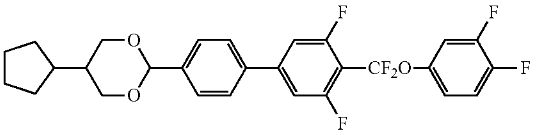
(IC-37)
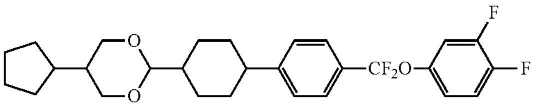
(IC-38)
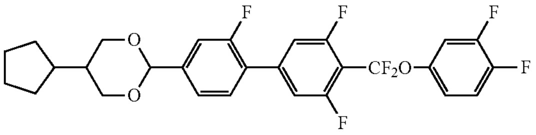
-continued
(IC-39)
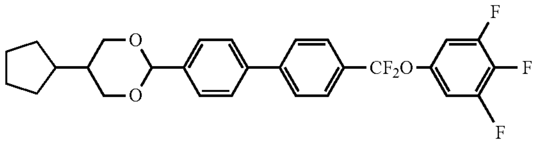
(IC-40)
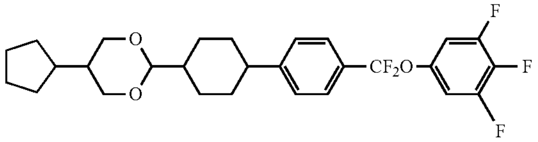
(IC-41)
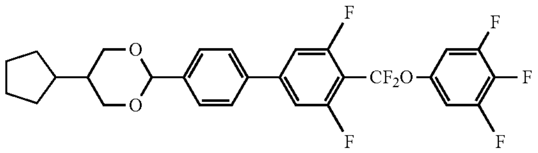
(IC-42)
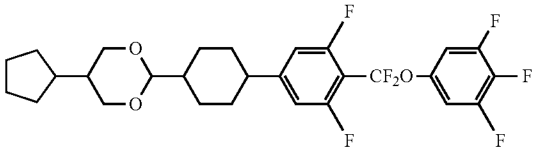
(IC-43)
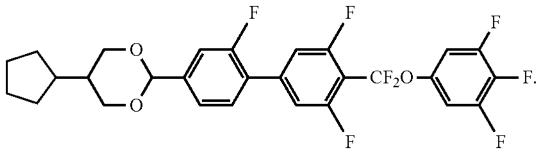
13. A liquid-crystalline compound of claim 6, wherein Cycloalkyl denotes cyclopentyl, $X_1$ denotes 0 and $X_2$ denotes $CH_2$, or $X_1$ and $X_2$ independently denotes 0, R denotes $OCF_3$, as shown in formula I D.
(ID)
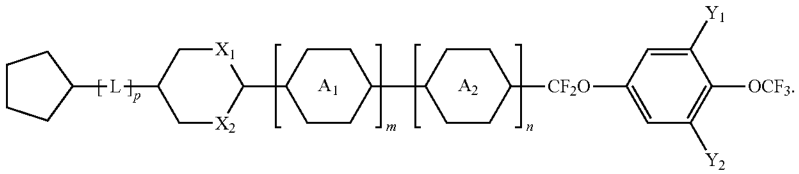

14. A liquid-crystalline compound of claim 13, selected from the group consisting formulae I D-1 to I D-43:
(ID -1)
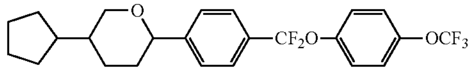
(ID -2)
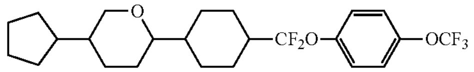
(ID -3)
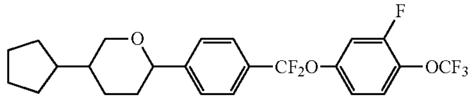
(ID -4)
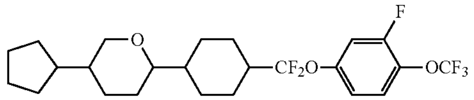
(ID -5)
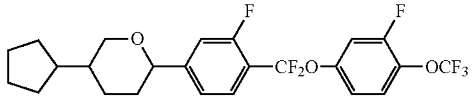
(ID -6)
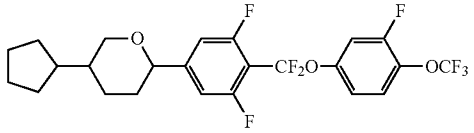
(ID -7)
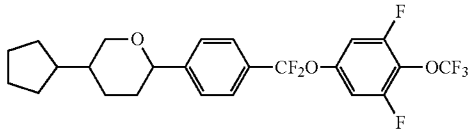
(ID -8)
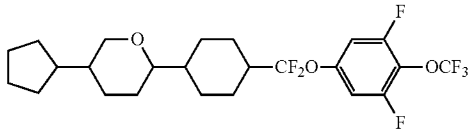
(ID -9)
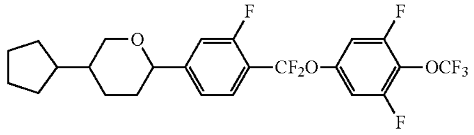
(ID -10)
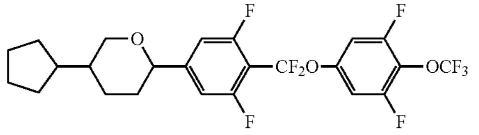
(ID -11)
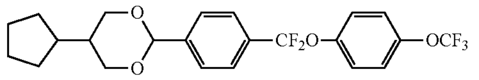
(ID -12)
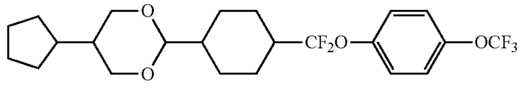
-continued
(ID -13)
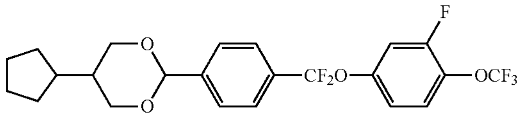
(ID -14)
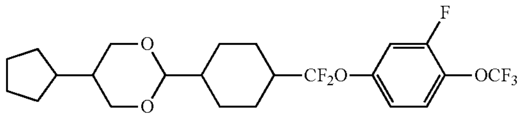
(ID -15)
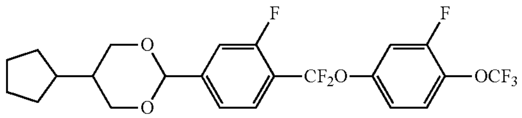
(ID -16)
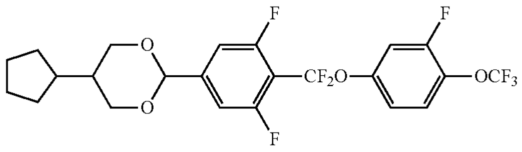
(ID -17)
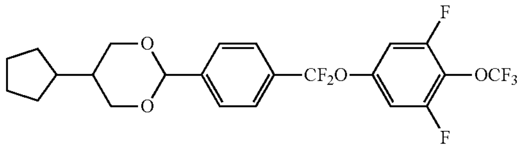
(ID -18)
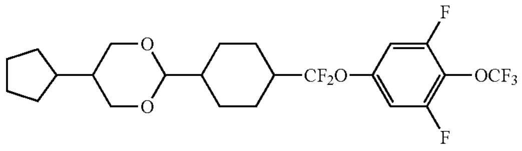
(ID -19)
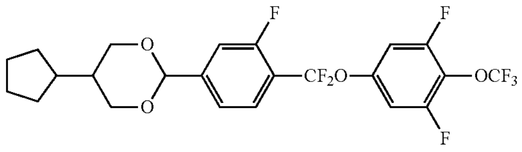
(ID -20)
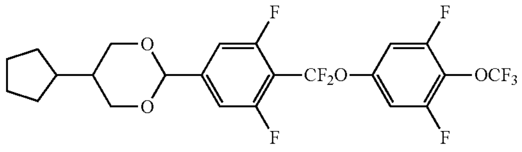
(ID -21)
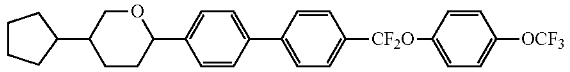
(ID -22)
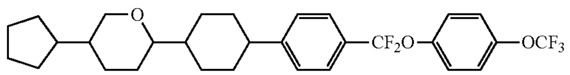

-continued
(ID -23)
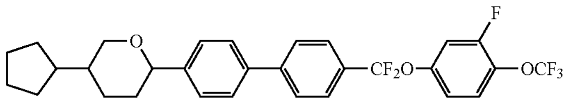
(ID -24)
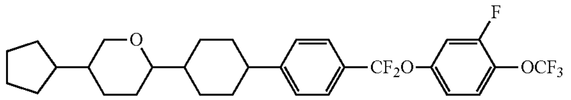
(ID -25)
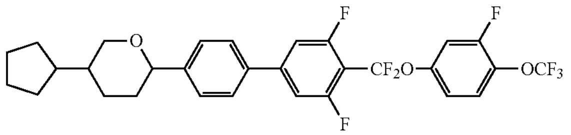
(ID -26)
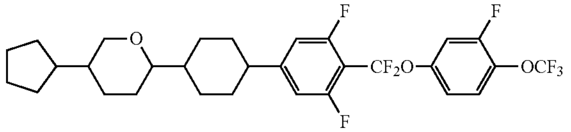
(ID -27)
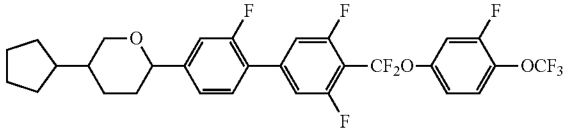
(ID -28)
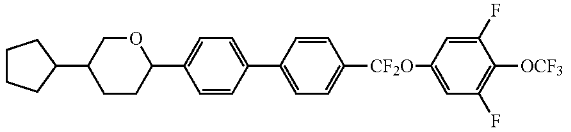
(ID -29)
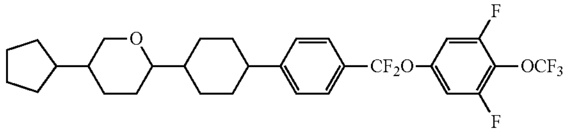
(ID -30)
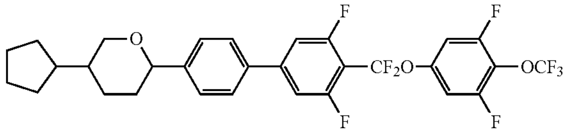
(ID -31)
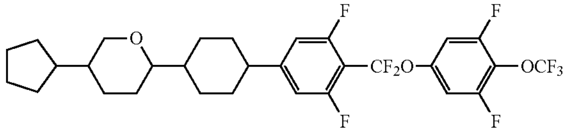
(ID -32)
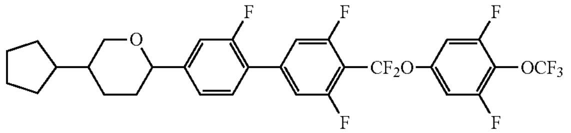
-continued
(ID -33)
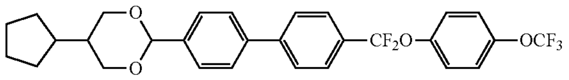
(ID -34)
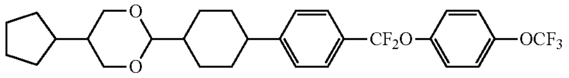
(ID -35)
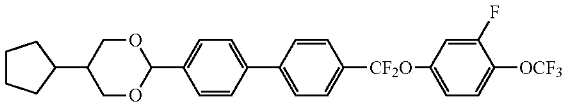
(ID -36)
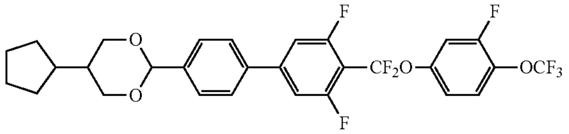
(ID -37)
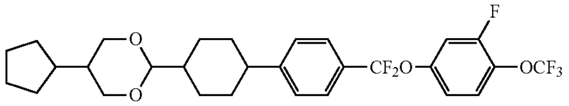
(ID -38)
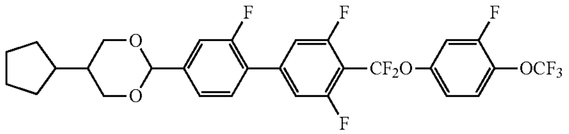
(ID -39)
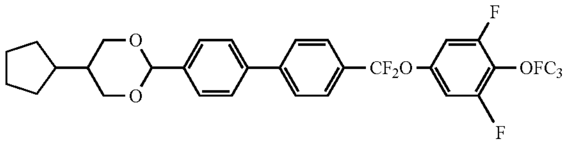
(ID -40)
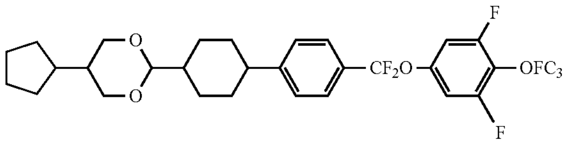
(ID -41)
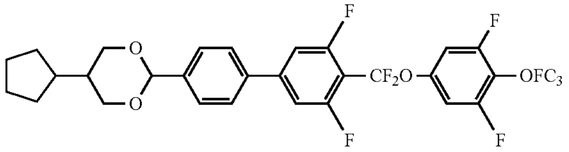
(ID -42)
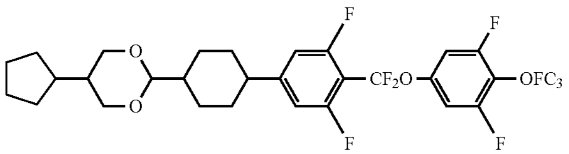

-continued (ID -43)

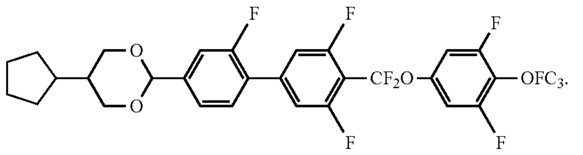

15. A liquid-crystalline medium base on a mixture of positive dielectric anisotropy, characterized in that it contains one or more compounds of the formula I:

(I)

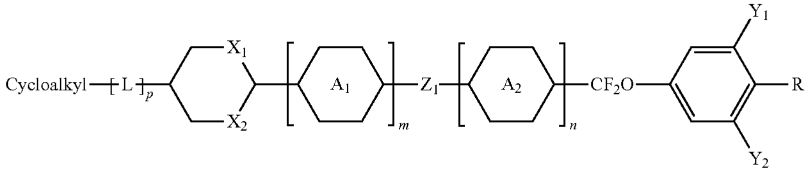

Wherein Cycloalkyl denotes cyclobutyl, cyclopentyl, or cycloheptyl;

[L] denotes $CH_2$ or 0, wherein [L]p comprising at most one 0;

$X_1$ and $X_2$, independent of one another, each denote $CH_2$ or 0; wherein at least one of $X_1$ or $X_2$ is 0;

$A_1$ and $A_2$ each, denote 1,4-cyclohexylidene, 1,4-phenylene or fluoro-1,4-phenylene;

$Z_1$ denotes $—CH_2—$, $—CH_2—CH_2—$, $—(CH_2)_3—$, $—(CH_2)_4—$, $—CH═CH—$, $—C≡C—$, $—COO—$, $—OOC—$, $—CF_2O—$, $—OCH_2—$, $—CH_2O—$, $—OCF_2—$, $—CF_2CH_2—$, $—CH_2CF_2—$, $—C_2F_4—$, $—CF═CF—$, or a single bond;

$Y_1$, $Y_2$ independently denote H or F;

R denotes H, F, CL, $CF_3$, $CHF_2$, OCF, or $OCHF_2$; and p denotes an integer between 0-6, m denotes 0, 1, 2, or 3, n denotes 0 or 1.

16. The liquid-crystalline medium according to claim 15 wherein m+n=1 or 2, when n=0, $Z_1$ independently denotes a single bond, and $Y_1$, $Y_2$ each, independently of one another, denote H or F.

17. The liquid-crystalline medium according to claim 16 wherein $Y_1$ denotes F, and $Y_2$ denotes F or H.

18. The liquid-crystalline medium according to claim 17 wherein $Y_1$ and $Y_2$ denote F.

19. The liquid-crystalline medium according to claim 18 wherein p=0.

20. The liquid-crystalline medium according to claim 19 wherein $Z_1$ independently denotes a single bond.

21. The liquid-crystalline medium according to claim 15 wherein it additionally comprises one or more compounds selected from the formulae II, III, IV, and V, (II)

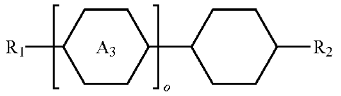

(III)

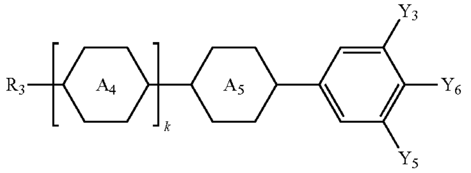

-continued (IV)

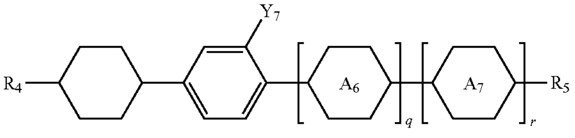

(V)

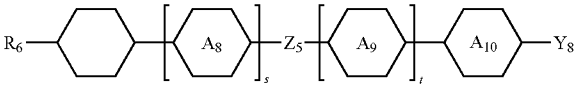

Wherein the individual radicals have the following meanings:

$R_1$, $R_2$, $R_3$, $R_4$, $R_5$ each, independently of one another, denote one of H, alkyl having 1-10 C atoms, alkoxy having 1-10 C atoms, alkenyl having 2-10 C atoms, alkenyloxy having 3-8 C atoms, or one or more H are fluorine-substituted alkyl having 1-10 C atoms, alkoxy having 1-10 C atoms, alkenyl having 2-10 C atoms, alkenyloxy having 3-8 C atoms at least, $R_6$, $Y_6$, $Y_8$ each, are one of the radicals listed below:

①: —H, —CL, —F, —CN, —OOCN, $—OCF_3$, $—CF_3$, $—CHF_2$, $—CH_2F$, $—OCHF_2$, —SCN, —NCS, $—SF_5$,

②: Alkyl has 1-15 C atoms, alkoxy has 1-15 C atoms, alkenyl has 2-15 C atoms, or alkenyloxy has 2-15 C atoms, ③: The radicals mentioned in ②, one or more $—CH_2—$ are substituted by $—CH═CH—$, $—C≡C—$, —COO—, —OOC—, cyclobutane, cyclopentane, —O—, or —S— and 0 atoms don't link directly, ④: The radicals mentioned above ② and ③, one or more H are substituted by F or CL, $X_6$ denotes —H or —F, $Z_2$, $Z_3$, $Z_4$, $Z_5$ denote single bond, or $—CH_2—$, $—CH_2—CH_2—$, $—(CH_2)_3—$, $—(CH_2)—$, $—CH═CH—$, $—C≡C—$, $—COO—$, $—OOC—$, $—CF_2O—$, $—OCH_2—$, $—CH_2O—$, $—OCF_2—$, $—CF_2CH—$, $—CH_2CF_2—$, $—C_2F_4—$ or $—CF═CF—$,

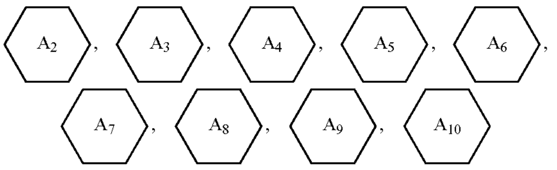

each independently denote single bond, 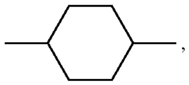,

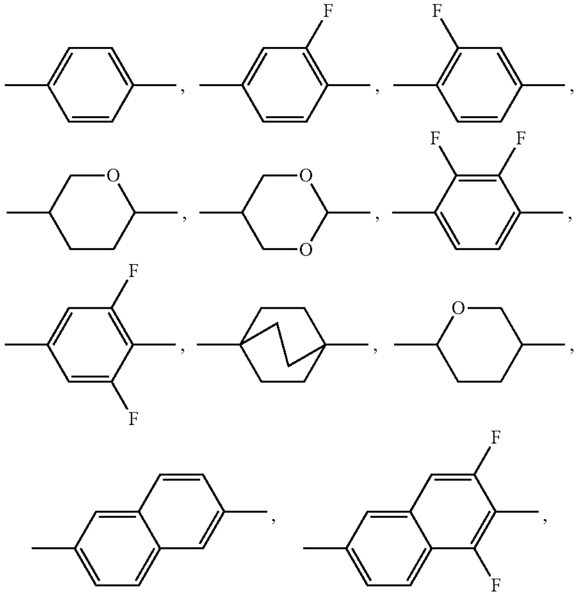

-continued

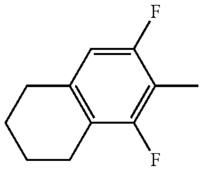

or

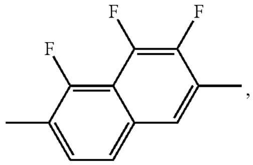, o, k, q, r, s, t denote 0-3, and q+r≤5, s+t≤5.

22. The liquid-crystalline medium according to claim 21 wherein it comprises 5 to 95% by weight of one or more compounds of the formula I.

23. The liquid-crystalline medium according to claim 21 wherein it comprises 10 to 60% by weight of one or more compounds of the formula II.

24. The liquid-crystalline medium according to claim 21 wherein it comprises 5 to 35% by weight of one or more compounds of the formula III.

25. The liquid-crystalline medium according to claim 21 wherein it comprises 5 to 30% by weight of one or more compounds of the formula IV.

26. The liquid-crystalline medium according to claim 21 wherein it comprises 5 to 30% by weight of one or more compounds of the formula V.

27. A cholesteric liquid crystalline medium characterized in that it comprises as a nematic component a liquid crystalline medium according to claim 15 and as an optically active component one or more chiral dopants.

28. Electro-optical liquid-crystal display containing a liquid-crystal medium according to claim 15.

* * * * *